United States Patent
Baek et al.

(10) Patent No.: US 9,860,021 B2
(45) Date of Patent: Jan. 2, 2018

(54) BROADCAST SIGNAL TRANSMITTING DEVICE, BROADCAST SIGNAL RECEIVING METHOD, BROADCAST SIGNAL TRANSMITTING METHOD AND BROADCAST SIGNAL RECEIVING METHOD

(71) Applicant: LG ELECTRONICS INC., Seoul (KR)

(72) Inventors: Jongseob Baek, Seoul (KR); Byounggill Kim, Seoul (KR); Woochan Kim, Seoul (KR); Jaehyung Kim, Seoul (KR); Woosuk Ko, Seoul (KR); Sungryong Hong, Seoul (KR); Chulkyu Mun, Seoul (KR); Jinyong Choi, Seoul (KR); Jaeho Hwang, Seoul (KR); Kookyeon Kwak, Seoul (KR); Sangchul Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/782,913

(22) PCT Filed: Apr. 14, 2014

(86) PCT No.: PCT/KR2014/003165
§ 371 (c)(1),
(2) Date: Oct. 7, 2015

(87) PCT Pub. No.: WO2014/171673
PCT Pub. Date: Oct. 23, 2014

(65) Prior Publication Data
US 2016/0036562 A1    Feb. 4, 2016

Related U.S. Application Data

(60) Provisional application No. 61/811,813, filed on Apr. 15, 2013, provisional application No. 61/839,829, filed on Jun. 26, 2013.

(51) Int. Cl.
*H04L 1/00* (2006.01)
*H04H 60/73* (2008.01)
(Continued)

(52) U.S. Cl.
CPC .......... *H04L 1/0071* (2013.01); *H04H 60/73* (2013.01); *H04L 1/0042* (2013.01);
(Continued)

(58) Field of Classification Search
CPC ... H04L 27/3488; H04L 1/007; H04L 1/0046; H04L 1/0071; H04L 27/2627; H04L 1/0042; H04L 1/004; H04L 1/0061
(Continued)

(56) References Cited

U.S. PATENT DOCUMENTS 7,773,682 B2 *  8/2010  Hayashi ............ H04L 25/03159
                                                    375/260
8,792,322 B2 *  7/2014  Stadelmeier ....... H04N 21/4385
                                                    370/203
(Continued)

FOREIGN PATENT DOCUMENTS

CN   101933260 A   12/2010
CN   102685056 A   9/2012
(Continued)

OTHER PUBLICATIONS

International Search Report from PCT/KR2014/003165, dated Apr. 14, 2014.

*Primary Examiner* — Emmanuel Bayard
(74) *Attorney, Agent, or Firm* — Dentons US LLP

(57) ABSTRACT

A broadcast signal transmitting device according to one embodiment of the present invention comprises: an encoder for forward error correction (FEC) encoding data pipe (DP) data transmitted via multiple DPs, wherein each DP transmits at least one service or at least one service component;
(Continued)

a signaling encoder for encoding signaling data; an interleaver for interleaving the encoded DP data; a frame builder for mapping the interleaved DP data and the encoded signaling data and then generating at least one signal frame, wherein the interleaved DP data is mapped according to the type of the DPs transmitting the respective DP data, and wherein the encoded signaling data includes type information indicative of the type of each DP; a modulation unit for modulating the at least one generated signal frame in an orthogonal frequency division multiplexing (OFDM) scheme; and a transmitter for transmitting a broadcast signal including the at least one modulated signal frame.

24 Claims, 42 Drawing Sheets

(51) Int. Cl.
  *H04L 27/26* (2006.01)
  *H04N 21/426* (2011.01)
  *H04H 20/72* (2008.01)
(52) U.S. Cl.
  CPC ...... *H04L 27/2626* (2013.01); *H04L 27/2647* (2013.01); *H04H 20/72* (2013.01); *H04N 21/42607* (2013.01)
(58) Field of Classification Search
  USPC .............. 375/260, 267, 295, 229, 316, 340
  See application file for complete search history.

(56) References Cited

U.S. PATENT DOCUMENTS

| | | | | |
|---|---|---|---|---|
| 8,880,846 B2* | 11/2014 | Nakajima | ............... | G06F 12/10 711/206 |
| 9,112,760 B2* | 8/2015 | Atungsiri | ............ | H04L 27/3488 |
| 9,236,927 B2* | 1/2016 | Stadelmeier | ......... | H04B 7/0689 |
| 9,258,083 B2* | 2/2016 | Ouchi | .................... | H04L 1/0041 |
| 9,300,435 B2* | 3/2016 | Hong | ................. | H04N 21/2362 |
| 2005/0232136 A1* | 10/2005 | Kwak | .................... | H04H 40/18 370/208 |
| 2007/0043982 A1 | 2/2007 | Arivoli et al. | | |
| 2009/0190677 A1 | 7/2009 | Jokela et al. | | |
| 2010/0077276 A1* | 3/2010 | Okamura | ........... | H03M 13/1102 714/752 |
| 2011/0299628 A1* | 12/2011 | Ko | ........................ | H04L 1/0044 375/298 |
| 2012/0314786 A1* | 12/2012 | Atungsiri | ............ | H04L 27/3488 375/260 |
| 2013/0039303 A1* | 2/2013 | Stadelmeier | ........... | H04H 60/07 370/329 |
| 2013/0039397 A1 | 2/2013 | Stadelmeier et al. | | |
| 2015/0304147 A1* | 10/2015 | Peron | ................. | H03M 13/2742 375/260 |
| 2015/0326294 A1* | 11/2015 | Murakami | .............. | H04L 1/007 375/267 |
| 2015/0349998 A1* | 12/2015 | Atungsiri | ............ | H04L 27/3488 375/229 |
| 2016/0037487 A1* | 2/2016 | Hong | ....................... | H04B 7/10 370/312 |
| 2016/0043745 A1* | 2/2016 | Vojcic | ..................... | H04L 1/005 714/755 |
| 2016/0056991 A1* | 2/2016 | Zhang | .................. | H04L 1/0046 375/260 |

FOREIGN PATENT DOCUMENTS

| | | |
|---|---|---|
| EP | 2490388 A1 | 8/2012 |
| KR | 10-2008-0105934 A | 12/2008 |
| WO | 2011-142564 A2 | 11/2011 |
| WO | 2012-070837 A2 | 5/2012 |

* cited by examiner

BROADCAST SIGNAL TRANSMITTING DEVICE, BROADCAST SIGNAL RECEIVING METHOD, BROADCAST SIGNAL TRANSMITTING METHOD AND BROADCAST SIGNAL RECEIVING METHOD

This application is a U.S. National Phase Application under 35 U.S.C. §371 of International Application PCT/KR2014/003165 filed on Apr. 14, 2014, which claims the benefit of U.S. Provisional Application Nos. 61/811,813 filed on Apr. 15, 2013 and 61/839,829 filed on Jun. 26, 2013, the entire content of the prior applications is hereby incorporated by reference.

TECHNICAL FIELD

The present invention relates to an apparatus for transmitting broadcast signals, an apparatus for receiving broadcast signals and methods for transmitting and receiving broadcast signals.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

DISCLOSURE

Technical Problem

Accordingly, the present invention is directed to an apparatus for transmitting broadcast signals and an apparatus for receiving broadcast signals for future broadcast services and methods for transmitting and receiving broadcast signals for future broadcast services.

An object of the present invention devised to solve the problem lies on an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention devised to solve the problem lies on an apparatus for transmitting broadcast signals, an apparatus for receiving broadcast signals and methods for transmitting and receiving broadcast signals to classify data corresponding to services by components, transmit data corresponding to each component as a data pipe, receive and process the data Another object of the present invention devised to solve the problem lies on an apparatus for transmitting broadcast signals, an apparatus for receiving broadcast signals and methods for transmitting and receiving broadcast signals to signal signaling information necessary to provide broadcast signals.

Technical Solution

The object of the present invention can be achieved by providing a method of transmitting broadcast signals including FEC (Forward Error Correction) encoding DP (Data Pipe) data in a plurality of DP, wherein the DP carries at least one service or at least one service component, encoding signaling data, interleaving the encoded DP data, mapping the interleaved DP data and the encoded signaling data to build at least one signal frame, wherein the interleaved DP data is mapped according to a type of each DP carrying DP data, modulating the built at least one signal frame by an OFDM (Orthogonal Frequency Division Multiplexing) scheme and transmitting the broadcast signal including the modulated at least one signal frame.

Advantageous Effects

The present invention can process data according to service characteristics to control QoS for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

Figure 1:
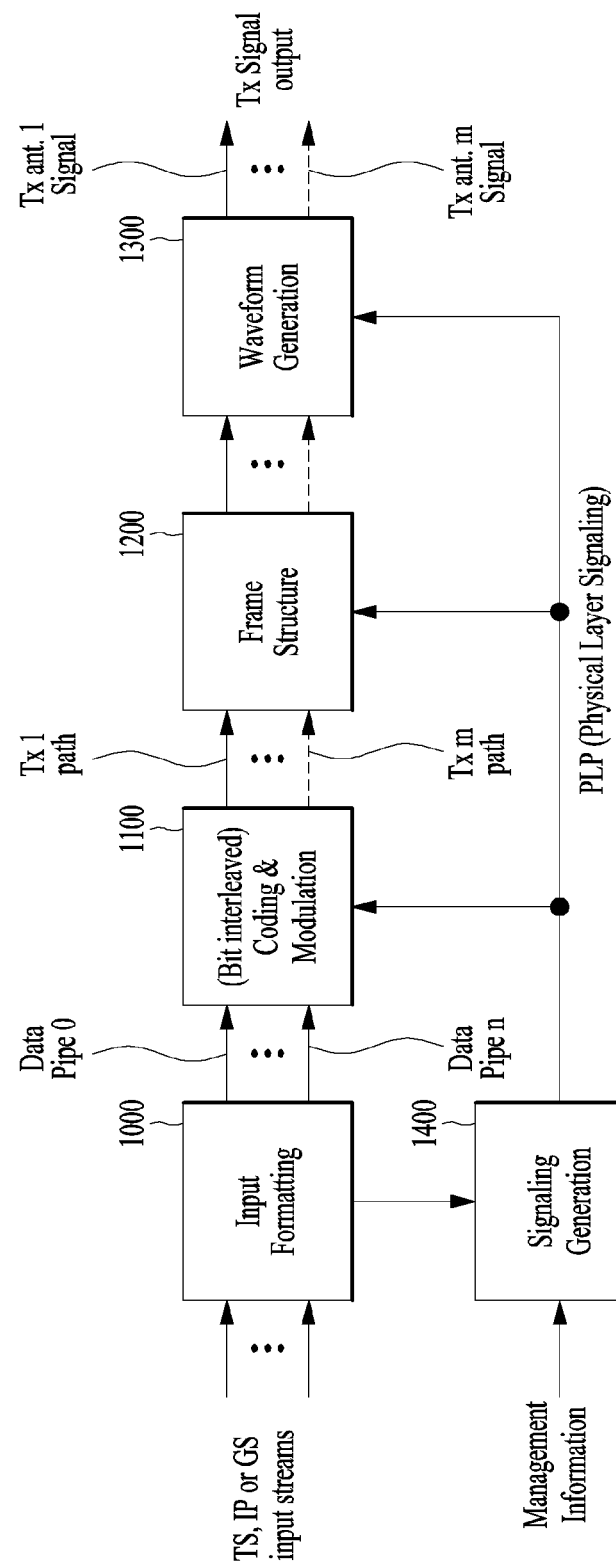
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 1, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes or DP data). The data pipe is a logical channel in the physical layer that carries service data or related metadata, which may carry one or multiple service(s) or service component(s). In addition, data transmitted through each data pipe may be called DP data.

In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 1, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 2:
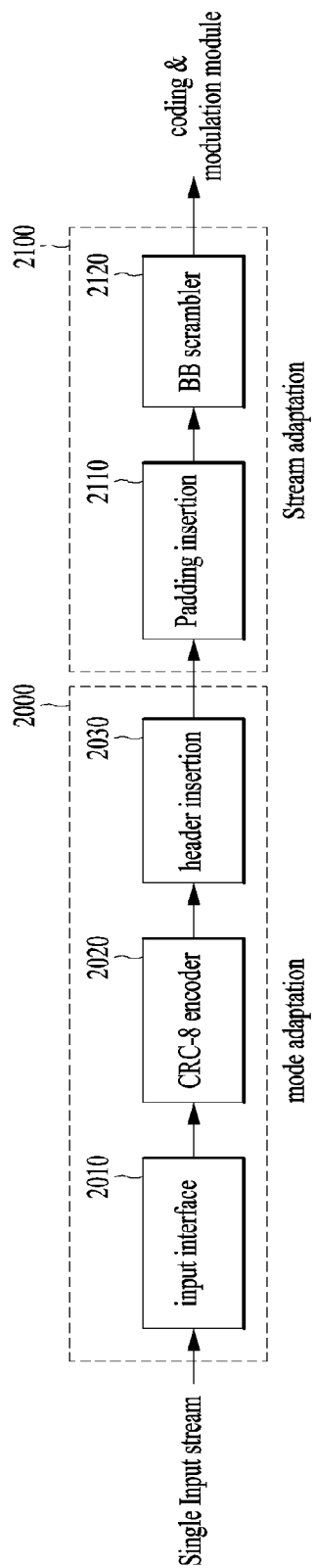
FIG. 2 illustrates an input formatting module according to an embodiment of the present invention.
Figure 3:
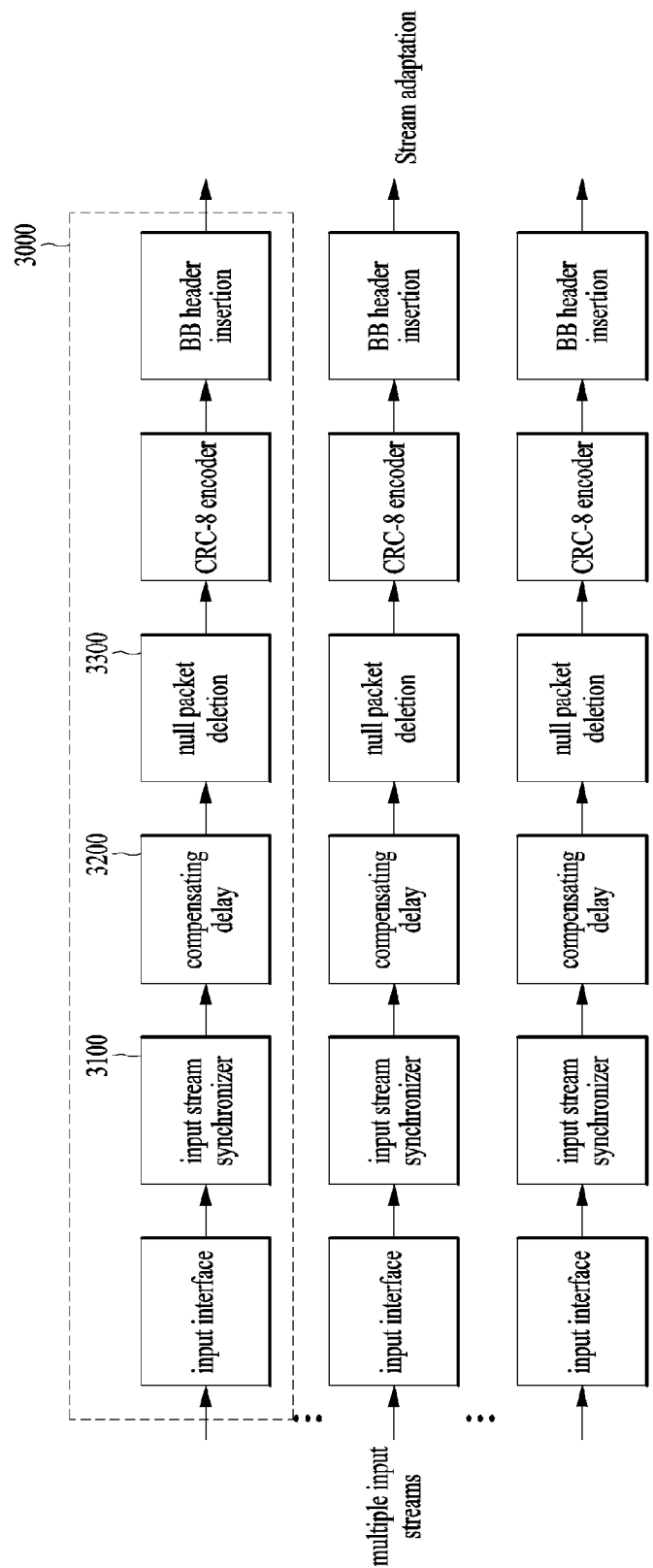
FIG. 3 illustrates an input formatting module according to another embodiment of the present invention.
Figure 4:
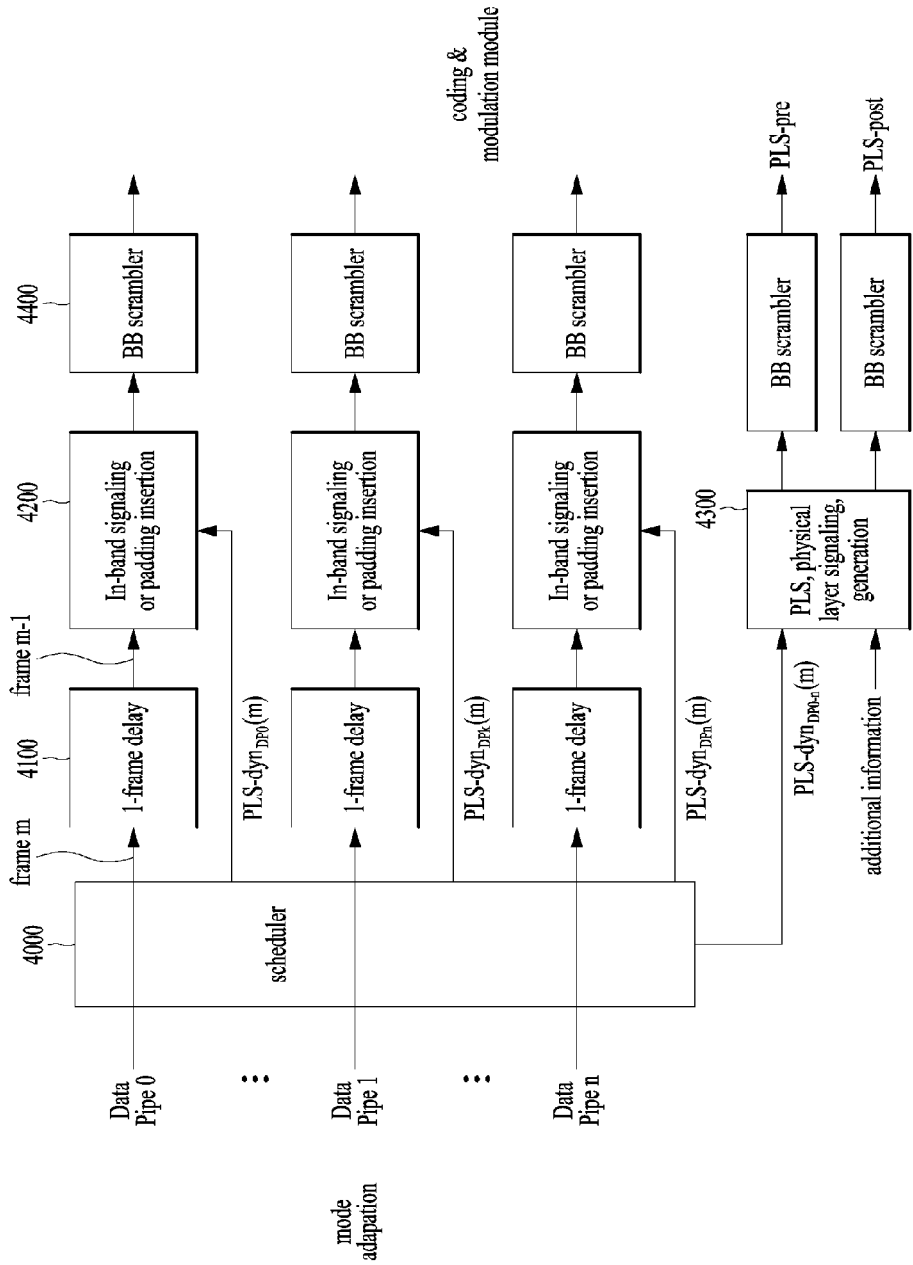
FIG. 4 illustrates an input formatting module according to another embodiment of the present invention.

FIGS. 2, 3 and 4 illustrate the input formatting module 1000 according to embodiments of the present invention. A description will be given of each figure.

FIG. 2 illustrates an input formatting module according to one embodiment of the present invention. FIG. 2 shows an input formatting module when the input signal is a single input stream.

Referring to FIG. 2, the input formatting module according to one embodiment of the present invention can include a mode adaptation module 2000 and a stream adaptation module 2100.

As shown in FIG. 2, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into the BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 2, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 2, the input formatting module can finally output data pipes to the coding & modulation module.

FIG. 3 illustrates an input formatting module according to another embodiment of the present invention. FIG. 3 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 3, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 2 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 4 illustrates an input formatting module according to another embodiment of the present invention.

Specifically, FIG. 4 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-to-cell demux block, a cell interleaver block, a time interleaver block, etc. included in the coding & modulation module illustrated in FIG. 1.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 4, scrambling of the BB scrambler block 4400 is applicable to both data pipes and physical layer signaling information.

The above-described blocks may be omitted or replaced by blocks having similar or identical functions according to designer.

As shown in FIG. 4, the stream adaptation module can finally output the data pipes to the coding & modulation module.

Figure 5:
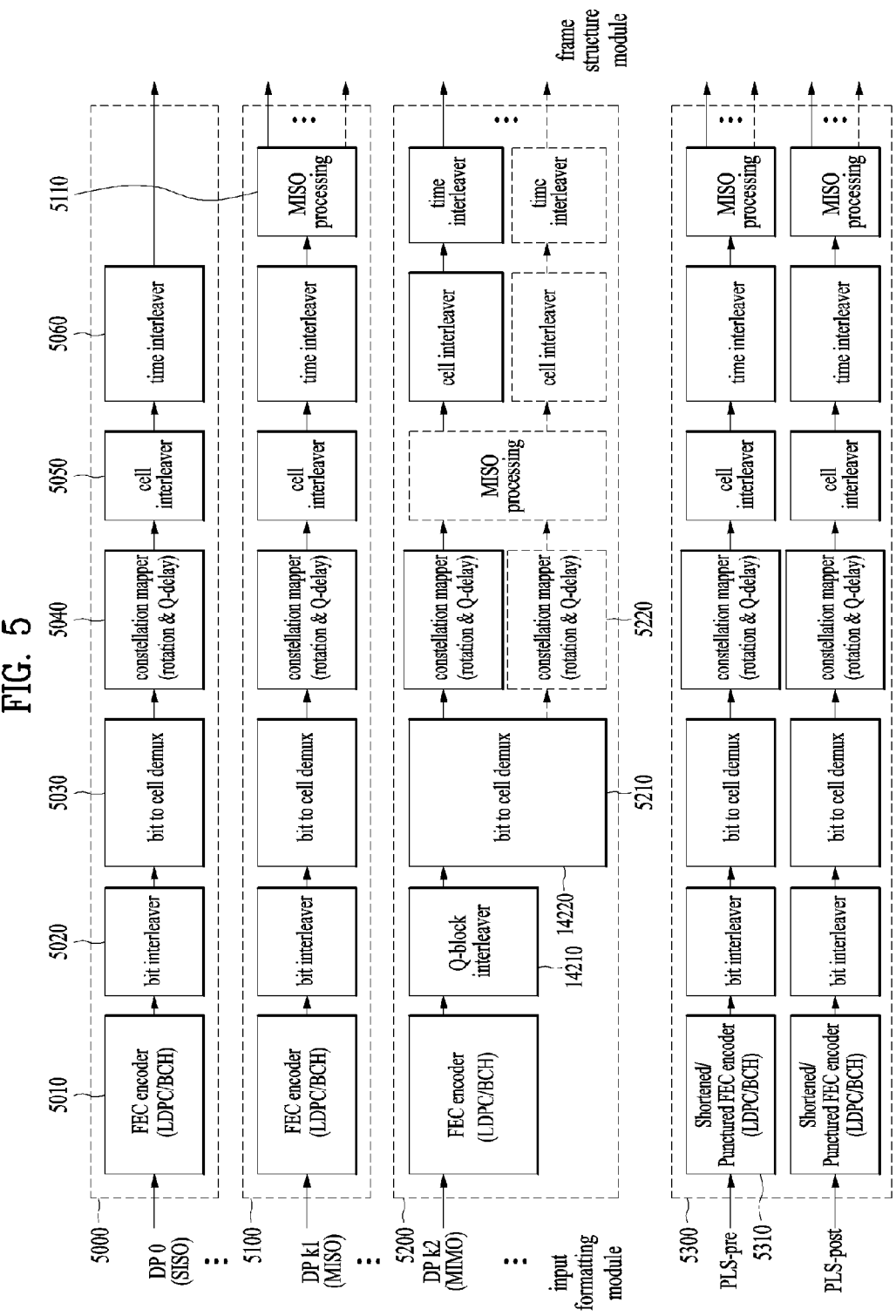
FIG. 5 illustrates a coding & modulation module according to an embodiment of the present invention.

FIG. 5 illustrates a coding & modulation module according to an embodiment of the present invention.

The coding & modulation module shown in FIG. 5 corresponds to an embodiment of the coding & modulation module illustrated in FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 5 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

In addition, the bit interleaver block 5020 is located between the FEC encoder block 5010 and the constellation mapper block 5040 and can connect output bits of LDPC encoding performed by the FEC encoder block 5010 to bit positions having different reliability values and optimal values of the constellation mapper in consideration of LDPC decoding of the apparatus for receiving broadcast signals. Accordingly, the bit-to-cell demux block 5030 can be replaced by a block having a similar or equal function.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

In addition, the constellation mapper block 5040 can move constellation points on a two-dimensional plane in order to find optimal constellation points. Through this process, capacity of the coding & modulation module 1100 can be optimized. Furthermore, the constellation mapper block 5040 can perform the above-described operation using IQ-balanced constellation points and rotation. The constellation mapper block 5040 can be replaced by a block having a similar or equal function.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 5. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 5, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad 0s corresponding to a desired input bit stream length necessary for normal LDPC encoding, carry out LDPC encoding and then remove the padded 0s to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 5, the coding & modulation module can output the data pipes (or DP data), PLS-pre information and PLS-post information processed for the respective paths to the frame structure module.

Figure 6:
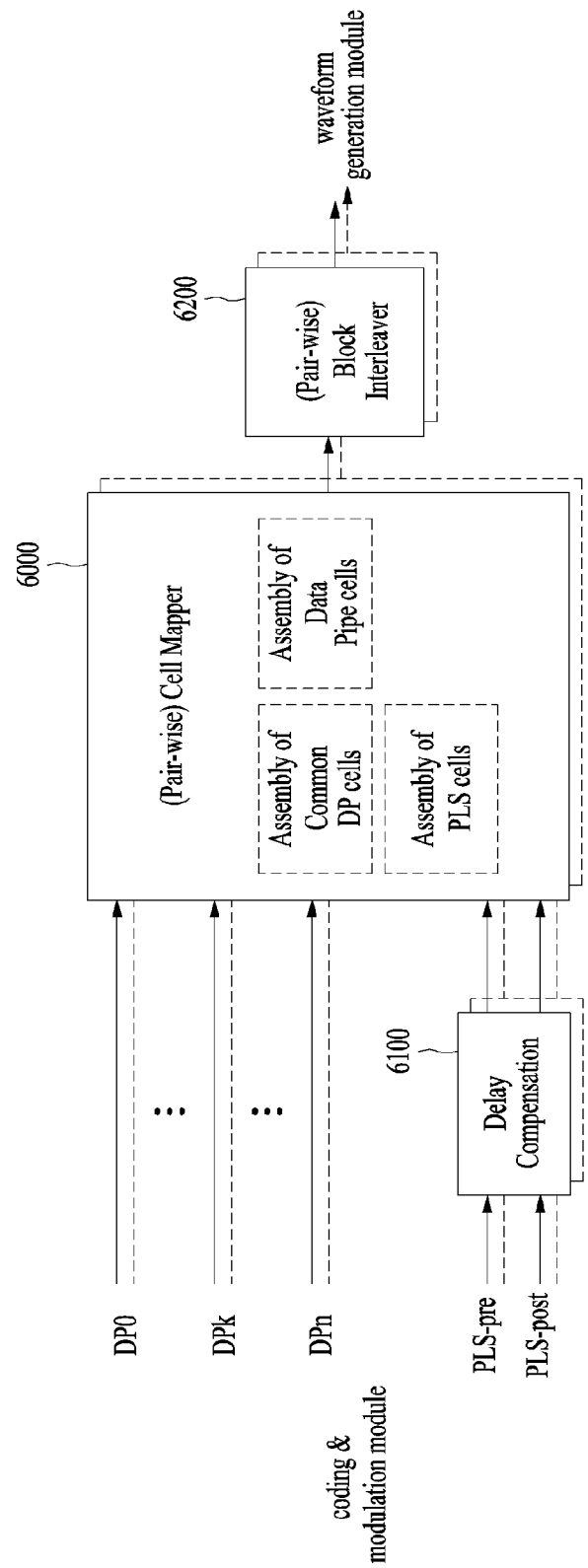
FIG. 6 illustrates a frame structure module according to an embodiment of the present invention.

FIG. 6 illustrates a frame structure module according to one embodiment of the present invention.

The frame structure module shown in FIG. 6 corresponds to an embodiment of the frame structure module 1200 illustrated in FIG. 1.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map the unit to a frame. Accordingly, paired cells in an input path corresponding to an output path of each antenna can be allocated to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

As illustrated in FIG. 6, the frame structure module can output at least one signal frame to the waveform generation module.

Figure 7:
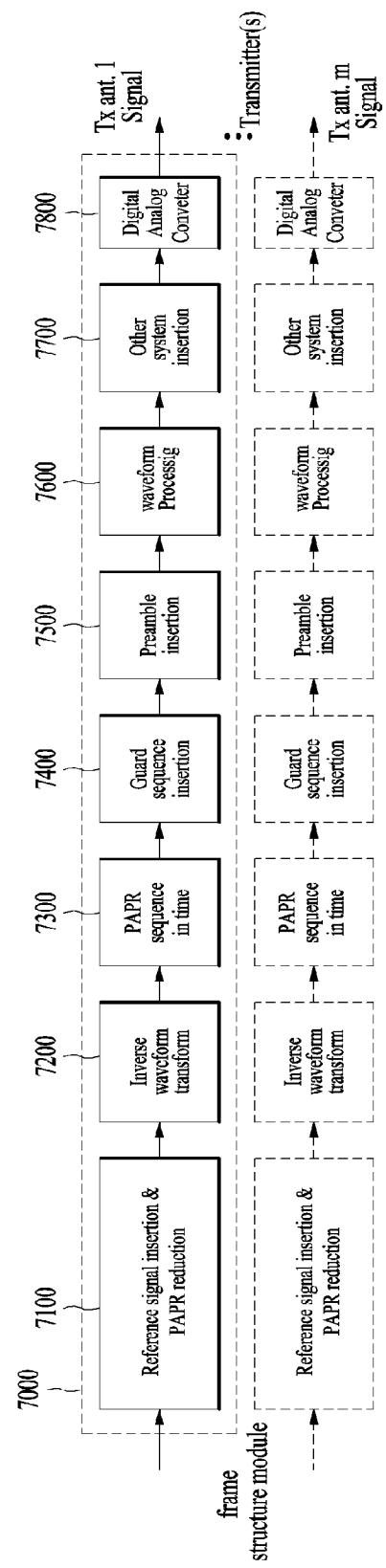
FIG. 7 illustrates a waveform generation module according to an embodiment of the present invention.

FIG. 7 illustrates a waveform generation module according to an embodiment of the present invention.

The waveform generation module illustrated in FIG. 7 corresponds to an embodiment of the waveform generation module 1300 described with reference to FIG. 1.

The waveform generation module according to an embodiment of the present invention can modulate and transmit as many signal frames as the number of antennas for receiving and outputting signal frames output from the frame structure module illustrated in FIG. 6.

Specifically, the waveform generation module illustrated in FIG. 7 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through m output antennas. A Tx antenna according to an embodiment of the present invention can have vertical or horizontal polarity.

The above-described blocks may be omitted or replaced by blocks having similar or identical functions according to design.

Figure 8:
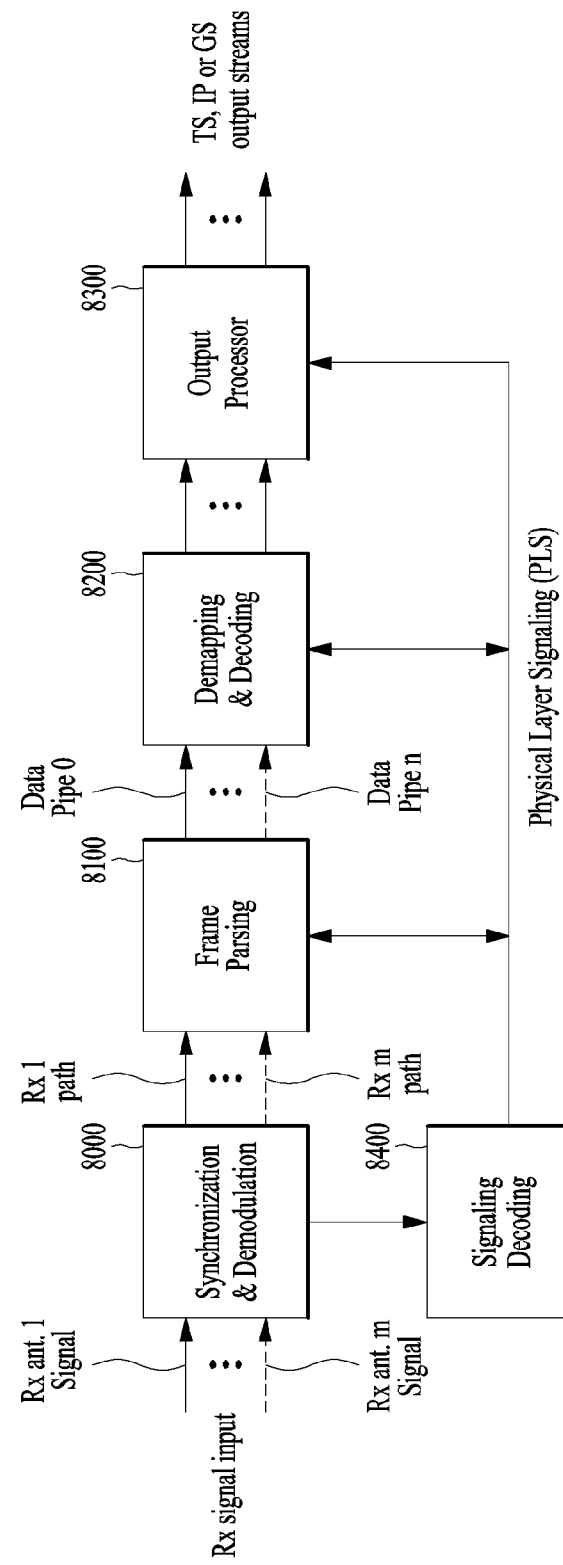
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 9:
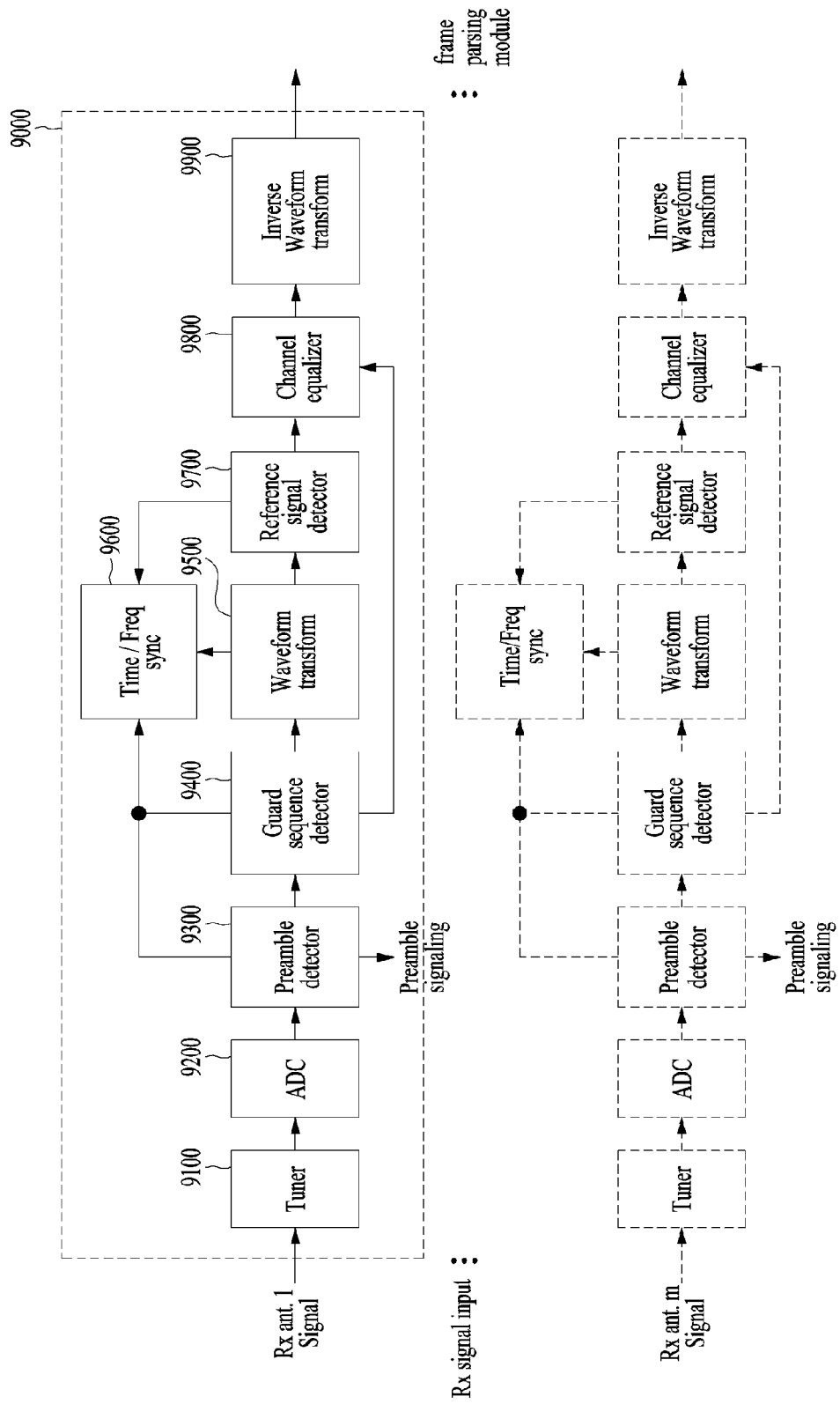
FIG. 9 illustrates a synchronization & demodulation module according to an embodiment of the present invention.

FIG. 9 illustrates a synchronization & demodulation module according to an embodiment of the present invention.

The synchronization & demodulation module shown in FIG. 9 corresponds to an embodiment of the synchronization & demodulation module described with reference to FIG. 8. The synchronization & demodulation module shown in FIG. 9 can perform a reverse operation of the operation of the waveform generation module illustrated in FIG. 7.

As shown in FIG. 9, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 10:
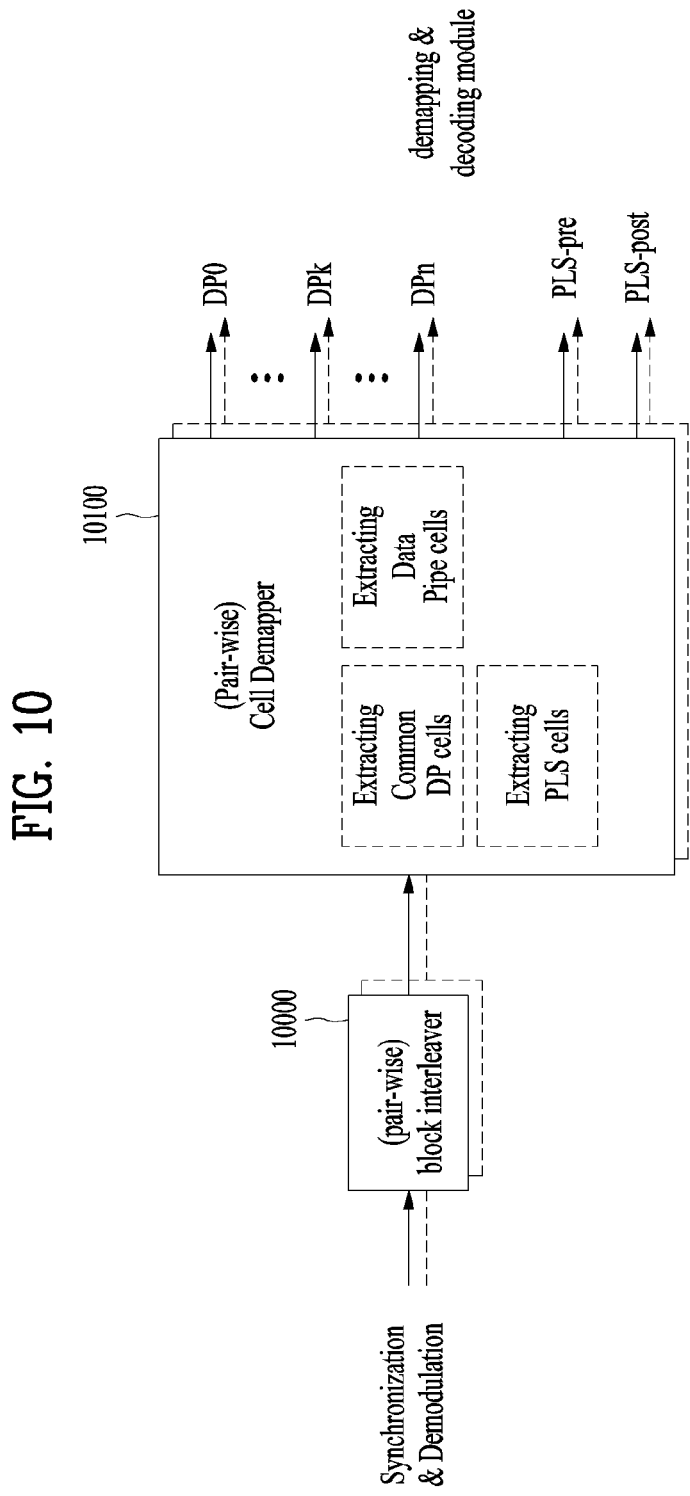
FIG. 10 illustrates a frame parsing module according to an embodiment of the present invention.

FIG. 10 illustrates a frame parsing module according to an embodiment of the present invention.

The frame parsing module illustrated in FIG. 10 corresponds to an embodiment of the frame parsing module described with reference to FIG. 8. The frame parsing module shown in FIG. 10 can perform a reverse operation of the operation of the frame structure module illustrated in FIG. 6.

As shown in FIG. 10, the frame parsing module according to an embodiment of the present invention can include at least one block interleaver 10000 and at least one cell demapper 10100.

The block interleaver 10000 can deinterleave data input through data paths of the m Rx antennas and processed by the synchronization & demodulation module on a signal block basis. In this case, if the apparatus for transmitting broadcast signals performs pair-wise interleaving as illustrated in FIG. 8, the block interleaver 10000 can process two consecutive pieces of data as a pair for each input path. Accordingly, the block interleaver 10000 can output two consecutive pieces of data even when deinterleaving has been performed. Furthermore, the block interleaver 10000 can perform a reverse operation of the interleaving operation performed by the apparatus for transmitting broadcast signals to output data in the original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 6, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 11:
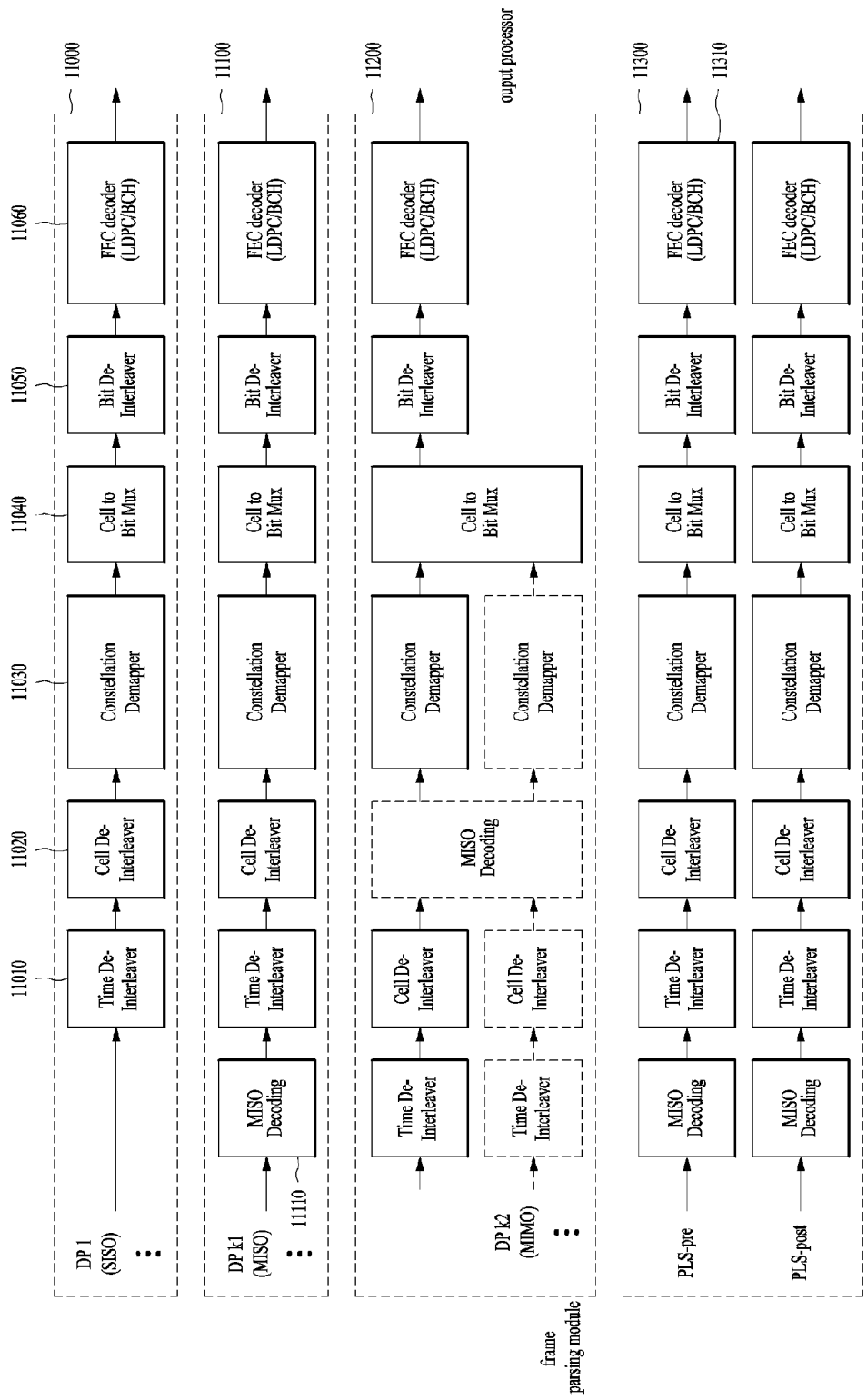
FIG. 11 illustrates a demapping & decoding module according to an embodiment of the present invention.

FIG. 11 illustrates a demapping & decoding module according to an embodiment of the present invention.

The demapping & decoding module shown in FIG. 11 corresponds to an embodiment of the demapping & decoding module illustrated in FIG. 8. The demapping & decoding module shown in FIG. 11 can perform a reverse operation of the operation of the coding & modulation module illustrated in FIG. 5.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 11 can include blocks for processing data output from the frame parsing module according to SISO, MISO and MIMO in response to the apparatus for transmitting broadcast signals.

As shown in FIG. 11, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 11 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 5. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 5. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 5. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 5. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 5. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 5. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 11. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 5. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 11. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 5. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 5.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 5. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 11.

Figure 12:
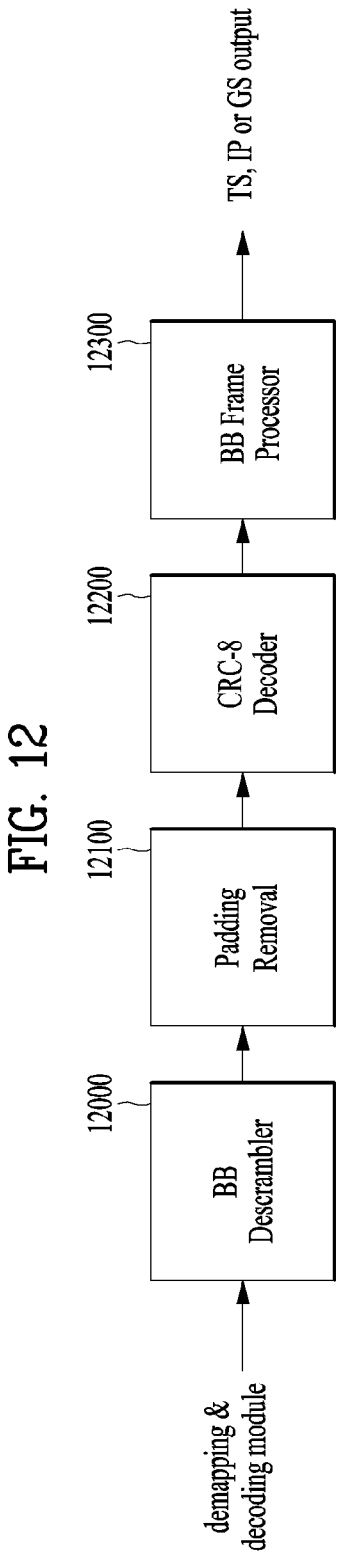
FIG. 12 illustrates an output processor according to an embodiment of the present invention.
Figure 13:
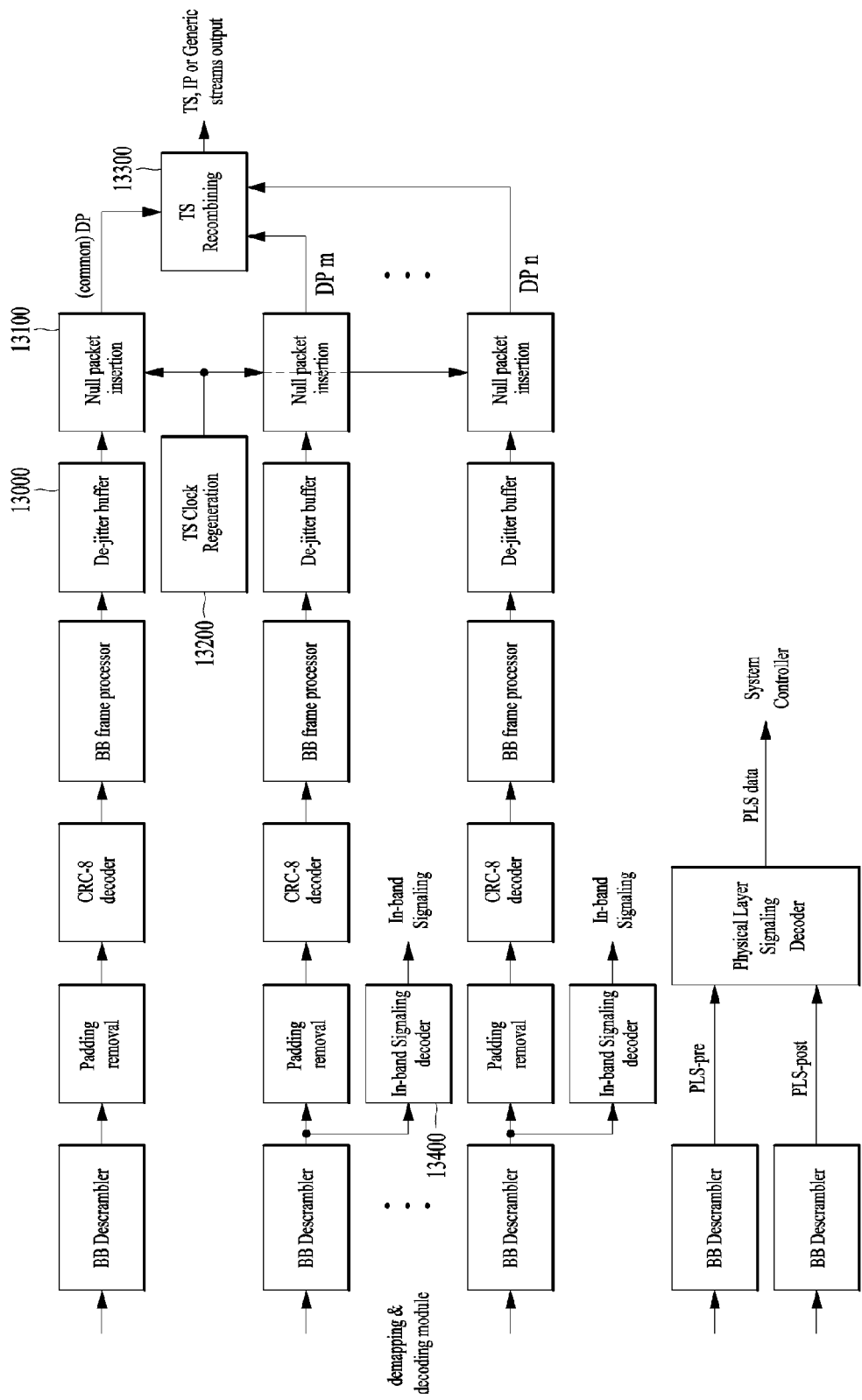
FIG. 13 illustrates an output processor according to another embodiment of the present invention.

FIGS. 12 and 13 illustrate output processors according to embodiments of the present invention.

FIG. 12 illustrates an output processor according to an embodiment of the present invention.

The output processor illustrated in FIG. 12 corresponds to an embodiment of the output processor illustrated in FIG. 8. The output processor illustrated in FIG. 12 receives a single data pipe output from the demapping & decoding module and outputs a single output stream. The output processor can perform a reverse operation of the operation of the input formatting module illustrated in FIG. 2.

The output processor shown in FIG. 12 can include a BB scrambler block 12000, a padding removal block 12100, a CRC-8 decoder block 12200 and a BB frame processor block 12300.

The BB scrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 13 illustrates an output processor according to another embodiment of the present invention.

The output processor shown in FIG. 13 corresponds to an embodiment of the output processor illustrated in FIG. 8. The output processor shown in FIG. 13 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 13 can include a BB descrambler block, a padding removal block, a CRC-8 decoder block and a BB frame processor block as the output processor illustrated in FIG. 12. The basic roles of these blocks correspond to those of the blocks described with reference to FIG. 12 although operations thereof may differ from those of the blocks illustrated in FIG. 12.

A de-jitter buffer block 13000 included in the output processor shown in FIG. 13 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 13 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 14:
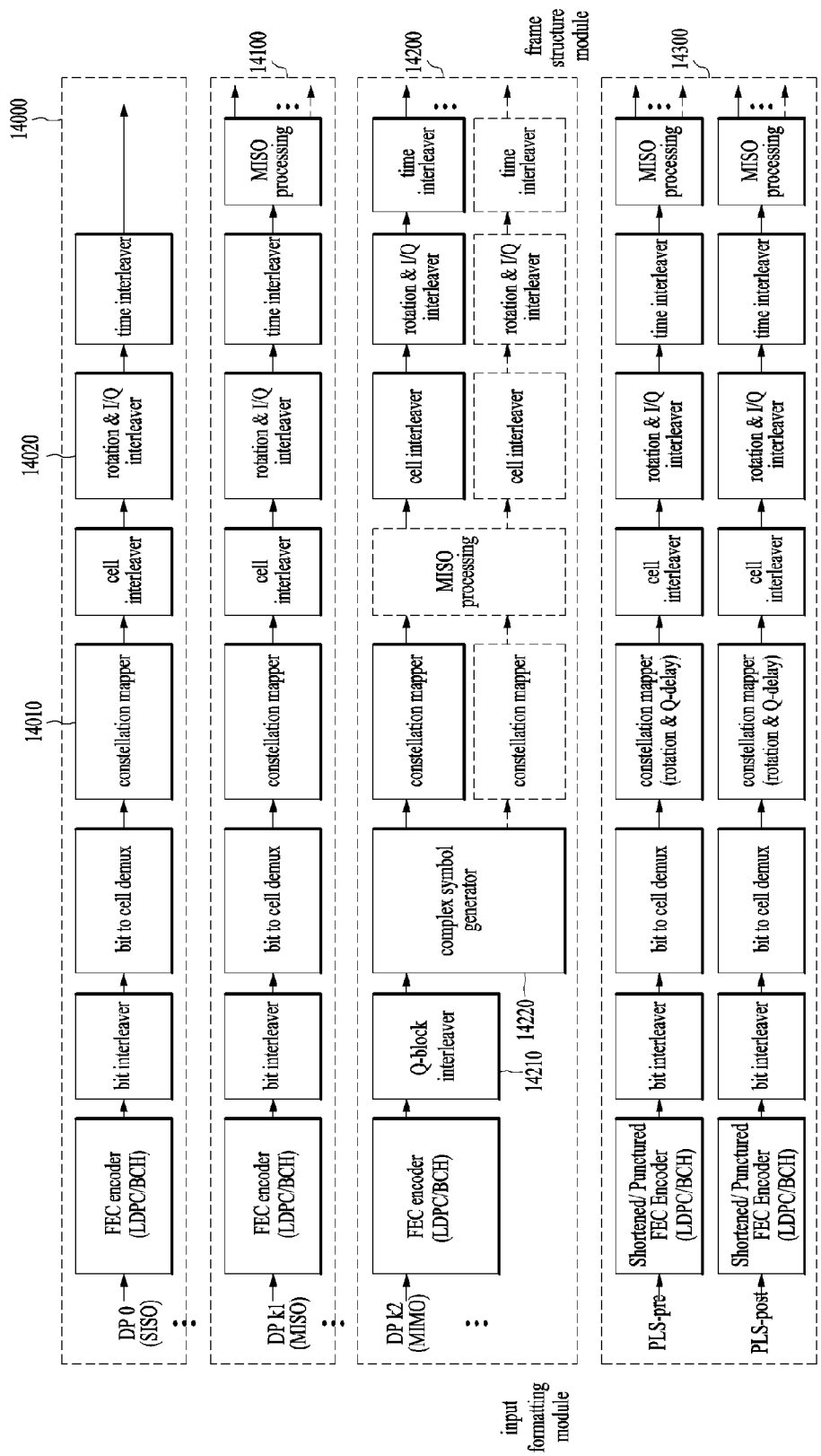
FIG. 14 illustrates a coding & modulation module according to another embodiment of the present invention.

FIG. 14 illustrates a coding & modulation module according to another embodiment of the present invention.

The coding & modulation module shown in FIG. 14 corresponds to another embodiment of the coding & modulation module illustrated in FIGS. 1 to 5.

To control QoS for each service or service component transmitted through each data pipe, as described above with reference to FIG. 5, the coding & modulation module shown in FIG. 14 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 14 are similar to the first to fourth blocks 5000 to 5300 illustrated in FIG. 5.

However, the first to fourth blocks 14000 to 14300 shown in FIG. 14 are distinguished from the first to fourth blocks 5000 to 5300 illustrated in FIG. 5 in that a constellation mapper 14010 included in the first to fourth blocks 14000 to 14300 has a function different from the first to fourth blocks 5000 to 5300 illustrated in FIG. 5, a rotation & I/Q interleaver block 14020 is present between the cell interleaver and the time interleaver of the first to fourth blocks 14000 to 14300 illustrated in FIG. 14 and the third block 14200 for MIMO has a configuration different from the third block 5200 for MIMO illustrated in FIG. 5. The following description focuses on these differences between the first to fourth blocks 14000 to 14300 shown in FIG. 14 and the first to fourth blocks 5000 to 5300 illustrated in FIG. 5.

The constellation mapper block 14010 shown in FIG. 14 can map an input bit word to a complex symbol. However, the constellation mapper block 14010 may not perform constellation rotation, differently from the constellation mapper block shown in FIG. 5. The constellation mapper block 14010 shown in FIG. 14 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & I/Q interleaver block 14020 is two or more which can be changed by the designer. In addition, the rotation & I/Q interleaver block 14020 may not interleave the in-phase component.

The rotation & I/Q interleaver block 14020 is commonly applicable to the first to fourth blocks 14000 to 14300, as described above. In this case, whether or not the rotation & I/Q interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 14.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 14, can output data pipes, PLS-pre information and PLS-post information processed for respective paths to the frame structure module.

Figure 15:
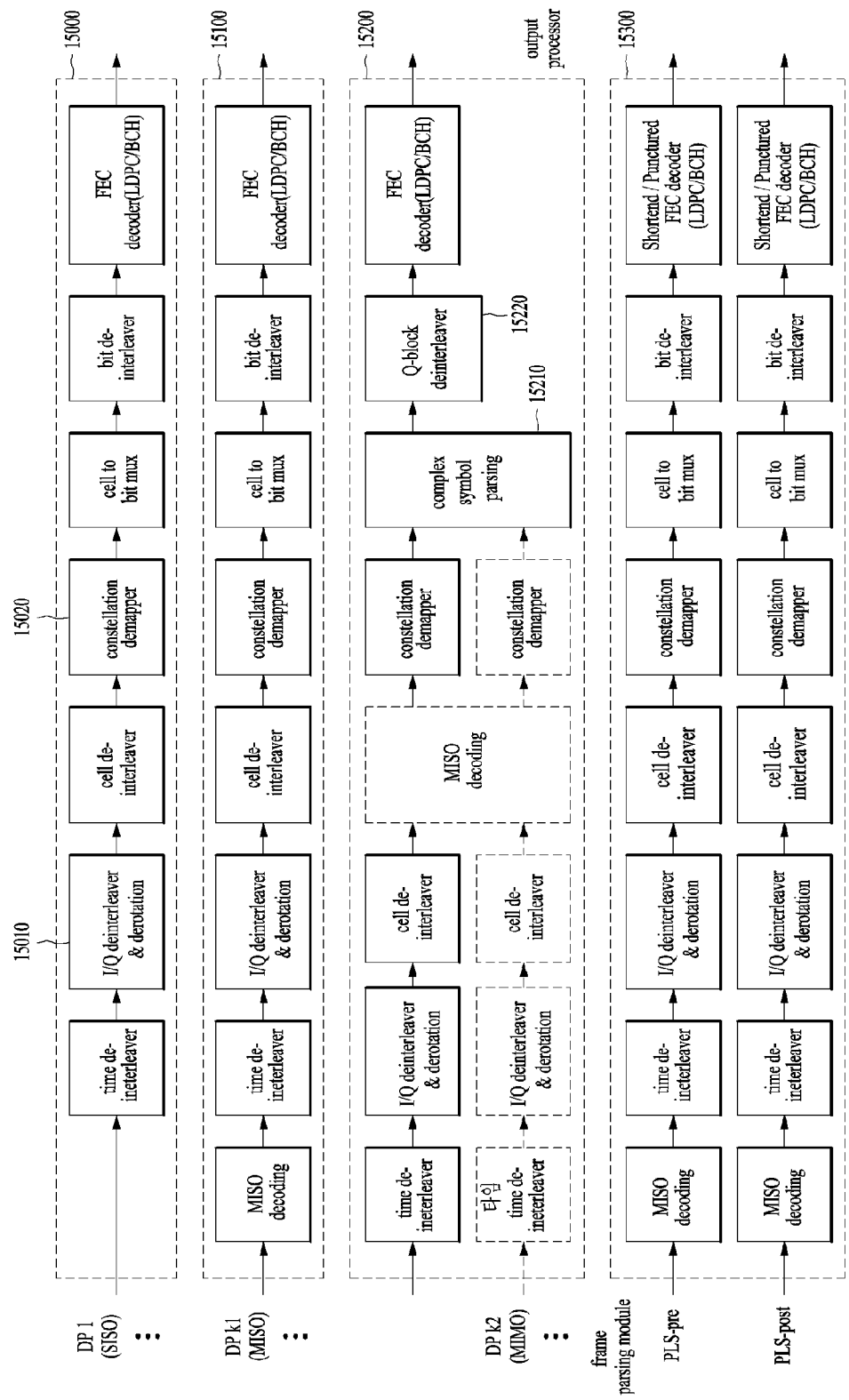
FIG. 15 illustrates a demapping & decoding module according to another embodiment of the present invention.

FIG. 15 illustrates a demapping & decoding module according to another embodiment of the present invention.

The demapping & decoding module shown in FIG. 15 corresponds to another embodiment of the demapping & decoding module illustrated in FIG. 11. The demapping & decoding module shown in FIG. 15 can perform a reverse operation of the operation of the coding & modulation module illustrated in FIG. 14.

As shown in FIG. 15, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 15 are similar to the first to fourth blocks 11000 to 11300 illustrated in FIG. 11.

However, the first to fourth blocks 15000 to 15300 shown in FIG. 15 are distinguished from the first to fourth blocks 11000 to 11300 illustrated in FIG. 11 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 11 and the third block 15200 for MIMO has a configuration different from the third block 11200 for MIMO illustrated in FIG. 11. The following description focuses on these differences between the first to fourth blocks 15000 to 15300 shown in FIG. 15 and the first to fourth blocks 11000 to 11300 illustrated in FIG. 11.

The I/Q deinterleaver & derotation block 15010 can perform a reverse process of the process performed by the rotation & I/Q interleaver block 14020 illustrated in FIG. 14. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 14. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 15.

The complex symbol parsing block 15210 can perform a reverse process of the process performed by the complex symbol generator block 14220 illustrated in FIG. 14. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 14. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 15, the demapping & decoding module according to another embodiment of the present invention can output data pipes and PLS information processed for respective paths to the output processor.

Figure 16:
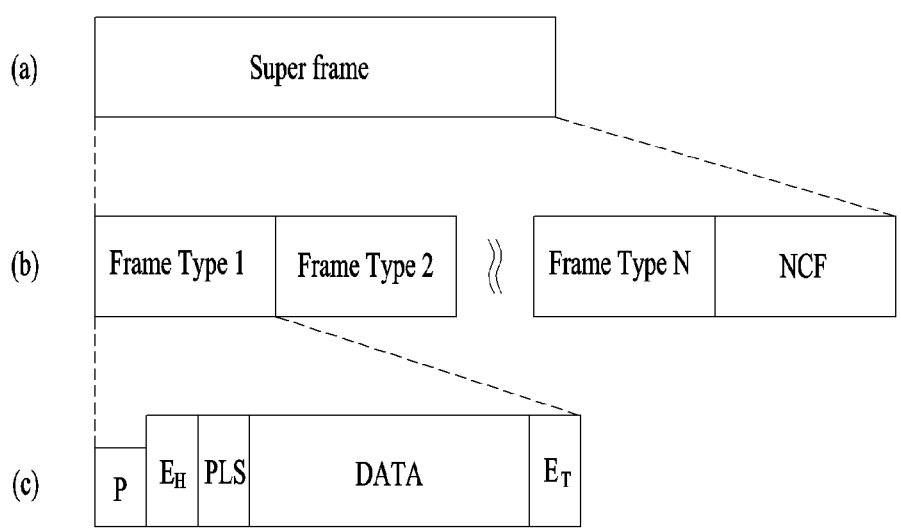
FIG. 16 illustrates a frame structure of a broadcast system according to an embodiment of the present invention.

FIG. 16 illustrates a frame structure of a broadcast system according to an embodiment of the present invention.

The cell mapper included in the frame structure module described above may deploy, in a signal frame, cells transmitting input DP data which is SISO-, MISO- or MIMO-processed, cells transmitting a common DP and cells transmitting PLS data according to the scheduling information. Signaling frames generated after this signal frame may be consecutively transmitted.

The apparatus and method for transmitting broadcast signals according to an embodiment of the present invention may multiplex and transmit signals of different broadcast transmission and reception systems on the same RF channel. The apparatus and method for receiving broadcast signals according to an embodiment of the present invention may correspondingly process the signals. Accordingly, the broadcast signal transmission and reception systems according to an embodiment of the present invention may provide a flexible broadcast transmission and reception system.

Accordingly, the apparatus for transmitting broadcast signals according to an embodiment of the present invention may consecutively transmit a plurality of super frames carrying data related to a broadcast service.

FIG. 16(*a*) illustrates a super frame according to an embodiment of the present invention, and FIG. 16(*b*) illustrates configuration of the super frame according to an embodiment of the present invention. As shown in FIG. 16(*b*), a super frame may include a plurality of signal frames and a non-compatible frame (NCl). The signal frame according to an embodiment of the present invention is a TDM (Time Division Multiplexing) signal frame of a physical layer end generated by the aforementioned frame structure module, and the NCF is a frame which can be used for a new broadcast service system in the future.

The apparatus for transmitting broadcast signals according to an embodiment of the present invention may multiplex and transmit various services such as a UHD service, Mobile service and MISO/MIMO service on the frame-by-frame basis in order to provide the services through one RF at the same time. The different broadcast services may require different reception environments and different transmission processes according to characteristics and purposes of the broadcast services.

Therefore, different services may be transmitted in a signal frame unit, and each signal frame may be defined as a different frame type according to the transmitted service. In addition, data included in respective signal frames may be processed by different transmission parameters, and the respective signal frames may have different FFT sizes and guard intervals according to broadcast services transmitted through the respective signal frames.

Accordingly, as shown in FIG. 16(b), signal frames of different types for transmitting different services may be multiplexed and transmitted in one super frame according to the TDM scheme.

The frame type according to an embodiment of the president mansion may be defined as a combination of an FFT mode, a guard interval mode and pilot pattern information, and the information about the frame type may be transmitted through the preamble region in the signal frame. A relevant detailed description will be given later in this specification.

In addition, configuration information on the signal frames included in a super frame may be signaled through the aforementioned PLS and changed on a super frame-by-super frame basis.

FIG. 16(c) illustrates configuration of respective frames. Each signal frame may include Head/Tail Edge symbols (EH, ET), at least one PLS symbol, and a plurality of data symbols. The number of symbols included in each signal frame may be changed depending on the intention of the designer.

The preamble is positioned at the foremost part of the signal frame, and may carry basic transmission parameters for identifying the broadcast system and the type of the signal frame and information for synchronization. Accordingly, the apparatus for receiving broadcast signals according to an embodiment of the present invention may detect the preamble of a signal frame first, thereby identifying the broadcast system and the frame type, selectively receiving and decoding a broadcast signal corresponding to the type of the receiver.

The head/tail edge symbols may be positioned behind the preamble of each signal frame or on the tail of the signal frame. In the present invention, if an edge symbol is positioned behind the preamble, the edge symbol may be referred as a head edge symbol. If an edge symbol is positioned on the tail of the signal frame, the edge symbol may be referred to as a tail edge symbol. The name, positions or the number of edge symbols may be changed depending on the intention of the designer. The head/tail edge symbols may be inserted into each signal frame to support free preamble design and multiplexing of signal frames of different frame types. An edge symbol may include more pilots than the data symbols in order to enable frequency-only interpolation and time interpolation between data symbols. Accordingly, the pilot pattern of edge symbols is denser than the pilot pattern of the data symbols.

The PLS symbol, which is intended for transmission of PLS data, may include additional system information (network topology/configuration, PAPR use, etc.), frame type ID/configuration information, and information necessary to extract and decode each DP.

The data symbol is intended for transmission of DP data, and the aforementioned cell mapper may deploy a plurality of DPs on the data symbol.

Hereinafter, DPs according to an embodiment of the present invention will be described.

Figure 17:
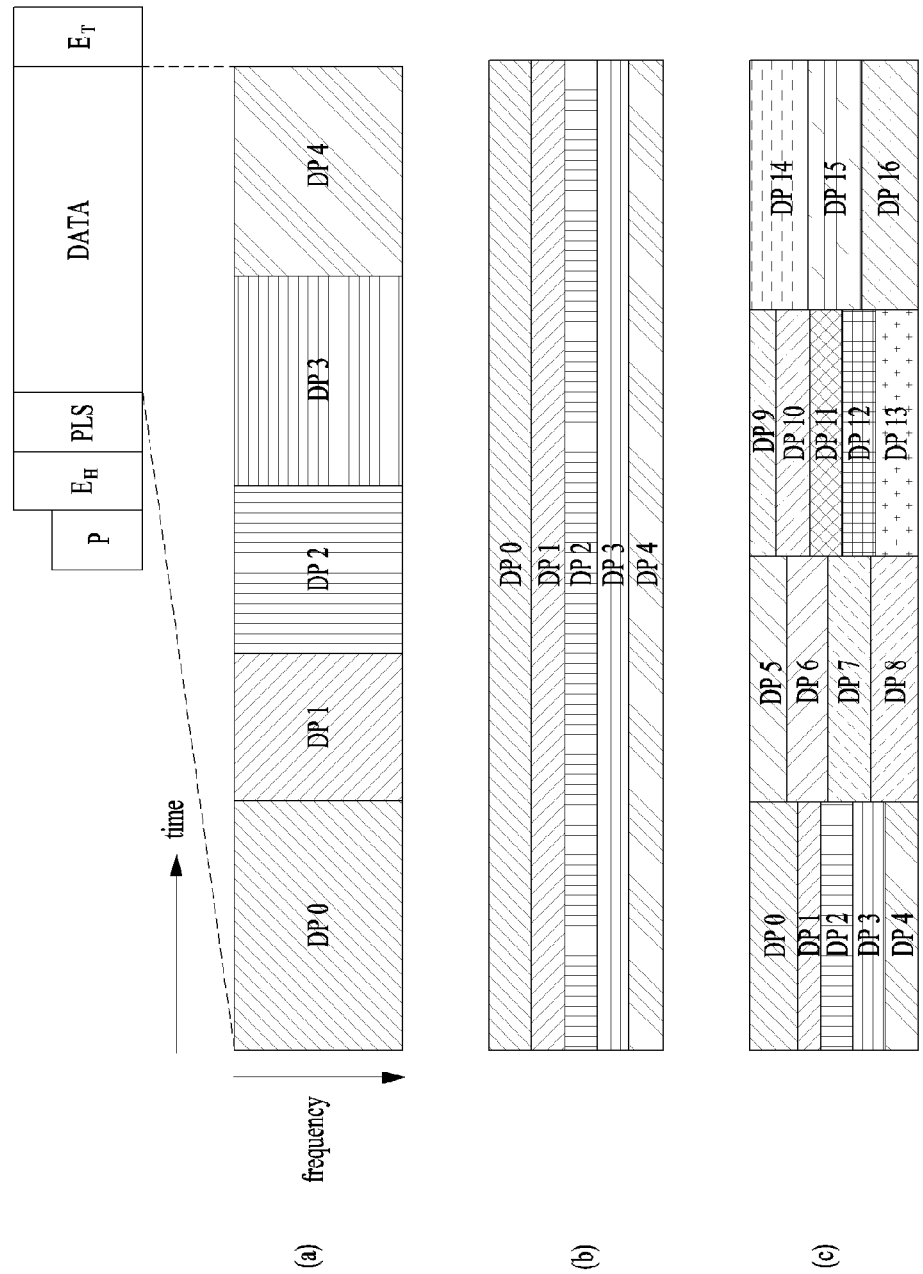
FIG. 17 illustrates DPs according to an embodiment of the present invention.

FIG. 17 illustrates DPs according to an embodiment of the present invention.

As described above, the data symbol of a signal frame may include a plurality of DPs. DPs according to an embodiment of the present invention may be classified into type 1 to type 3 according to the mapping (deployment) scheme in a signal frame.

FIG. 17(a) illustrates type 1 DPs mapped to the data symbol of a signal frame, FIG. 17(b) illustrates type 2 DPs mapped to the data symbol of a signal frame, and FIG. 17(c) illustrates type 3 DPs mapped to the data symbol of a signal frame. Each figure shows only the data symbol region of the signal frame, in which the horizontal axis represents time and the vertical axis represents frequency. Hereinafter, description will be given of each figure.

As shown in FIG. 17(a), type 1 DPs represent DPs mapped to a signal frame according to the TDM scheme.

That is, the frame structure module (the cell mapper) according to an embodiment of the present invention may perform mapping of cells of DPs along the frequency axis when mapping type 1 DPs to a signal frame. Specifically, the frame structure module (the cell mapper) may map cells of DP0 to an OFDM symbol along the frequency axis. When the OFDM symbol is full, the module may shift to the next OFDM symbol and map cells of DP0 to the next OFDM symbol along the frequency axis. When all cells of DP0 are mapped, cells of DP1 and DP2 may be mapped to the signal frame in the same manner. In this case, the frame structure module (the cell mapper) according to an embodiment of the present invention may perform mapping of the respective DPs at certain intervals.

Since cells of type 1 DPs are mapped as densely as possible along the time axis, type 1 DPs may minimize the operation time of the receiver compared to the other type DPs. Accordingly, type 1 DP is suitable for transmitting a corresponding service to a broadcast signal reception apparatus for which power saving should be preferentially considered, such as a handheld device or a portable device which is driven by battery.

As shown in FIG. 17(b), type 2 DPs represent DPs mapped to a signal frame according to the frequency division multiplexing (FDM) scheme.

That is, the frame structure module (the cell mapper) according to the embodiment of the present invention may perform mapping of the cells of the type 2 DPs along the time axis. Specifically, the frame structure module (the cell mapper) may map cells of DP0 at the first frequency of one OFDM symbol along the time axis first. Thereafter, when cells of DP0 are mapped up to the last symbol of a signal frame, the frame structure module (the cell mapper) may perform mapping of cells of DP0 at the second frequency of the first OFDM symbol again in the same manner.

Since cells of type 2 DPs are transmitted by being distributed as widely as possible in the time domain, type 2 DPs are more suitable for acquisition of time diversity than the other type DPs. However, a longer operation time is required for the receiver to extract the type 2 DPs than type 1 DPs, and it is difficult to acquire power saving with the type 2 DPs. Accordingly, type 2 DPs are suitable for transmission of a service to a fixed broadcast signal reception apparatus to which power is stably supplied.

As cells of type 2 DPs tend to be intensively mapped around a specific frequency, a receiver in a channel selective environment may have difficulty in receiving a specific DP. Accordingly, if frequency interleaving is applied on the symbol-by-symbol basis after cell mapping is performed, frequency diversity may be additionally acquired and therefore the aforementioned problem may be solved.

As shown in FIG. 7(c), type 3 DP, which is compromise between type 1 DP and type 2 DP, represents DPs mapped to a signal frame according to the time-frequency division multiplexing (TFDM) scheme.

When the frame structure module (or the cell mapper) according to an embodiment of the present invention maps type 3 DPs to a signal frame, the frame structure module (or the cell mapper) may equally partition the signal frame into regions, define each partitioned region as a slot, and map the cells of a corresponding DP along the time axis only in the corresponding slot.

Specifically, the frame structure module (or cell mapper) according to an embodiment of the present invention may map cells of DP 0 at the first frequency of the first OFDM symbol along the time axis first. Thereafter, once cells of DP0 are mapped to the last OFDM symbol of a slot on the time axis, the frame structure module (or cell mapper) may perform mapping of cells of DP0 from the second frequency of the first OFDM symbol in the same manner.

In this case, time diversity and power saving may be traded off according to the number and length of slots of the partitioned signal frame. For example, if the signal frame is partitioned into a small number of slots, each slot becomes long, and therefore time diversity may be acquired as in the case of type 2 DPs. If the signal frame is partitioned into a large number of slots, each slot becomes short and thus a power saving effect may be acquired as in the case of type 1 DPs.

Figure 18:
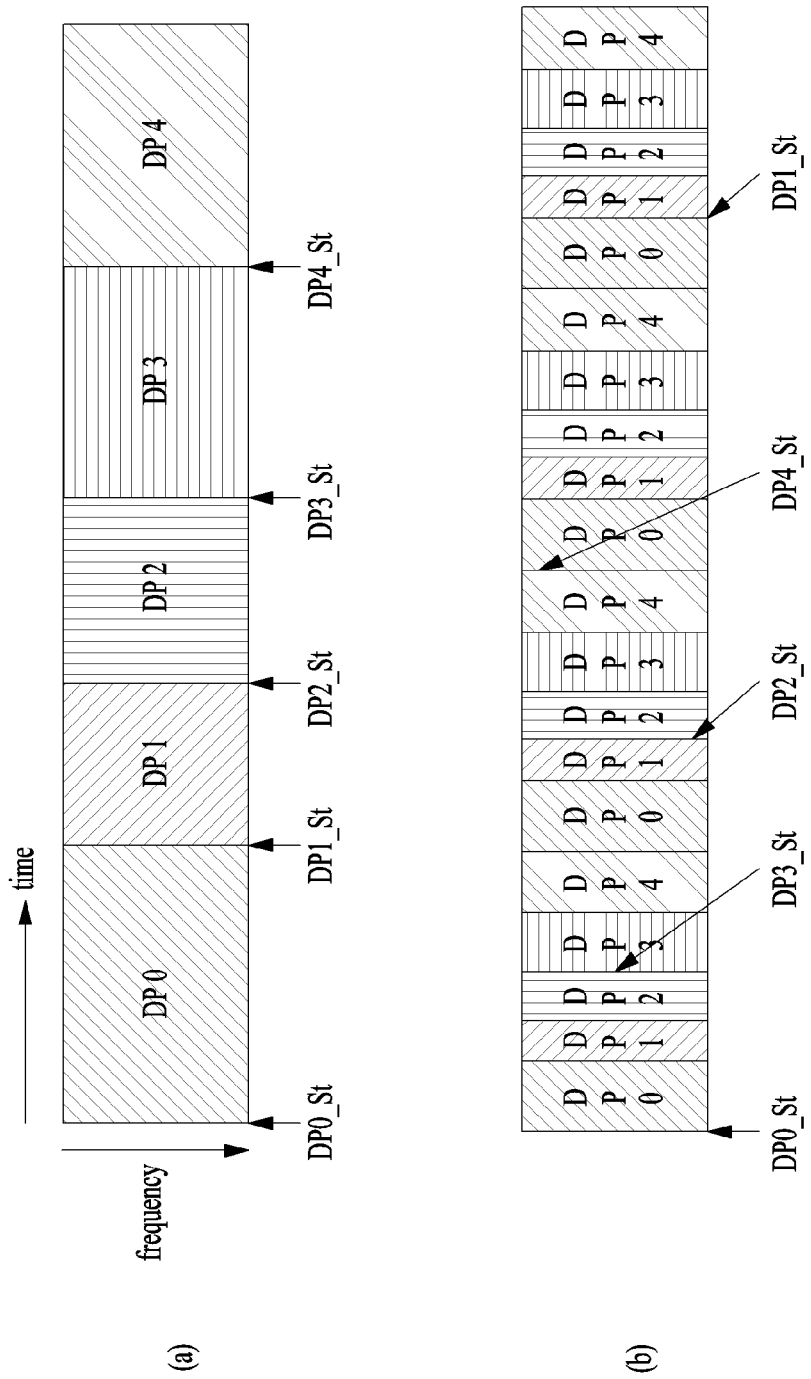
FIG. 18 illustrates type 1 DP according to an embodiment of the present invention.

FIG. 18 illustrates type 1 DPs according to an embodiment of the present invention.

FIG. 18 illustrates an embodiment of mapping type 1 DPs to a signal frame according to the number of slots. Specifically, FIG. 18(a) illustrates the result of mapping of type 1 DPs when the number of slots is 1, and FIG. 18(b) illustrates the result of mapping of type 1 DPs when the number of slots is 4.

In order for the broadcast signal reception apparatus according to an embodiment of the present invention to extract cells of respective DPs from the signal frame to which the DPs are mapped, signaling information such as type information on each DP, DP start address information indicating the addresses to which the first cells of the respective DPs are mapped and information on the number of FEC blocks of the respective DPs are needed.

Accordingly, as shown in FIG. 18(a), the broadcast signal transmission apparatus according to an embodiment of the present invention may transmit signaling information including the DP start address information (DP0_St, DP1_St, DP2_St, DP3_St, DP4_St) indicating the addresses to which the first cells of the respective DPs are mapped.

FIG. 18(b) illustrates the result of mapping of type 1 DPs obtained when the number of slots is 4. The DPs mapped to each slot may be mapped on the frequency axis. As described above, if the number of slots increases, time diversity may be obtained since cells corresponding to a DP are mapped by being distributed at certain intervals. However, the number of cells of one DP mapped to a signal frame may vary among slots since the cells of the DP cannot be divided by the number of slots. Accordingly, if a mapping rule is established in consideration of this feature, the addresses in each slot to which the first cells of the respective DPs are mapped may be any positions in the signal frame. A detailed description of the mapping method will be given later. In addition, when a signal frame is partitioned into a plurality of slots, information indicating the number of slots is needed for the broadcast signal reception apparatus to acquire cells of a DP. In the present invention, the information indicating the number of slots may be expressed as N_Slot. Accordingly, the number of slots of the signal frame in FIG. 18(a) may be expressed as N_Slot=1, and the number of slots of the signal frame in FIG. 18(b) may be expressed as N_Slot=4.

Figure 19:
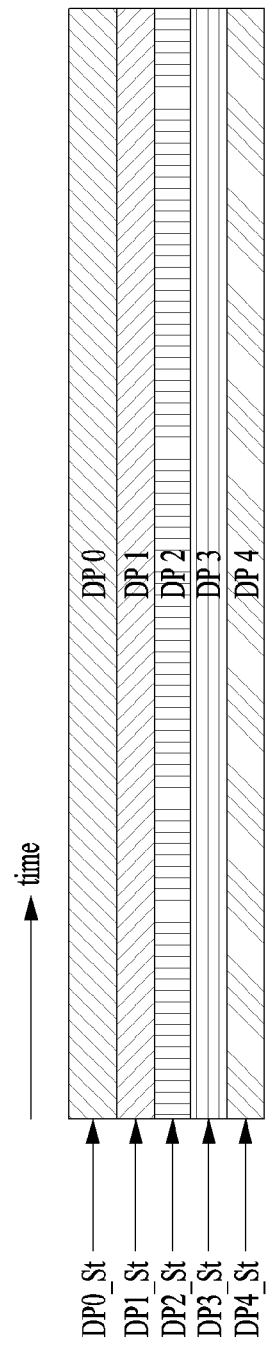
FIG. 19 illustrates type 2 DPs according to an embodiment of the present invention.

FIG. 19 illustrates type 2 DPs according to an embodiment of the present invention.

As described above, cells of type 2 DPs are mapped on the time axis. When cells of the DPs are mapped up to the last OFDM symbol of a signal frame along the time axis, mapping of cells of the DPs may be performed again from the second frequency of the first OFDM symbol in the same manner.

As described above with reference to FIG. 18, in order for the broadcast signal reception apparatus to extract cells of type 2 DPs from a signal frame to which type 2 DPs are mapped, type information on the respective DPs, DP start address information indicating the addresses to which the first cells of the respective DPs are mapped, and information on the number of FEC blocks of the respective DPs allocated to the signal frame are needed.

Accordingly, as shown in FIG. 19, the broadcast signal transmission apparatus according to an embodiment of the present invention may transmit the DP start address information (DP0_St, DP1_St, DP2_St, DP3_St, DP4_St) indicating the addresses to which the first cells of the respective DPs are mapped. In the case of FIG. 19, the number of slots is 1, and thus the number of slots of the signal frame shown in FIG. 19 may be expressed as N_Slot=1.

Figure 20:
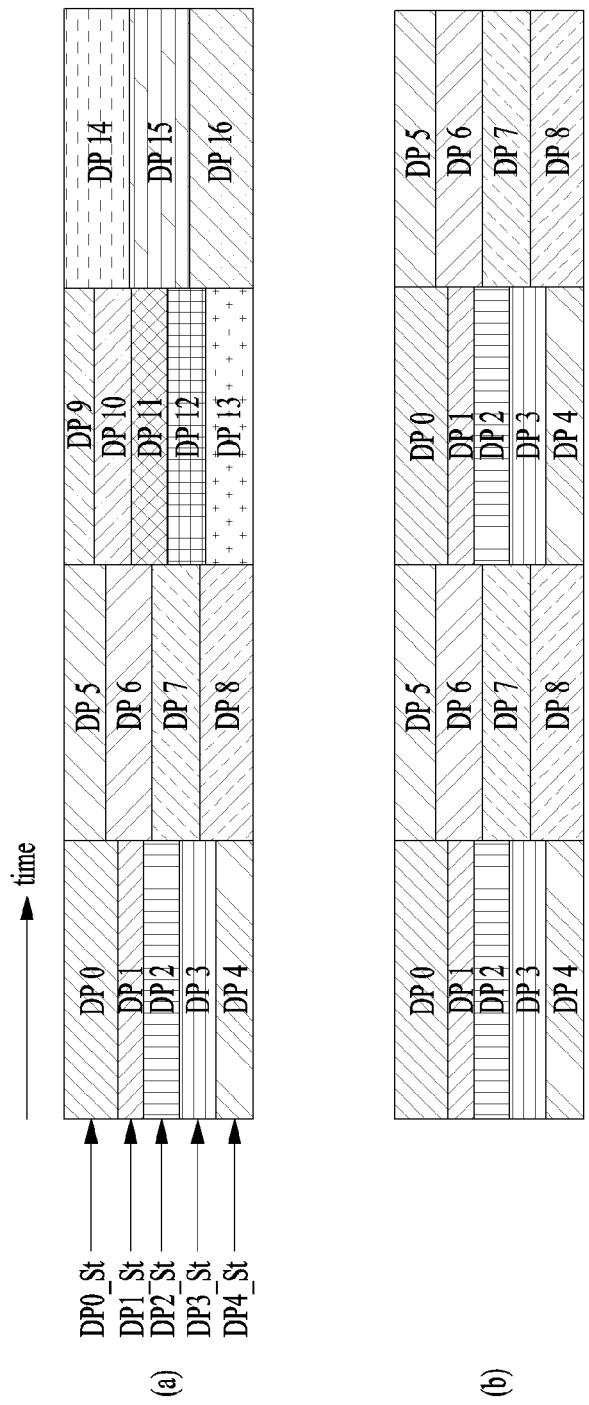
FIG. 20 illustrates type 3 DPs according to an embodiment of the present invention.

FIG. 20 illustrates type 3 DPs according to an embodiment of the present invention.

As described above, type 3 DPs are DPs, which are mapped to the signal frame according to the time-frequency division multiplexing (TFDM) scheme, may be used when it is necessary to eliminate or add as much time diversity as needed to acquire the power saving effect. Similar to the case of type 2 DPs, frequency diversity may be acquired from type 3 DPs by applying frequency interleaving which can be applied on the OFDM symbol-by-OFDM symbol basis.

FIG. 20(a) illustrates a case where one DP is mapped to one slot in a signal frame, and FIG. 20(b) illustrates a case where one DP is divided and mapped to one or more slots in a signal frame. In both FIGS. 20(a) and 20(b), the number of slots is 4, and thus the number of slots in the signal frame may be expressed as N_Slot=4.

In addition, as shown in FIGS. 18 and 19, the broadcast signal transmission apparatus according to an embodiment of the present invention may transmit DP start address information (DP0_St, DP1_St, DP2_St, DP3_St, DP4_St) indicating the addresses to which the first cells of the respective DPs are mapped.

The case of FIG. 20(b) may acquire time diversity different from that of the case of FIG. 20(a). In this case, additional signaling information may be needed.

As described above with reference to FIGS. 18 to 20, the broadcast signal transmission apparatus according to an embodiment of the present invention may transmit the signaling information including the DP start address information (DP0_St, DP1_St, DP2_St, DP3_St, DP4_St) indicating the addresses to which the first cells of the respective DPs are mapped.

In this case, the broadcast signal transmission apparatus according to an embodiment of the present invention may transmit DP start address information only for the DP0 that is mapped first and offset values of the other DPs with respect to the start address information on DP0. If the DPs are equally mapped, the mapping interval of the DPs is constant, and thus the receiver may acquire the start position of each DP using the information on the start position of a reference DP and offset values. Specifically, if the broadcast signal transmission apparatus according to an embodiment of the present invention transmits the start address information on DP0 along with offset information on a certain size, the reception apparatus according to the embodiment of the present invention may recognize the start position of DP1 by adding the offset information to the start address information on DP0. In the same way, the reception apparatus may recognize the start position of DP2 by adding the offset information to the start address information on DP0 twice. If the DPs are not equally mapped, the broadcast signal transmission apparatus may transmit the start address information on DP0 and offset values indicating spacing between the DPs with respect to the start position of DP0. In this case, the offset values may be equal or different. In addition, the offset values may be transmitted through PLS signaling information or in-band signaling information of FIG. 33, which will be described later. The transmission method for the offset values may be changed depending on the intention of the designer.

Hereinafter, a description will be given of a DP mapping method employing resource blocks (RBs) according to an embodiment of the present invention.

An RB, which is a block of a certain unit for mapping DPs, may be referred to as a data mapping unit in the present invention. Resource allocation on the RB-by-RB basis may allow intuitive and easy execution of DP scheduling and power saving control. The name of the RB according to an embodiment of the present invention may be changed depending on the intention of the designer, and the size of an RB may be set without limitation as long as there is no problem with bit-rate granularity.

According to an embodiment of the present invention described below, the size of an RB may be an integer multiple or a divisor of the number of active carriers (hereinafter, referred to as NoA) capable of actually carrying data within an OFDM symbol. The size of an RB may be changed depending on the intention of the designer. If the size of an RB increases, resource allocation may be simplified. However, the RB size needs to be properly determined since the RB size represents the minimum unit of a bit rate that is substantially supportable.

Figure 21:
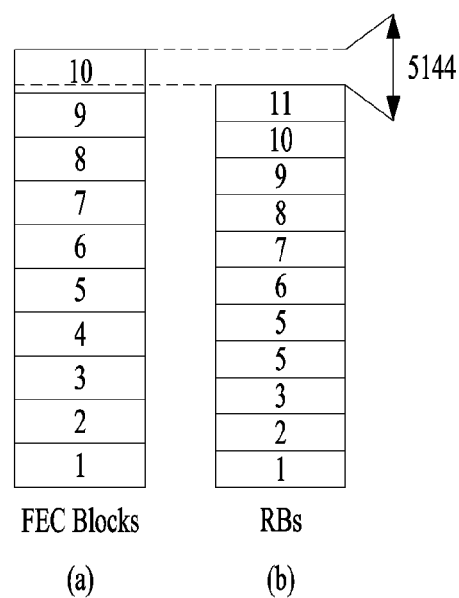
FIG. 21 illustrates RBs according to an embodiment of the present invention.

FIG. 21 illustrates RBs according to an embodiment of the present invention.

FIG. 21 illustrates an embodiment of mapping FEC blocks to a signal frame through RBs when the number of FEC blocks of DP0 is 10. As an example, the length of an LDPC block and the QAM modulation value are 64K and 256QAM respectively as transmission parameters of DP0. Suppose that the FFT mode of a signal frame is 32K, and the scattered pilot pattern is PP32-2 (namely, the interval of pilots carrying carriers is Dx=32, and the number of symbols constituting one scattered pilot pattern is Dy=2. In this case, it may be assumed that the size of an FEC block corresponds to 8100 cells, and the NoA is 27584. If the size of an RB is assumed to be a value obtained by dividing the NoA by 4, the size of an RB corresponds to 6896 cells, and may be expressed as L_RB=NoA/4.

In this case, when the size of FEC blocks is compared with the size of an RB on the cell-by-cell basis, a relationship is formed as 10×the size of an FEC block=11×the size of an RB+5144. Accordingly, in order to map 10 FEC blocks to one signal frame on the RB-by-RB basis, the frame structure module (or cell mapper) according to an embodiment of the present invention may map the data of 10 FEC blocks to 11 RBs, map the 11 RBs to the current signal frame, and the other part corresponding to 5144 cells may be mapped to the next signal frame along with the next FEC blocks.

Figure 22:
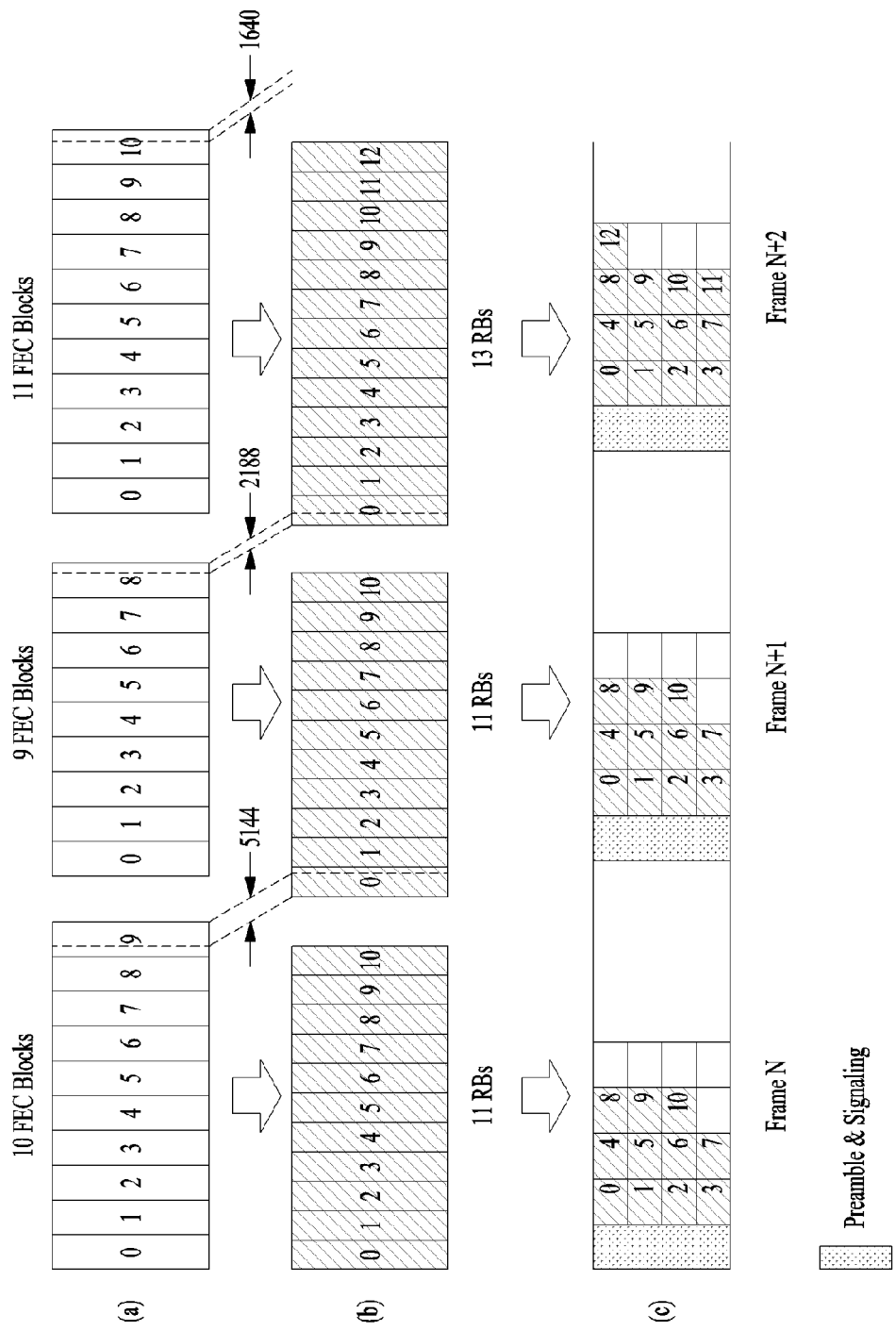
FIG. 22 illustrates fame mapping of RBs according to an embodiment of the present invention.

FIG. 22 illustrates fame mapping of RBs according to the embodiment of the present invention.

Specifically, FIG. 22 illustrates transmission of consecutive signal frames.

When a variable bit rate is supported, the number of FEC blocks which can be transmitted through one signal frame may vary from one signal frame to another.

FIG. 22(a) illustrates transmission of 10 FEC blocks through signal frame N, transmission of 9 FEC blocks through signal frame N+1, and transmission of 11 FEC blocks through signal frame N+2.

FIG. 22(b) illustrates a case where the number of RBs to be mapped to signal frame N is 11, a case where the number of RBs to be mapped to signal frame N+1 is 11, and a case where the number of RBs to be mapped to signal frame N+2 is 13.

FIG. 22(c) illustrates the results of mapping of RBs to signal frame N, signal frame N+1 and signal frame N+2.

As shown in FIGS. 22(a) and 22(b), when the number of FEC blocks transmitted through signal frame N is 10, the size of 10 FEC blocks is equal to the sum of the size of 11 RBs and 5144, and therefore transmission may be performed with the 11 RBs mapped to signal frame N as shown in FIG. 22(c).

In addition, as can be seen from the middle diagram of FIG. 22(b), the other 5144 cells constitute the head part of the first RB among the 11 RBs to be mapped to signal frame N+1. Accordingly, a relationship is formed as 5144 cells+the size of 9 FCC blocks=the size of 11 RBs+2188 cells, and thus 11 RBs are mapped to signal frame N+1 in performing transmission, and the other 2188 cells constitute the head part of the first RB of the 13 RBs to be mapped to signal frame N+2. In the same manner, a relationship is formed as 2188 cells+11 FCC blocks=the size of 13 RBs+1640 cells, and thus 13 RBs are mapped to signal frame N+2 in performing transmission, and the other 1640 cells are mapped to the next signal frame in performing transmission. Since the size of FEC blocks is not equal to the NoA, dummy cells may be inserted. However, the method illustrated in FIG. 22 eliminates the need for insertion of dummy cells. Accordingly, data may be more efficiently transmitted in actuality using the illustrated method. In addition, time interleaving or a similar operation may be performed on RBs to be mapped to each signal frame before the RBs are mapped to the signal frames, which may be changed depending on the intention of the designer.

Hereinafter, a description will be given of a method for mapping DPs to a signal frame on the RB-by-RB basis according to DP types.

Specifically, in the present invention, a description will be given of an RB mapping method which is used when a plurality of DPs is allocated to available RBs in all signal frames and when the DPs are allocated to only some RBs. According to an embodiment of the present invention, the number of DPs is 3, the number of RBs in one signal frame is 80, and the size of an RB is the NoA divided by 4. The respective numbers may be expressed as follows.

The number of DPs, N_DP=3
The number of RBs in one signal frame, N_RB=80
The size of an RB L_RB=NoA/4

According to an embodiment of the present invention, a plurality of DPs (DP0, DP1 and DP2) is allocated to RBs available in one signal frame. In this embodiment, DP0 fills 31 RBs, DP1 fills 15 RBs, and DP2 fills 34 RBs. This relationship may be expressed as follows.

{DP0, DP1, DP2}={31,15,34}

According to an embodiment of the present invention, a plurality of DPs (DP0, DP1 and DP2) is allocated to RBs available in one signal frame. In this embodiment, DP0 fills 7 RBs, DP1 fills 5 RBs, and DP2 fills 6 RBs. This relationship may be expressed as follows.

{DP0, DP1, DP2}={7,5,6}

Figure 23:
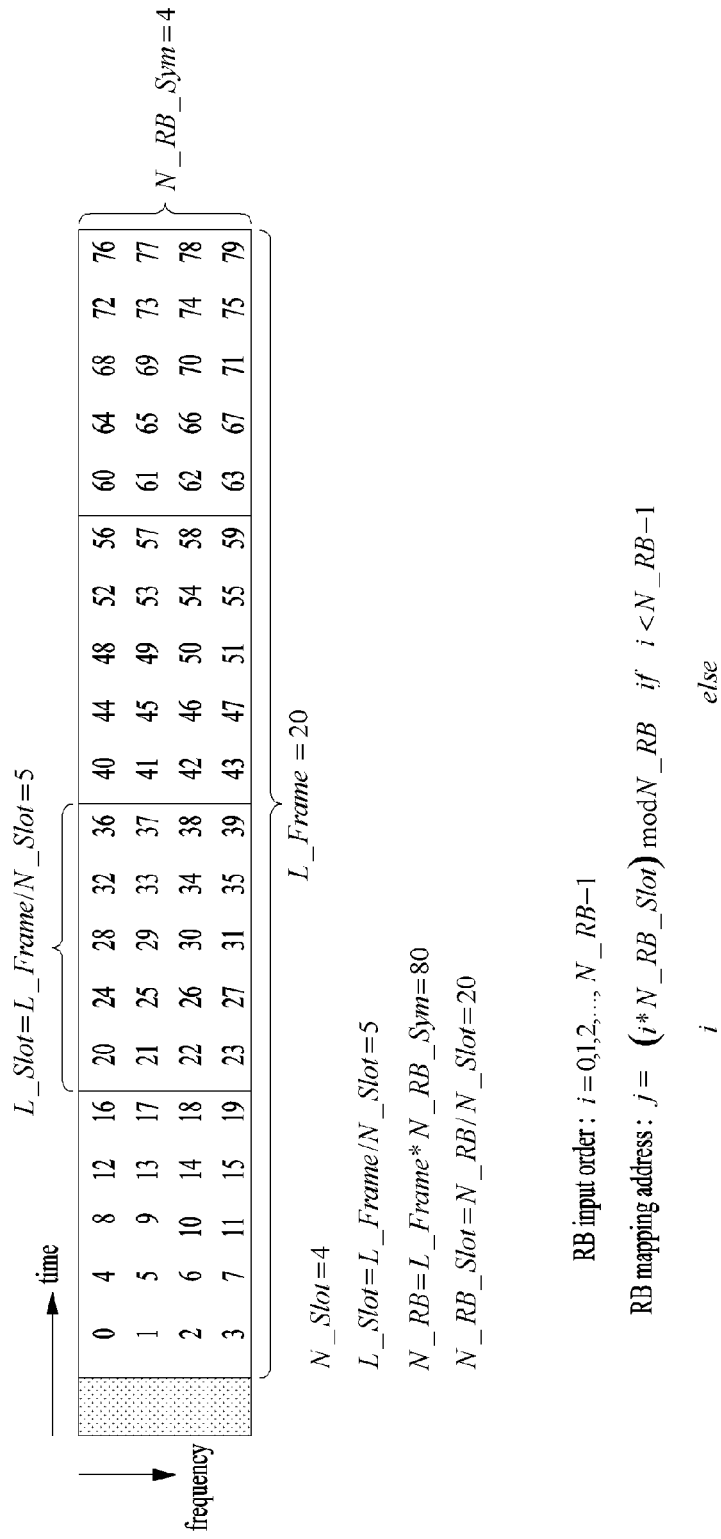
FIG. 23 illustrates RB mapping of type 1 DPs according to an embodiment of the present invention.
Figure 24:
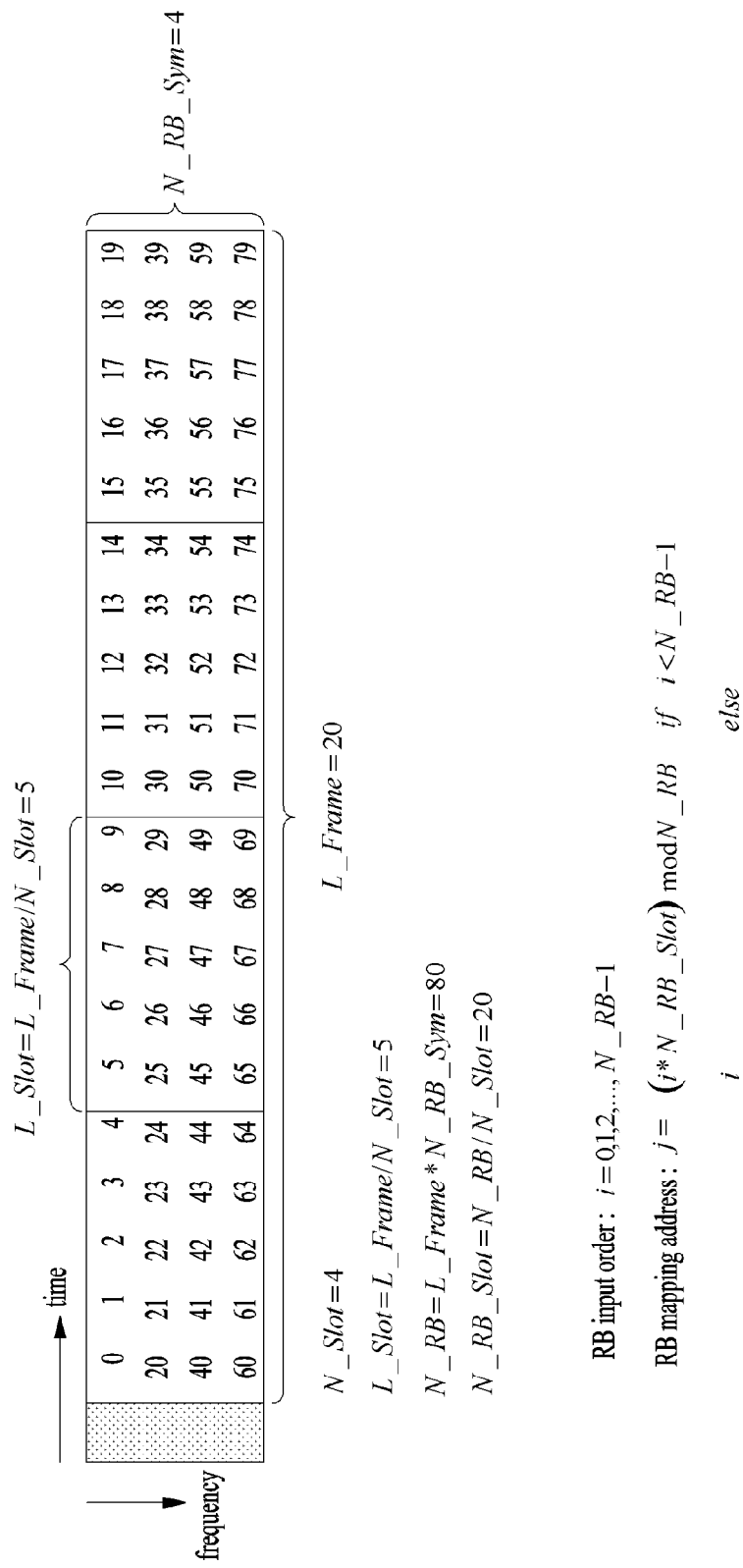
FIG. 24 illustrates RB mapping of type 2 DPS according to an embodiment of the present invention.
Figure 25:
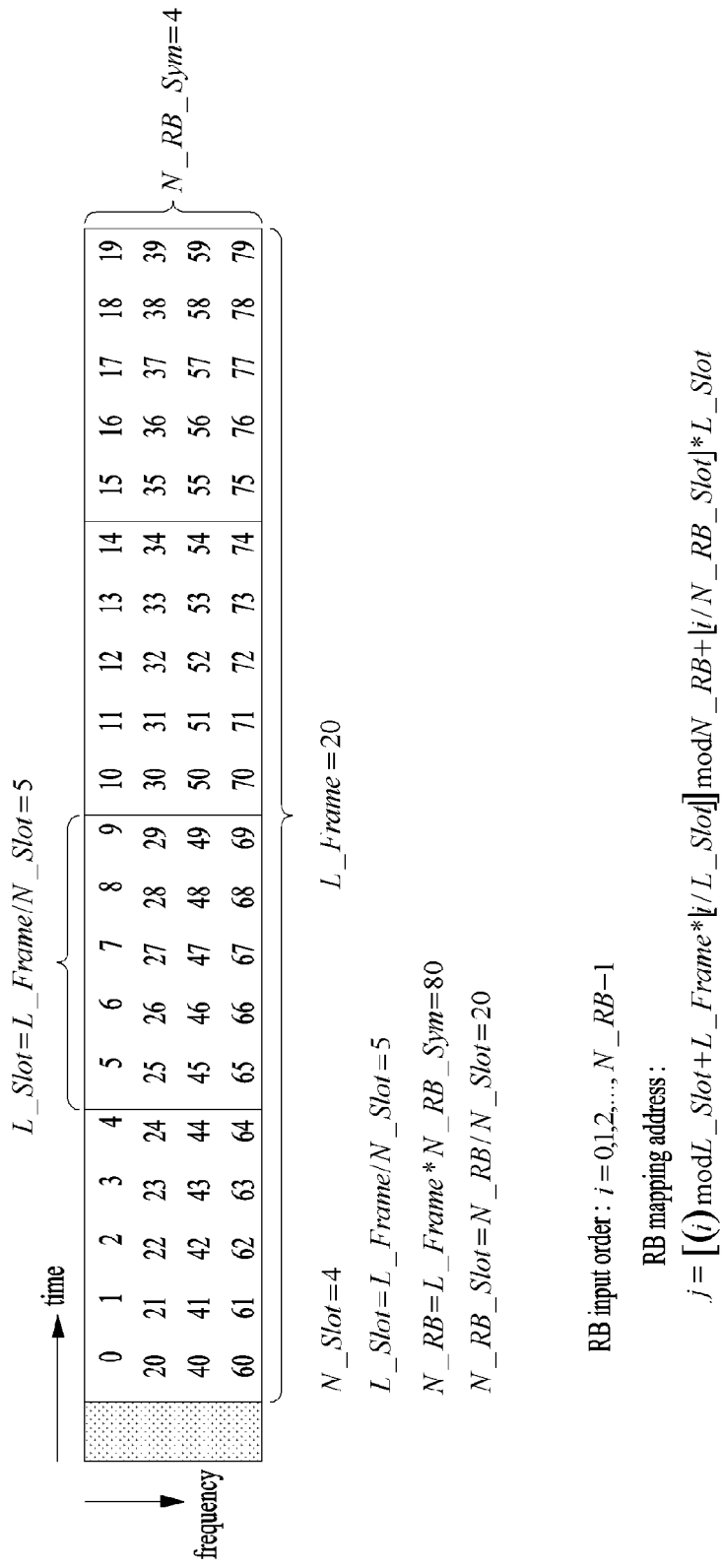
FIG. 25 illustrates RB mapping of type 3 DPs according to an embodiment of the present invention.

FIGS. 23 to 25 illustrate RB mapping according to DP types.

According to an embodiment of the present invention, the following values may be defined to describe an RB mapping rule according to types of DPs, L_Frame: the number of OFDM symbols in one frame
N_Slot: the number of slots in one frame
L_Slot: the number of OFDM symbols in one slot
N_RB_Sym: the number of RBs in one OFDM symbol
N_RB: the number of RBs in one signal frame FIG. 23 illustrates RB mapping of type 1 DPs according to an embodiment of the present invention.

FIG. 23 shows one signal frame ratio. In this figure, the horizontal axis represents time, and the vertical axis represents frequency. The shaded block positioned at the foremost part of the signal frame on the time axis is a region for a preamble and signaling. As described above, the plurality of DPs according to an embodiment of the present invention may be mapped to the data symbol region of the signal frame on the RB-by-RB basis.

The signal frame shown in FIG. 23 consists of 20 OFDM symbols (L_Frame=20), and includes 4 slots (N_Slot=4). In addition, one slot includes 5 OFDM symbols (L_Slot=5), and one OFDM symbol is equally partitioned into 4 RBs (N_RB_Sym=4). Accordingly, the total number of RBs in one signal frame, expressed as L_Frame*N_RB_Sym, is 80.

The numbers marked in the signal frame of FIG. 23 represent the allocation order of RBs in the signal frame. Since type 1 DPs are sequentially mapped on the frequency axis, the allocation order of RBs may also continuously increase along the frequency axis. Once the order of allocation of RBs is determined, the respective DPs may be mapped to the finally allocated RBs in temporal order. When the RB mapping addresses of the places to which the RBs are actually mapped in a signal frame are denoted by j, j may have values from 0 to N_RB−1. In this case, when the RB input order is defined as i, the value of i may be 0, 1, 2, . . . , N_RB−1 as shown in FIG. 23. If N_Slot=1, the RP mapping address is equal to the RB input order, and thus the input RBs may be mapped in ascending order of j. If N_Slot>1, RBs to be mapped to a signal frame may be mapped by being partitioned according to the number N_Slot. In this case, RBs may be mapped according to a mapping rule expressed by an equation shown at the bottom of FIG. 23.

FIG. 24 illustrates RB mapping of type 2 DPS according to an embodiment of the present invention.

Similar to the signal frame of FIG. 23, the signal frame shown in FIG. 24 consists of 20 (L_Frame=20). OFMD symbols, and includes 4 slots (N_Slot=4). One slot includes 5 OFDM symbols (L_Slot=5), and one OFDM symbol is equally partitioned into 4 RBs (N_RB_Sym=4). Accordingly, the total number of RBs in one signal frame, expressed as L_Frame*N_RB_Sym, is 80.

As described above with reference to FIG. 23, when the RB mapping addresses of the places to which the RBs are actually mapped in a signal frame are denoted by j, j may have values from 0 to N_RB−1. Since type 2 DPs are sequentially mapped on the time axis, the allocation order of RBs may also continuously increase along the time axis. Once the order of allocation of RBs is determined, the respective DPs may be mapped to the finally allocated RBs in temporal order.

As described above with reference to FIG. 23, if N_Slot=1, RB input order corresponds to j=i, and thus input RBs may be mapped in ascending order of j. If N_Slot>1, RBs to be mapped to the signal frame may be partitioned and mapped according to N_Slot. In this case, the RBs may be mapped according to a mapping rule expressed as an equation shown at the bottom of FIG. 24.

The equations for mapping rules shown in FIGS. 23 and 24 have no difference therebetween in terms of types of DPs, but yield RB mapping results of different properties according to the difference in mapping direction since type 1 DPs are mapped on the frequency axis and type 2 DPs are mapped on the time axis.

FIG. 25 illustrates RB mapping of type 3 DPs according to an embodiment of the present invention.

Similar to the cases of FIGS. 23 and 24, the signal frame shown in FIG. 25 consists of 20 OFDM symbols (L_Frame=20), and includes 4 slots (N_Slot=4). In addition, one includes slot 5 OFDM symbols (L_Slot=5), and one OFDM symbol is equally portioned into 4 RBs (N_RB_Sym=4). Accordingly, the total number of RBs in one signal frame, expressed as L_Frame*N_RB_Sym, is 80.

RB mapping addresses of type 3 DPs may be derived from the equation shown at the bottom of FIG. 25. That is, if N_Slot=1, RB mapping addresses of type 3 DPs are identical to the RB mapping addresses of type 2 DPs. Both type 2 DPs and type 3 DPs are sequentially mapped on the time axis, type 2 DPs are mapped up to the end of the first frequency of the signal frame and then sequentially mapped from the second frequency of the first OFDM symbol, while type 3 DPs are mapped up to the end of the first frequency of the corresponding slot and then sequentially mapped from the second frequency of the first OFDM symbol along the time axis. Due to this difference, when type 3 DPs are used, time diversity may be restricted by L_Slot, and power saving may be acquired in the unit of L_Slot.

Figure 26:
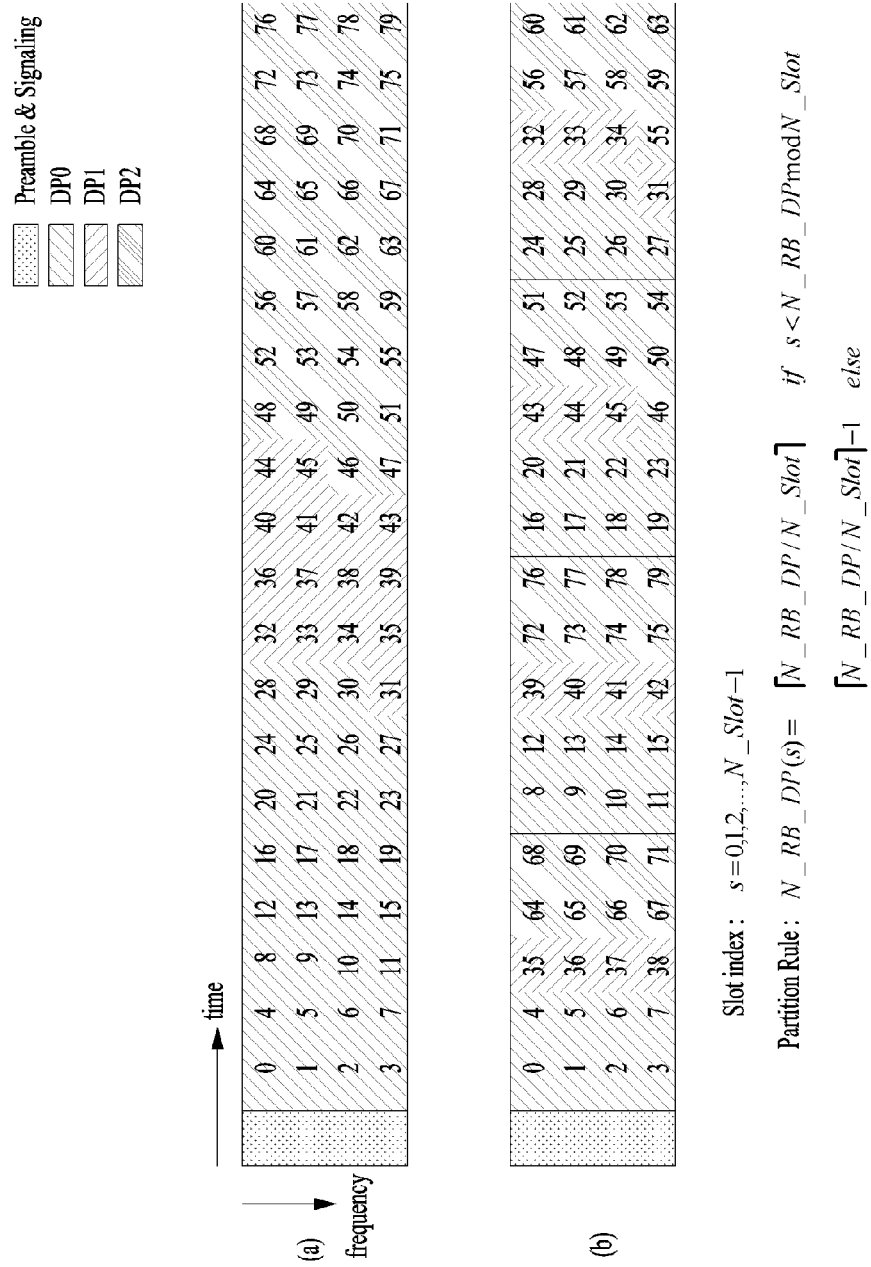
FIG. 26 illustrates RB mapping of type 1 DPs according to another embodiment of the present invention.

FIG. 26 illustrates RB mapping of type 1 DPs according to another embodiment of the present invention.

FIG. 26(a) illustrates an RB mapping order applied when type 1 DP0, DP1 and DP2 are allocated to RBs available in one signal frame, and FIG. 26(b) illustrates an RB mapping order applied when type 1 DP0, DP1 and DP2 are partitioned in one signal frame and allocated to RBs included in respective slots. The numbers marked in the signal frame indicate an order in which RBs are allocated. Once the order of allocation of RBs is determined, the DPs may be mapped to the finally allocated RBs in temporal order.

FIG. 26(a) illustrates an RB mapping order applied when N_Slot=1 and {DP0, DP1, DP2}={31, 15, 34}.

Specifically, DP0 is mapped to RBs according to the order of RBs along the frequency axis. Once DP0 is mapped to the entirety of one OFDM symbol, DP0 may then be sequentially mapped, along the frequency axis, to subsequent OFDM symbols arranged on the time axis. Accordingly, once DP0 is mapped to RBs 0 to 30, DP1 may be consecutively mapped to RBs 31 to 45, and DP2 may be mapped to RBs 46 to 79.

In order for the broadcast signal reception apparatus according to an embodiment of the present invention to extract RBs to which the DPs are mapped, type information (DP_Type) on the DPs and the number of equally partitioned slots (N_Slot) are necessary. In addition, signaling information including DP start address information (DP_RB_St) on respective DPs, the-number-of-FEC blocks information (DP_N_Block) on the respective DPs to be mapped to a signal frame, and start address information on the FEC block mapped to the first RB (DP_FEC_St) are necessary.

Accordingly, the broadcast signal transmission apparatus according to an embodiment of the present invention may transmit the aforementioned signaling information.

FIG. 26(*b*) illustrates an RB mapping order applied when N_Slot=4 and {DP0, DP1, DP2}={31, 15, 34}.

Specifically, FIG. 26(*b*) illustrates the result of partitioning DP0, DP1 and DP2 and sequentially mapping the same to respective slots on the RB-by-RB basis using the same method as used when N_Slot=1. An equation representing the rule for partitioning RBs of each DP is shown at the bottom of FIG. 26. In the equation shown in the figure, parameters s, N_RB_DP and N_RB_DP(s) may be defined as follows.

s: Slot index, s=0, 1, 2, . . . , N_Slot−1

N_RB_DP: the number of RBs of a DP to be mapped to one signal frame

N_RB_DP(s): the number of RBs of a DP to be mapped to a slot having slot index s N_RB_DP=31 for DP0 according to an embodiment of the present invention. Therefore, according to the equation shown in FIG. 26, the number of RBs of DP0 to be mapped to the first slot may be N_RB_DP(0)=8, the number of RBs of DP0 to be mapped to the second slot may be N_RB_DP(1)=8, the number of RBs of DP0 to be mapped to the third slot may be N_RB_DP(2)=8 and the number of RBs of DP0 to be mapped to the fourth slot may be N_RB_DP(3)=7. The number of RBs of DP0 partitioned into the respective slots may be expressed as {8, 8, 8, 7}.

In the same way, DP1 may be partitioned as {4, 4, 4, 3}, and DP 2 may be partitioned as {9, 9, 8, 8}.

The DPs partitioned according to the respective slots may be sequentially mapped to a corresponding slot using the same mapping method as used when N_Slot=1. In this case, in order to uniformly fill all slots, a DP may be sequentially mapped to slots to which smaller numbers of RBs of other DPs are allocated, stating with a slot having the lowest slot index s.

Next, the case of DP1 according to an embodiment of the present invention will be discussed. Since RBs of DP0 are partitioned into {8, 8, 8, 7} in the order of s=0, 1, 2, 3 and mapped to the respective slots, the smallest number of RBs of DP0 are mapped to a slot having slot index s=3. Accordingly, RBs of DP1 may partitioned into {4, 4, 4, 3} in the order of s=3, 0, 1, 2 and mapped to the respective slots. Similarly, slots having slot index s=2 and 3 are assigned the smallest numbers of RBs of DP0 and DP1, and the number of RBs allocated to the slot corresponding to s=3 is smaller than the number of RBs allocated to the slot corresponding to s=2. Accordingly, RBs of DP2 may be partitioned into {9, 9, 8, 8} in the order of s=2, 3, 0, 1 and mapped to the respective slots.

Figure 27:
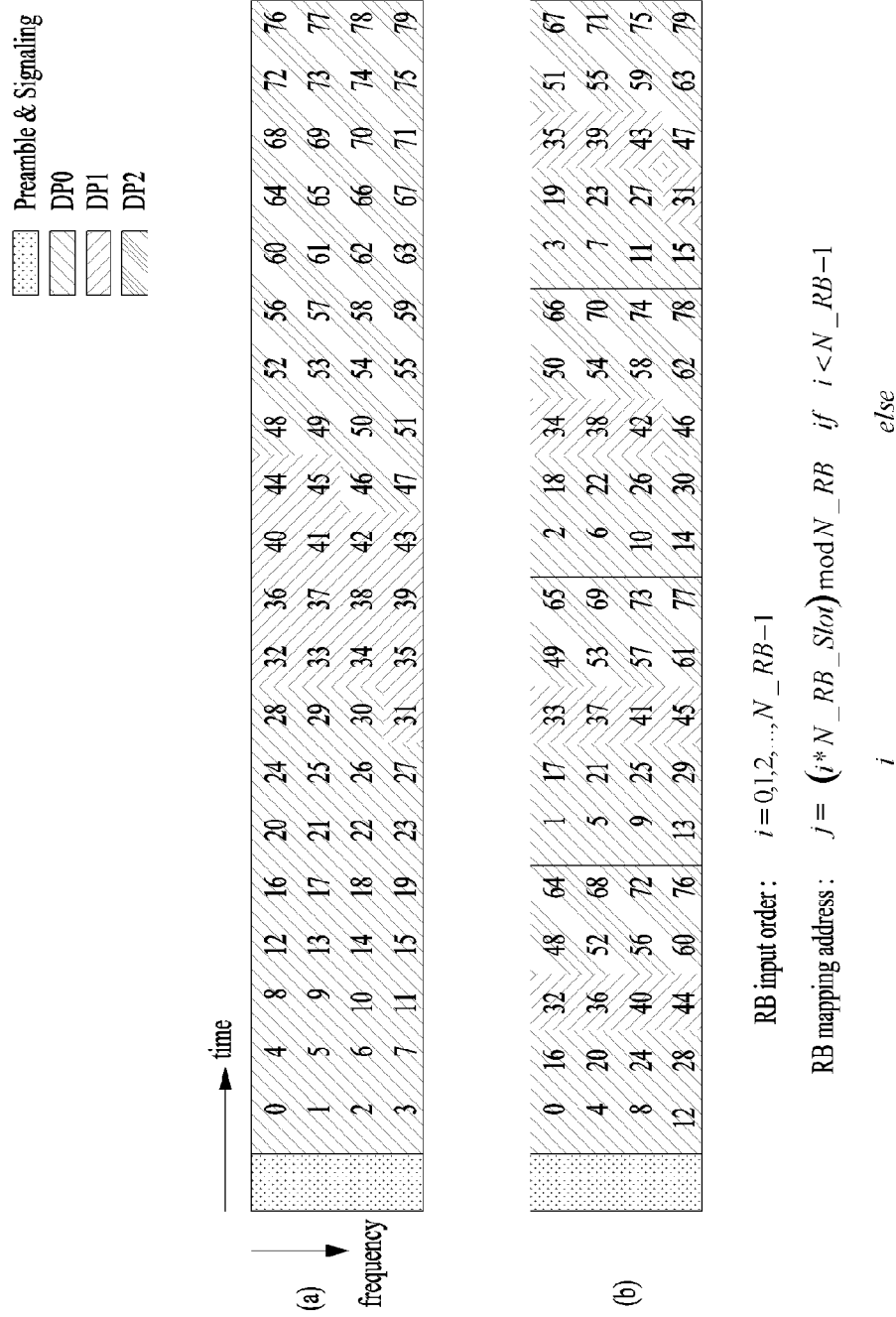
FIG. 27 illustrates RB mapping of type 1 DPs according to another embodiment of the present invention.

FIG. 27 illustrates RB mapping of type 1 DPs according to another embodiment of the present invention.

FIG. 27 illustrates an embodiment in which RB mapping addresses of type 1 DPs described above are applied. An equation expressing RB mapping addresses is show at the bottom of FIG. 27. Although different from the mapping method illustrated in FIG. 26, the method of this embodiment produces the same mapping result, and thus mapping having the same properties may be implemented. According to the mapping method of FIG. 27, RB mapping may be performed simply using one equation, regardless of the value of N_Slot.

Figure 28:
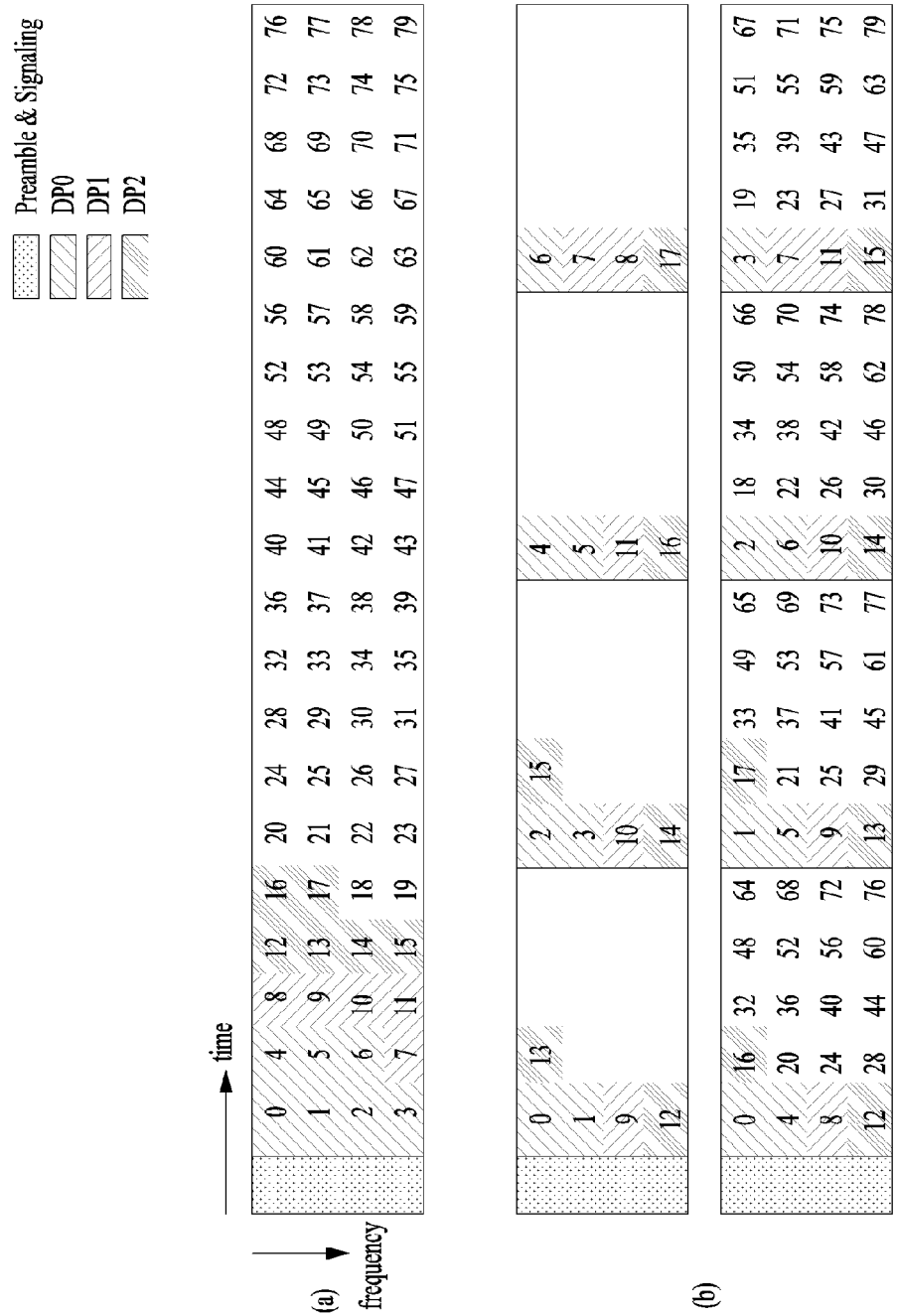
FIG. 28 illustrates RB mapping of type 1 DPs according to another embodiment of the present invention.

FIG. 28 illustrates RB mapping of type 1 DPs according to another embodiment of the present invention.

FIG. 28(*a*) illustrates an RB mapping order applied when type 1 DP0, DP1 and DP2 are allocated to only some RBs in one signal frame, and FIG. 28(*b*) illustrates an RB mapping order applied when type 1 DP0, DP1 and DP2 are partitioned in one signal frame and allocated to only some RBs included in each slot. The numbers marked in the signal frame indicate an order in which RBs are allocated. Once the order of allocation of RBs is determined, the DPs may be mapped to the finally allocated RBs in temporal order.

FIG. 28(*a*) illustrates an RB mapping order applied when N_Slot=1 and {DP0, DP1, DP2}={7, 5, 6}.

Specifically, DP0 is mapped to RBs according to the order of RBs along the frequency axis. Once DP0 is mapped to the entirety of one OFDM symbol, DP0 may then be sequentially mapped, along the frequency axis, to subsequent OFDM symbols arranged on the time axis. Accordingly, once DP0 is mapped to RBs 0 to 6, DP1 may be consecutively mapped to RBs 7 to 11, and DP2 may be mapped to RBs 12 to 17.

FIG. 28(*b*) illustrates an RB mapping order applied when N_Slot=4 and {DP0, DP1, DP2}={7, 5, 6}.

FIG. 28(*b*) illustrates an embodiment of a signal frame into which RBs of respective DPs are partitioned and mapped according to the rule for partitioning RBs of respective DPs as described above with reference to FIG. 26. Details of the mapping operation are the same as described above, and thus description thereof will be omitted.

Figure 29:
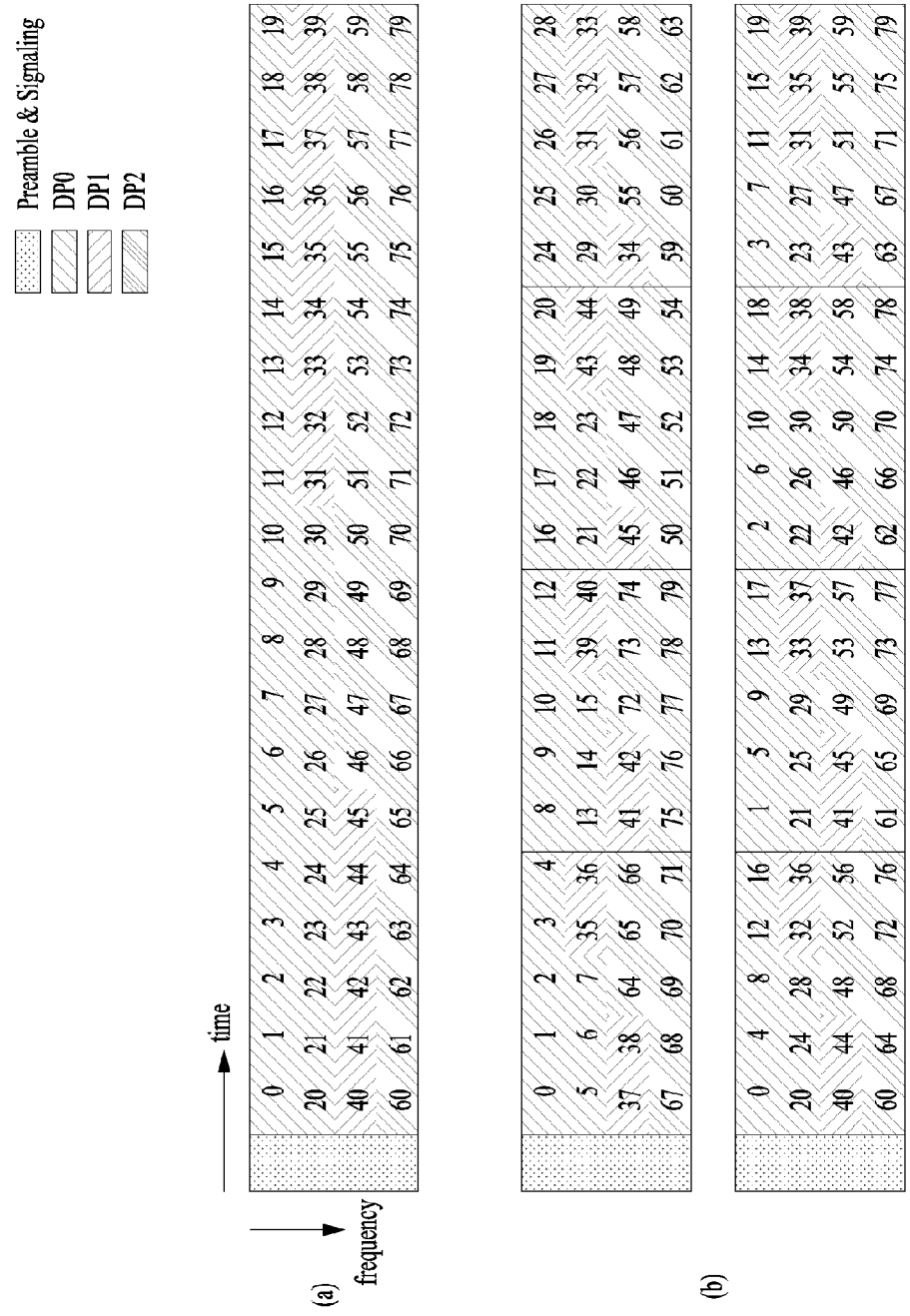
FIG. 29 illustrates RB mapping of type 2 DPs according to another embodiment of the present invention.

FIG. 29 illustrates RB mapping of type 2 DPs according to another embodiment of the present invention.

FIG. 26(*a*) illustrates an RB mapping order applied when type 1 DP0, DP1 and DP2 are allocated to RBs available in one signal frame, and FIG. 26(*b*) illustrates an RB mapping order applied when type 1 DP0, DP1 and DP2 are partitioned within one signal frame and allocated to RBs included in respective slots. The numbers marked in the signal frame indicate an order in which RBs are allocated. Once the order of allocation of RBs is determined, the DPs may be mapped to the finally allocated RBs in temporal order.

FIG. 26(*a*) illustrates an RB mapping order applied when N_Slot=1 and {DP0, DP1, DP2}={31, 15, 34}.

RBs of type 2 DP may acquire time diversity since the RBs of type 2 DP are mapped up to the end of the first frequency of the signal frame and then sequentially mapped from the second frequency of the first OFDM symbol. Accordingly, once DP0 is mapped to RBs 0 to 19 and then to RBs 20 to 30 of the second frequency, DP1 may be mapped to RBs 31 to 45 in the same manner, and DP2 may be mapped to RBs 46 to 79.

In order for the broadcast signal reception apparatus according to an embodiment of the present invention to extract RBs to which the DPs are mapped, type information (DP_Type) on the DPs and the number of equally partitioned slots (N_Slot) are necessary. In addition, signaling information including DP start address information (DP_RB_St) on respective DPs, the-number-of-FEC blocks information (DP_N_Block) on the respective DPs to be mapped to a signal frame, and start address information on the FEC block mapped to the first RB (DP_FEC_St) is necessary.

Accordingly, the broadcast signal transmission apparatus according to an embodiment of the present invention may transmit the aforementioned signaling information.

FIG. 29(b) illustrates an RB mapping order applied when N_Slot=4 and {DP0, DP1, DP2}={31, 15, 34}.

The first signal frame of FIG. 29(b) represents the result of RB mapping performed according to the rule for partitioning RBs of respective DPs as described above with reference to FIG. 26, and the second signal frame of FIG. 29(b) represents the result of RB mapping performed by applying the RB mapping addresses of type 2 DPs described above. Although different mapping methods and operations are used in the case of applying the rule and the case of apply the addresses, both cases produce the same mapping result, and thus may have the same mapping properties. In this case, RB mapping may be performed simply using one equation, regardless of the value of N_Slot.

Figure 30:
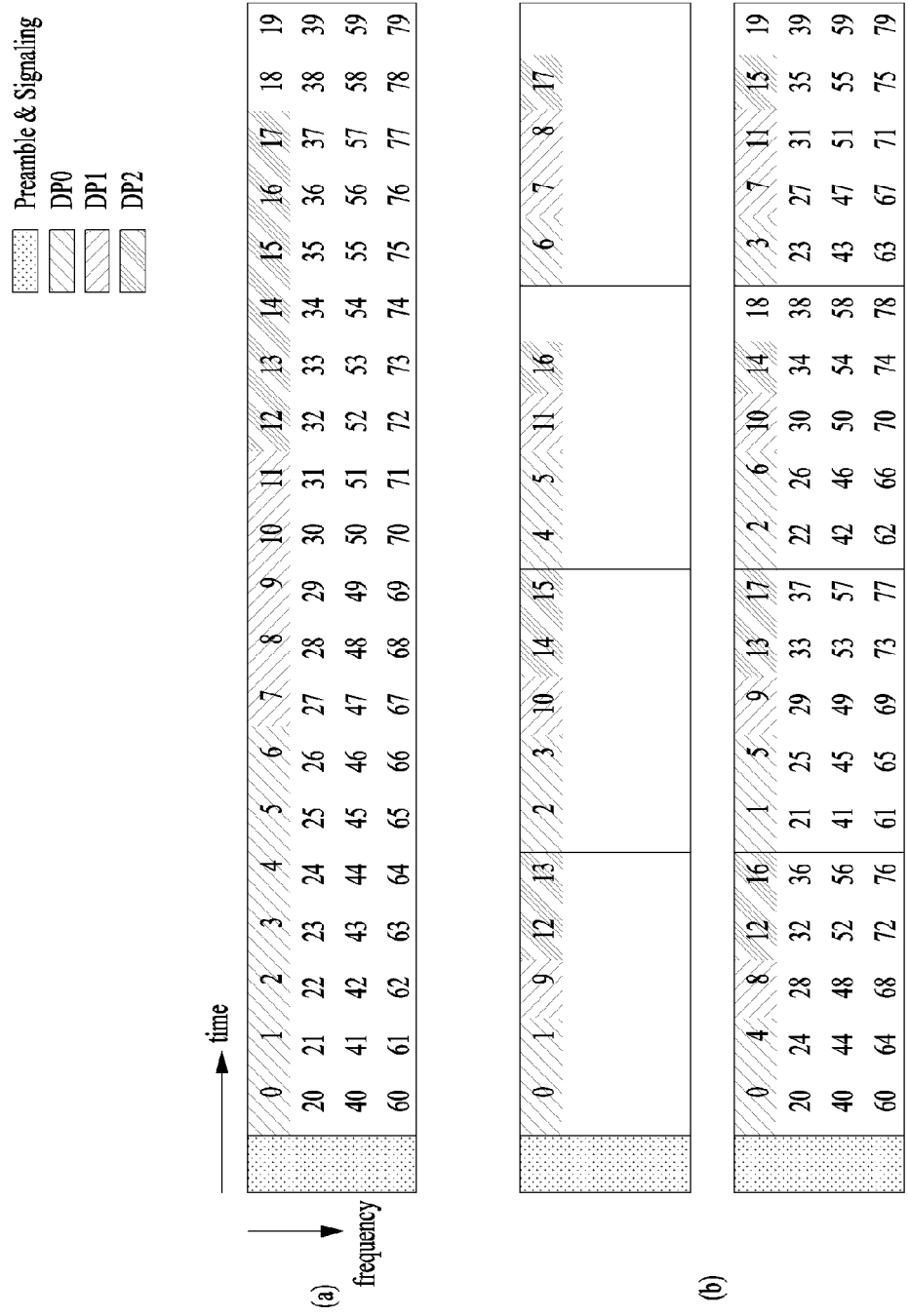
FIG. 30 illustrates RB mapping of type 2 DPs according to another embodiment of the present invention.

FIG. 30 illustrates RB mapping of type 2 DPs according to another embodiment of the present invention.

FIG. 30(a) illustrates an RB mapping order applied when type 2 DP0, DP1 and DP2 are allocated to only some RBs in one signal frame, and FIG. 30(b) illustrates an RB mapping order applied when type 2 DP0, DP1 and DP2 are partitioned within one signal frame and allocated to only some RBs included in each slot. The numbers marked in the signal frame indicate an order in which RBs are allocated. Once the order of allocation of RBs is determined, the DPs may be mapped to the finally allocated RBs in temporal order.

FIG. 30(a) illustrates an RB mapping order applied when N_Slot=1 and {DP0, DP1, DP2}={7, 5, 6}.

Specifically, DP0 is mapped to RBs according to the order of RBs along the time axis. Accordingly, once DP0 is mapped to RBs 0 to 6, DP1 may be consecutively mapped to RBs 7 to 11, and DP2 may be mapped to RBs 12 to 17.

FIG. 28(b) illustrates an RB mapping order applied when N_Slot=4 and {DP0, DP1, DP2}={7, 5, 6}.

FIG. 30(b) illustrates an embodiment of a signal frame into which RBs of respective DPs are partitioned and mapped according to the rule for partitioning RBs of respective DPs as described above with reference to FIG. 26. Details of the mapping operation are the same as described above, and thus description thereof will be omitted.

Figure 31:
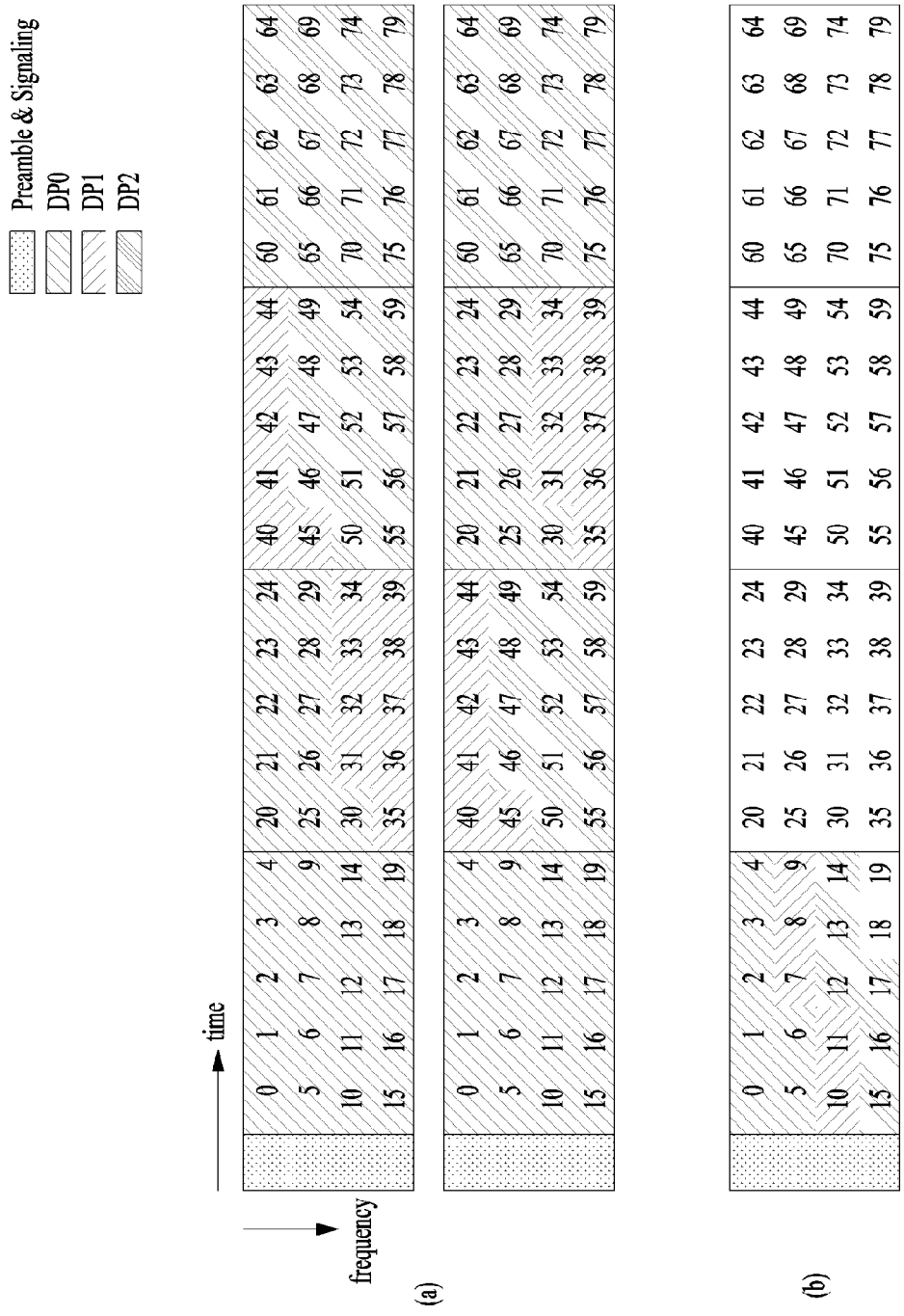
FIG. 31 illustrates RB mapping of type 3 DPs according to another embodiment of the present invention.

FIG. 31 illustrates RB mapping of type 3 DPs according to another embodiment of the present invention.

FIG. 31(a) illustrates an RB mapping order applied when type 3 DP0, DP1 and DP2 are partitioned in one signal frame and allocated to RBs included in respective slots, FIG. 31(b) an RB mapping order applied when type 1 DP0, DP1 and DP2 are partitioned in one signal frame and allocated to some RBs included in respective slots. The numbers marked in the signal frame indicate an order in which RBs are allocated. Once the order of allocation of RBs is determined, the DPs may be mapped to the finally allocated RBs in temporal order.

FIG. 31(a) illustrates an RB mapping order applied when N_Slot=4 and {DP0, DP1, DP2}={31, 15, 34}.

The first signal frame of FIG. 31(a) represents a case where RB mapping addresses of type 3 DPs described above are applied. The second signal frame of FIG. 31(a) represents a case where time diversity may be acquired by charging the order of slot allocation when the number of RBs of a DP exceeds a corresponding slot. Specifically, the second signal frame of FIG. 31 (a) represents a case where the number of RBs of DP0 allocated to the first slot of the first signal frame of FIG. 31 (a) exceeds the slot, and thus the other RBs of DP0 are allocated to the third slot.

FIG. 31(b) illustrates an RB mapping order applied when N_Slot=4 and {DP0, DP1, DP2}={7, 5, 6}.

In order for the broadcast signal reception apparatus according to an embodiment of the present invention to extract RBs to which the DPs are mapped, type information (DP_Type) on the DPs and the number of equally partitioned slots (N_Slot) are necessary. In addition, signaling information including DP start address information (DP_RB_St) on respective DPs, the-number-of-FEC blocks information (DP_N_Block) on the respective DPs to be mapped to a signal frame, and start address information on the FEC block mapped to the first RB (DP_FEC_St) are necessary.

Accordingly, the broadcast signal transmission apparatus according to an embodiment of the present invention may transmit the aforementioned signaling information.

Figure 32:
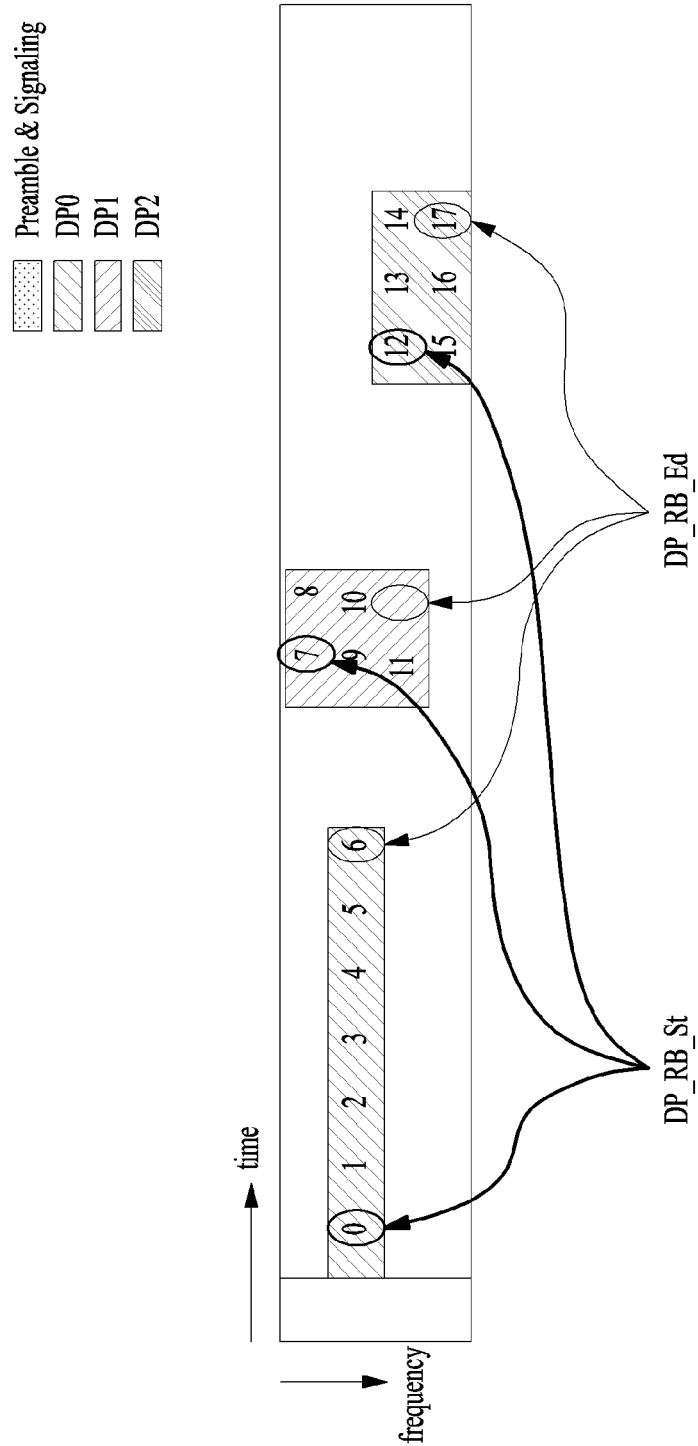
FIG. 32 illustrates RB mapping of type 3 DPs according to another embodiment of the present invention.

FIG. 32 illustrates RB mapping of type 3 DPs according to another embodiment of the present invention.

FIG. 32 illustrates RB mapping performed when N_Slot=1 and {DP0, DP1, DP2}={7, 5, 6}. As shown in FIG. 32, RBs of each DP may be mapped to a certain block unit in a signal frame. In this case, in order for the broadcast signal reception apparatus according to an embodiment of the present invention to extract RBs to which a DP is mapped, additional information is needed in addition to the aforementioned signaling information.

According to an embodiment of the present invention, DP end address information (DP_RB_Ed information) about each DP may be additionally transmitted. Accordingly, the broadcast signal transmission apparatus according to an embodiment of the present invention may map RBs of the DP in any block unit and transmit the aforementioned signaling information, and the broadcast signal reception apparatus according to an embodiment of the present invention may detect and decode the RBs of the DP mapped in any block unit, using DP_RB_St information and DP_RB_Ed information included in the signaling information. This method may allow unconstrained RB mapping. Accordingly, RB mapping having different characteristics for respective DPs may be performed.

Specifically, as shown in FIG. 32, RBs of DP0 may be mapped to a corresponding block on the time axis in order to acquire time diversity as in the case of type 2 DP, and RBs of DP1 may be mapped to a corresponding block along the frequency axis in order to acquire the power saving effect as in the case of type 1 DP. In addition, RBs DP2 may be mapped to a corresponding block in consideration of time diversity and power saving as in the case of type 3 DP.

In addition, even if not all RBs are mapped to a corresponding block as in the case of DP1, DP_FEC_St information, DP_N_Block information, DP_RB_St information and DP_RB_Ed information and the like which are included in the signaling information may be used for the broadcast signal reception apparatus to accurately recognize the positions of the RBs which the apparatus desires to acquire. Thereby, efficient transmission and reception of broadcast signals may be possible.

Figure 33:
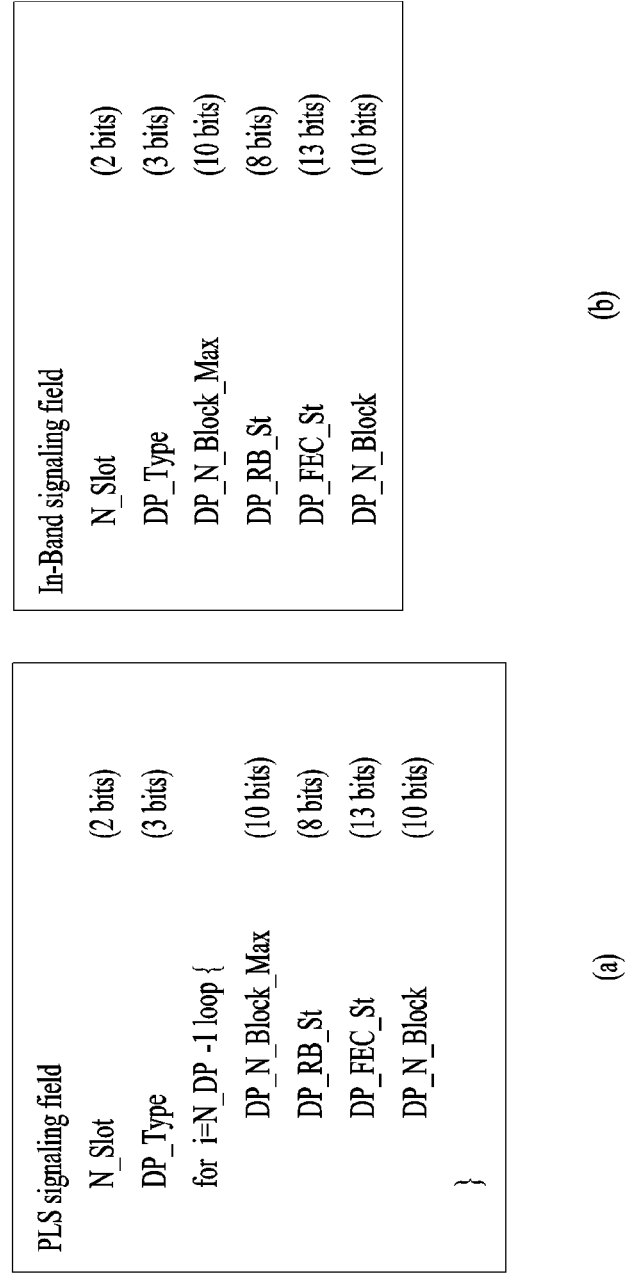
FIG. 33 illustrates signaling information according to an embodiment of the present invention.

FIG. 33 illustrates signaling information according to an embodiment of the present invention In FIG. 33, which illustrates signaling information related to RB mapping according to DP types, the signaling information may be transmitted through signaling through PLS (hereinafter, referred to as PLS signaling) or in-band signaling.

Specifically, FIG. 33(a) illustrates signaling information (PLS signaling field, PLS signaling field) transmitted through PLS, and FIG. 33(b) illustrates signaling information transmitted through in-band signaling (In-Band signaling field).

As shown in FIG. 33, signaling information related to RB mapping according to DP types may include N_Slot information, DP_Type information, DP_N_Block information, DP_RB_St information, DP_FEC_St information and DP_N_Block information.

The signaling information transmitted through PLS is identical to the signaling information transmitted through in-band signaling. However, since PLS contains information on all DPs included in a corresponding signal frame to acquire a service, all signaling information except N_Slot information and DP_Type information may be defined in a DP loop for defining information about respective DPs. On the other hand, the in-band signaling does not need a DP loop for defining information about the respective DPs because the in-band signaling is transmitted through each DP to acquire a corresponding. A brief description of respective signaling information will be given below.

N_Slot information: This information is used to indicate the number of partitioned slots in one signal frame and may have a size of 2 bits. According to an embodiment of the present invention, the number of slots may be 1, 2, 4 or 8.

DP_Type information: This information indicates the type of a DP. The type of a DP may be one of type 1, type 2 and type 3 described above, and the types may be extended depending on the intention of the designer. The information may have a size of 3 bits.

DP_N_Block_Max information: This information is used to indicate the maximum value of the FEC block of a DP or a corresponding value, and may have a size of 10 bits.

DP_RB_St information: This information indicates the first RB address of a DP. The address of an RB may be expressed in units of RBs. The information may have a size of 8 bits.

DP_FEC_St information: This information indicates the first address of an FEC block of a DP to be mapped to a signal frame, and may be expressed on the cell-by-cell basis. The information may have a size of 13 bits.

DP_N_Block information: This information indicates the number of FEC blocks of a DP to be mapped to a signal frame or a corresponding value, may have a size of 10 bits.

Names and sizes of the aforementioned signaling information items may be changed depending on the intention of the designer, taking into account the length of a signal frame, the size of time interleaving, the size of an RB, and the like.

As described above, since PLS signaling and in-band signaling serve different purposes, signaling information may be omitted for each of PLS signaling and in-band signaling using the following method in order to ensure more efficient transmission.

First, PLS contains information on all DPs included in a corresponding signal frame. Accordingly, if all DPs are sequentially mapped in the signal frame without exception in an order of DP0, DP1, DP2, . . . , the broadcast signal reception apparatus may acquire DP_RB_St information by performing certain calculation. In this case, DP_RB_St information may be omitted.

Second, for in-band signaling, the broadcast signal reception apparatus may acquire DP_FEC_St information of the signal frame using DP_N_Block information of the corresponding DP. Accordingly, DP_FEC_St information may be omitted.

Third, for in-band signaling, if there is a change in N_Slot information, DP_Type information and DP_N_Block_Max information, which affect mapping of the corresponding DP, a 1-bit signal indicating change of the information may be used or transmitted. In this case, N_Slot information, DP_Type information and DP_N_Block_Max information may be omitted.

That is, DP_RB_St information may be omitted from DP_RB_St information, and signaling information except DP_RB_St information and DP_N_Block information may be omitted from in-band signaling. This operation may be changed depending on the intention of the designer.

Figure 34:
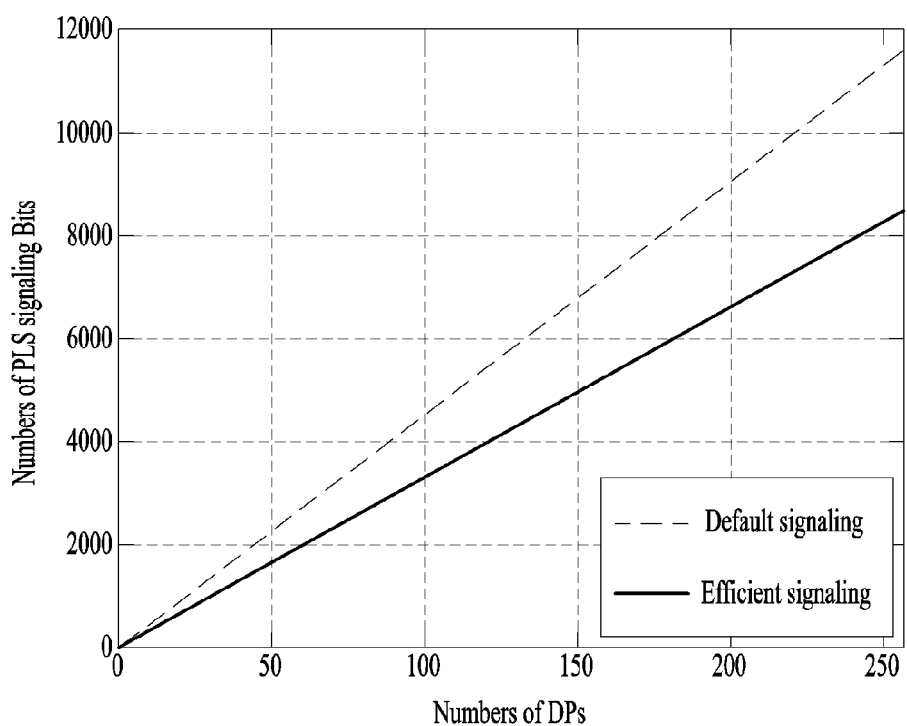
FIG. 34 is a graph depicting the number of bits of PLD with respect to the number of DPs according to an embodiment of the present invention.

FIG. 34 is a graph depicting the number of PLS bits with respect to the number of DPs according to an embodiment of the present invention.

Specifically, FIG. 34 is a graph depicting increase of the number of bits for PLS signaling, namely the number of PMS signaling bits adopted when signaling information related to RB mapping according to DP types is transmitted through PLS as the number of DPs increases.

The dotted line represents transmission of all relevant signaling information (default signaling), and the solid line represents transmission with omission of certain signaling information described above (efficient signaling). In the graph, the horizontal axis represents the number of DPs, and the vertical axis represents the number of bits for the PLS signaling according to increase in the number of DPs. It can be seen from both the dotted line and the solid line that the number of bits for PLS signaling increases as the number of DPs increases. However, as can be seen from the solid line, if transmission is performed with certain signaling information omitted, the rate of increase in the number of bits for PLS signaling is lower that that of the dotted line. That is, the number of saved bits linearly increases.

Figure 35:
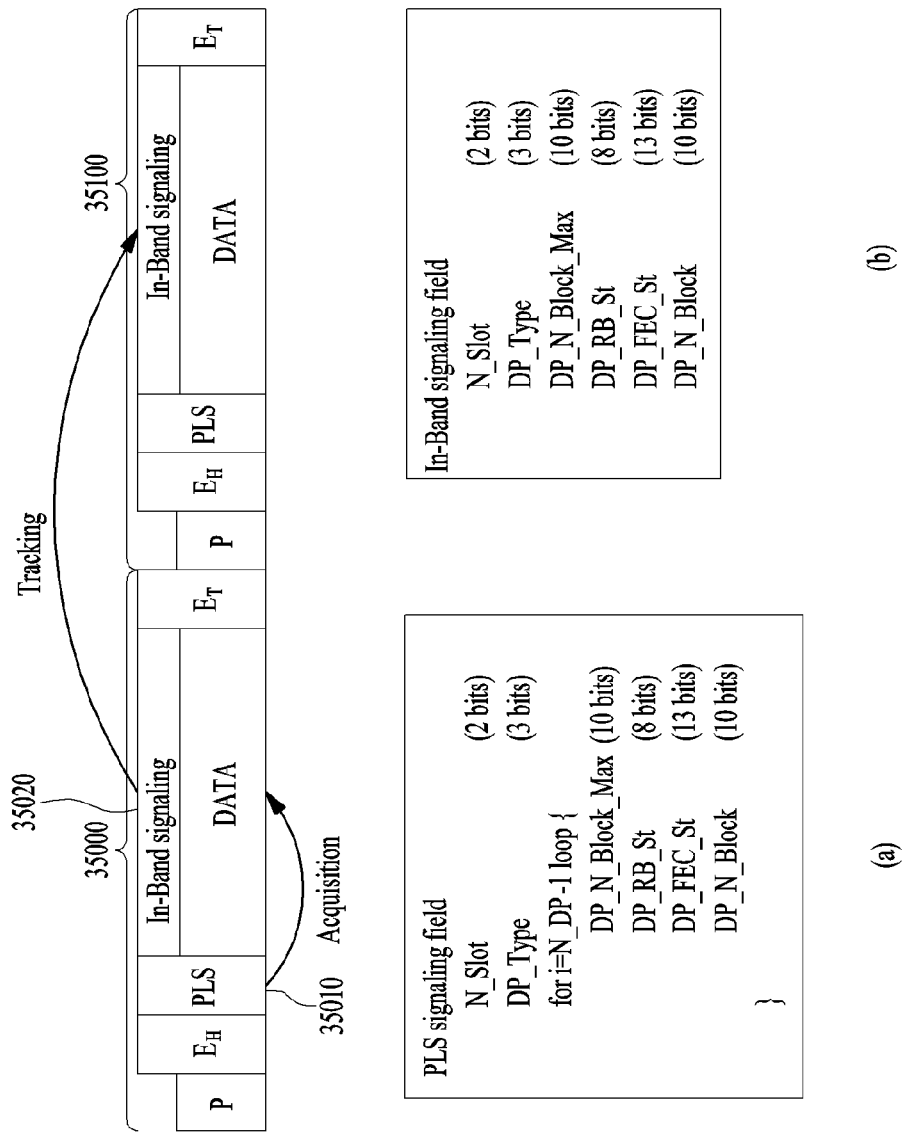
FIG. 35 illustrates demapping of DPs according to an embodiment of the present invention.

FIG. 35 illustrates demapping of DPs according to an embodiment of the present invention.

As shown in the upper portion of FIG. 35, the apparatus for transmitting broadcast signals according to an embodiment of the present invention may transmit consecutive signal frames 35000 and 35100. Each of the signal frames is configured as described above.

As described above, if the broadcast signal transmission apparatus transmits DPs of each type by mapping the DPs to a corresponding signal frame, taking an RB as a basic unit, the broadcast signal reception apparatus may acquire the DPs using the signaling information related to RB mapping according to the DP types.

As described above, the signaling information related to RB mapping according to DP types may be transmitted through PLS 35010 in a signal frame or through in-band signaling 35020. FIG. 35(a) shows signaling information which is related to RB mapping according to DP types and transmitted through the PLS 35010 and FIG. 35(b) shows signaling information which is related to RB mapping according to DP types and transmitted through the in-band signaling 35020. As described above, the in-band signaling 35020 is subjected to processing such as coding, modulation and time interleaving together with data included in a corresponding DP, and thus may be indicated as being included in a part of the region of data symbols in the signal frame. Details of the respective signaling information are the same as described above, and thus description thereof will be omitted.

As shown in FIG. 35, the broadcast signal reception apparatus may acquire signaling information which is related to RB mapping according to DP types and included in the PLS 35010 and acquire DPs mapped to a signal frame 35000 by demapping the DPs. In addition, the broadcast signal reception apparatus may acquire signaling information related to RB mapping according to DP types and transmitted through the in-band signaling 35020 and demap the DPs included in the next signal frame 35100.

Hereinafter, description will be given of frequency interleaving according to an embodiment of the present invention.

The block interleaver 6200 described above may acquire an additional diversity gain by interleaving cells in a transmission block, which is a unit of a signal frame. The block interleaver 6200 according to an embodiment of the present invention may be referred to as a frequency interleaver, and may be called by another name depending on the intention of the designer. In addition, when the block interleaver 6200 performs pair-wise cell mapping described above, the block interleaver 6200 may perform interleaving by taking two consecutive input cells as one unit. This interleaving may be referred to as pair-wise interleaving. Accordingly, the block interleaver 620 yields outputs in units of two consecutive cells. In this case, the block interleaver 6200 may operate in the same manner or independently for two antenna paths.

As another embodiment of frequency interleaving performed by the block interleaver 6200, the present invention proposes symbol by symbol frequency interleaving. In the present invention, the symbol frequency interleaving may be referred to as interleaving. In contrast with the pair-wise interleaving described above, the frequency interleaving according to an embodiment of the present invention may be configured as a seed for applying different interleaving techniques to one OFDM symbol. Thereby, the frequency interleaving may acquire enhanced frequency diversity compared to pair-wise interleaving.

To implement the frequency interleaving described above, the present invention proposes two methods for determining a mother interleaving seed using the Relative Prime Interleaving (RPI) technique and then generating a sub-interleaving seed. In addition, the broadcast signal reception apparatus according to an embodiment of the present invention may include a single memory or a double memory. In addition, whether to apply the single memory or the double memory may be determined according to generation of an initial offset value according to RPI.

The method for generating a sub-interleaving seed by employing a single memory may greatly reduce usage of the memory of the broadcast signal reception apparatus. In addition, this method may be easily extended to implement a pair-wise symbol frequency interleaving and deinterleaving.

Frequency interleaving/frequency deinterleaving are different from pair-wise symbol frequency interleaving/deinterleaving in that pair-wise technique is not applied.

Hereinafter, description will be given of frequency interleaving/frequency deinterleaving and pair-wise symbol frequency interleaving/deinterleaving when a single memory is applied to the broadcast signal reception apparatus and when a double memory is applied to the broadcast signal reception apparatus.

According to an embodiment of the present invention, limited FFT modes may be applied to frequency interleaving/frequency deinterleaving and pair-wise symbol frequency interleaving/deinterleaving according to whether a single memory or double memory is applied, as shown in the table below.

TABLE 1

| Mode | Frequency interleaving/ frequency deinterleaving | Pair-wise symbol frequency interleaving/pair-wise symbol frequency deinterleaving |
|---|---|---|
| 32K | Single memory | Single memory |
| 1K/2K/4K/8K/16K | Single memory | Double memory |

When a single memory is applied to the broadcast signal reception apparatus according to an embodiment of the present invention, the frequency interleaving may have the following features.

First, all input cells may be uniformly interleaved using the RPI technique regardless of the symbol length.

Second, the initial-offset value of RPI applied to every symbol may be determined by the last output value of RPI for the previous symbol.

Figure 36:
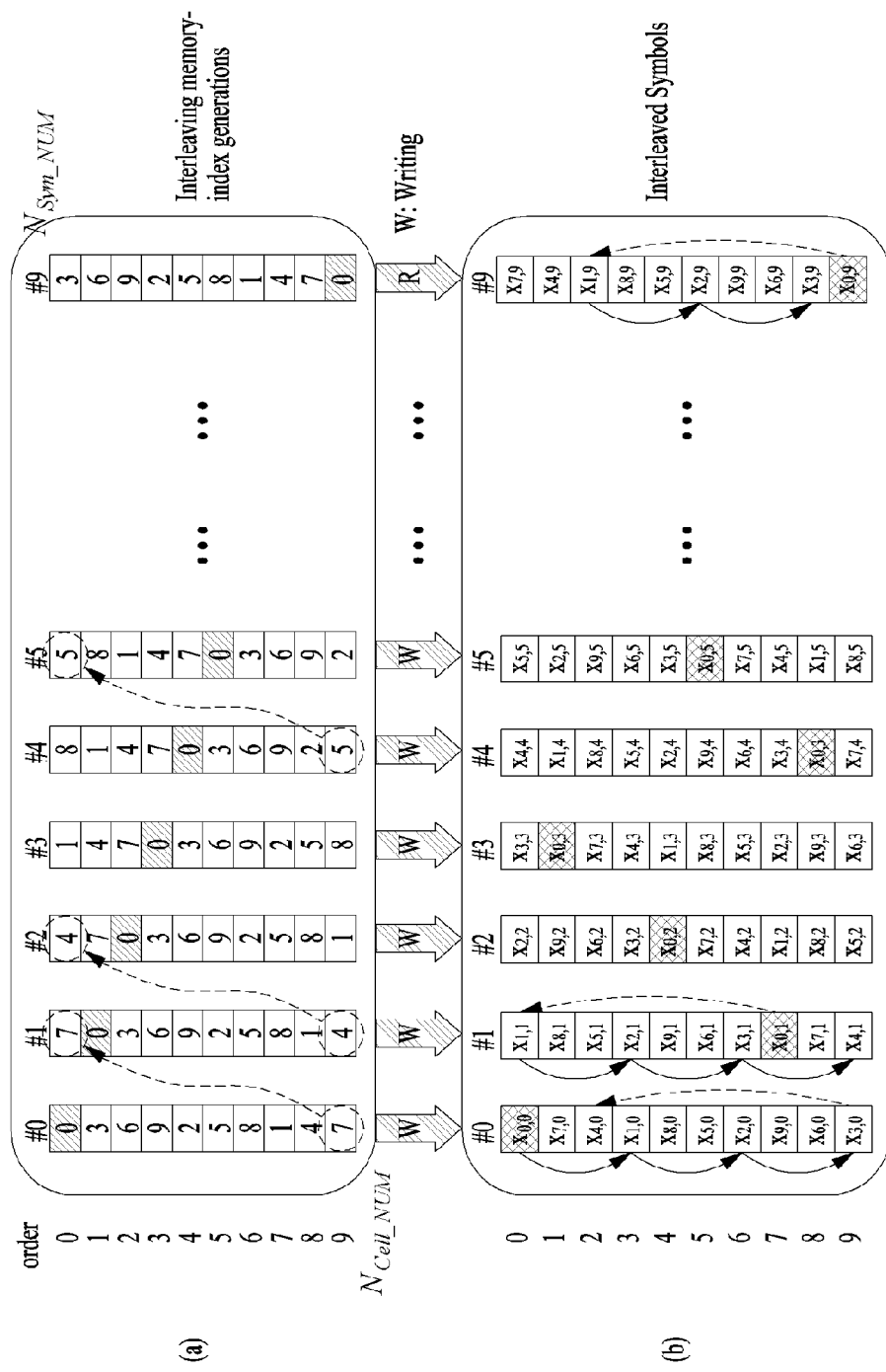
FIG. 36 illustrates frequency interleaving according to an embodiment of the present invention.

Thereby, an equation for simply applying different frequency interleaving to each symbol may be expressed as follows.

$$\pi_j(k) = (I_j + pk) \bmod N_{Cell\_NUM},$$

for $k = 0, \ldots, N_{Cell\_NUM} - 1$, $j = 0, \ldots, N_{Sym\_NUM} - 1$, where $I_j = \pi_{j-1}(N_{Cell\_NUM} - 1)$ with $I_0 = 0$,   Equation 1 p: a relative prime value to
$I_j$: the initial-offset value at the $j^{th}$ RPI for interleaving
$N_{Cell\_NUM}$: total cell (or sample) number
$N_{Sym\_NUM}$: total symbol number
mod: modulus operation
$\pi_j(k)$: interleaving output memory-index (RPI output value) for the $k^{th}$ input cell-index in the $j^{th}$ symbol FIG. 36 illustrates frequency interleaving according to an embodiment of the present invention.

FIG. 36 illustrates frequency interleaving performed when a single memory is applied to the broadcast signal reception apparatus according to an embodiment of the present invention. In this embodiment, the total number of symbols is 10, the number of cells constituting one symbol is 10, and p is 3.

FIG. 36(a) illustrates generation of interleaving memory indexes for interleaving respective symbols by applying the RPI technique. The numbers marked in the interleaving memory indexes represent an order in which cells included in each symbol are interleaved and output. As described above the last output memory index value of each symbol may be set as an initial-offset value of the next symbol.

FIG. 36(b) illustrates the result of interleaving of respective symbols using generated interleaving memory indexes.

Figure 37:
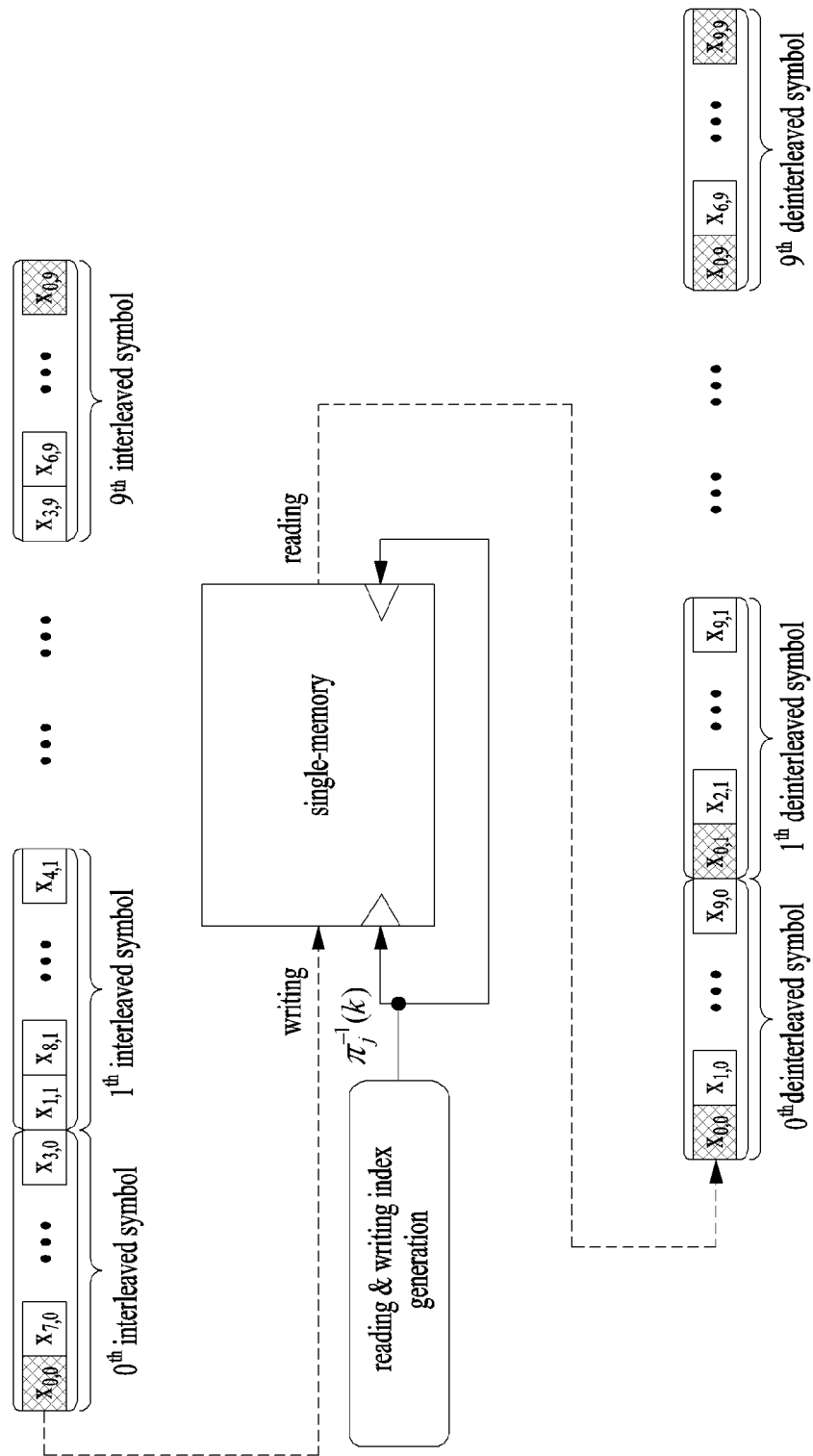
FIG. 37 is a conceptual diagram illustrating frequency deinterleaving according to an embodiment of the present invention.

FIG. 37 is a conceptual diagram illustrating frequency deinterleaving according to an embodiment of the present invention.

FIG. 37 illustrates frequency deinterleaving performed when a single memory is applied to the broadcast signal reception apparatus according to an embodiment of the present invention. In this embodiment, the number of cells constituting one symbol is 10.

The broadcast signal reception apparatus (or frame parsing module or block interleaver) according to an embodiment of the present invention may generate deinterleaving memory indexes through the operation of writing, in an input order, the symbols interleaved according to the frequency interleaving method described above and output deinterleaved symbols through the operation of reading the symbols. In this case, the broadcast signal reception apparatus according to an embodiment of the present invention may perform the writing operation on the deinterleaved memory indexes having undergone the reading operation.

Figure 38:
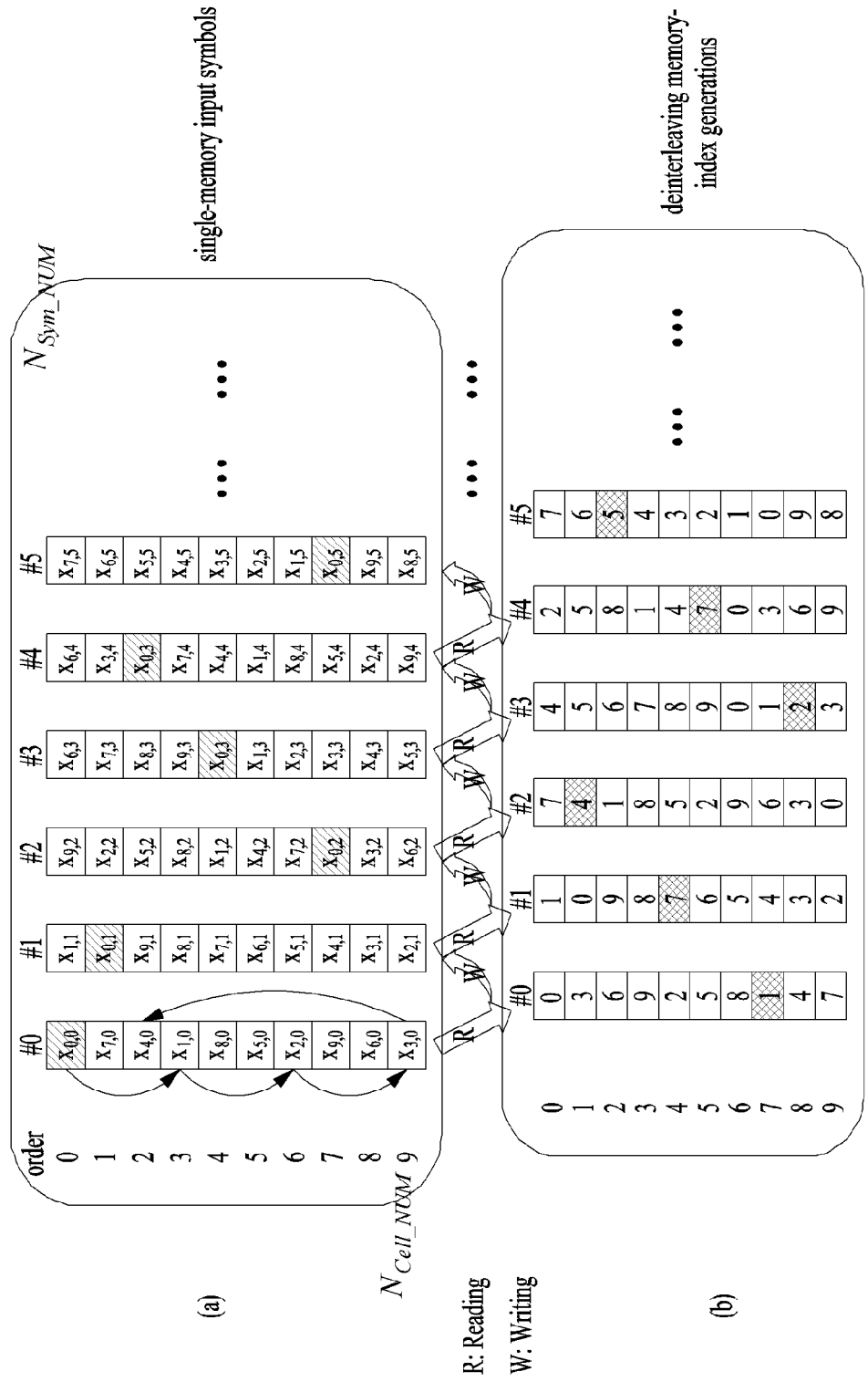
FIG. 38 illustrates frequency deinterleaving according to an embodiment of the present invention.

FIG. 38 illustrates frequency deinterleaving according to an embodiment of the present invention.

FIG. 38 illustrates deinterleaving performed when the total number of symbols is 10, the number of cells constituting one symbol 10, and p is 3.

FIG. 38(a) shows symbols input to a single memory according to an embodiment of the present invention. The input symbols may be stored in the single memory respectively according to the values shown in the figure. In this case, the values for the respective input symbols stored in the single memory represent the result of sequentially writing cells which are currently input while deinterleaving (reading) is performed on the previous symbols.

FIG. 38(b) illustrates generation of deinterleaving memory indexes.

The deinterleaving memory indexes are used to deinterleave the values stored in the single memory, and the numbers marked on the deinterleaving memory indexes an order in which the cells included in each symbol are deinterleaved and output.

Hereinafter, description will be given of the aforementioned frequency deinterleaving, focusing on input symbols #0 and #1 among the symbols shown in the figure.

The broadcast signal reception apparatus according to an embodiment of the present invention sequentially writes input symbol #0 on the single memory. Thereafter, the broadcast signal reception apparatus may generate deinterleaving memory indexes to deinterleave input symbol #0. Thereafter, the broadcast signal reception apparatus reads input symbol #0 written (or stored) on the single memory according to the generated deinterleaving memory indexes. Since values which have already been read do not need to be stored, new input symbol #1 may be sequentially written.

Thereafter, when the operation of reading input symbol #0 and the operation of writing input symbol #1 are all completed, deinterleaving memory indexes may be generated to deinterleave written input symbol #1. In this case, since the broadcast signal reception apparatus according to an embodiment of the present invention uses a single memory, the broadcast signal reception apparatus cannot perform interleaving using the sub interleaving seed applied to every symbol by the broadcast signal transmission apparatus. Thereafter, the input symbols may be deinterleaved in the same way.

Figure 39:
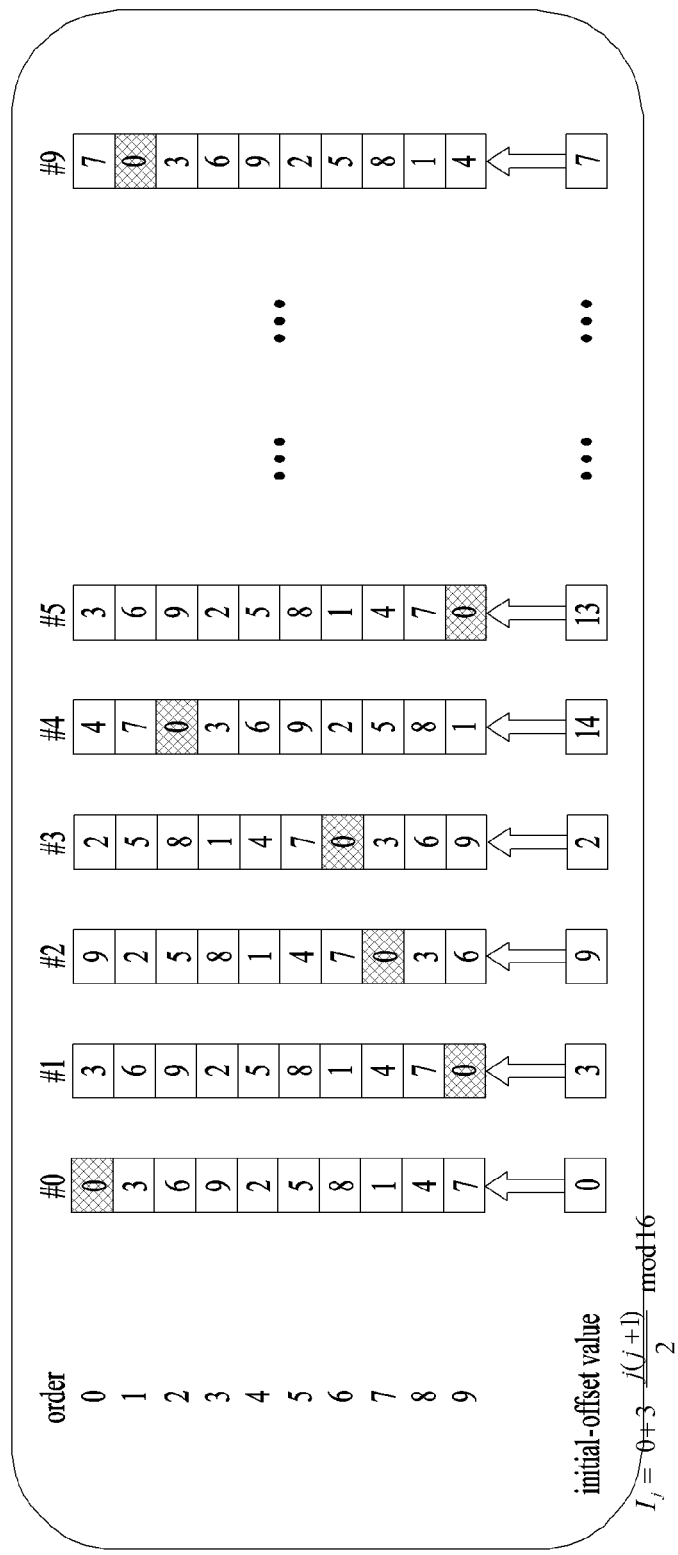
FIG. 39 illustrates generation of deinterleaving memory indexes according to an embodiment of the present invention.

FIG. 39 illustrates generation of deinterleaving memory indexes according to an embodiment of the present invention.

In particular, FIG. 39 illustrates a method for generating a new sub interleaving seed when the broadcast signal reception apparatus according to an embodiment of the present invention cannot perform interleaving using the sub interleaving seed applied to every symbol by the broadcast signal transmission apparatus as the broadcast signal reception apparatus uses a signal memory. FIG. 39(a) shows a relationship between deinterleaving memory indexes and interleaving memory indexes of input symbol #0 along with an equation. The mother interleaving seed of input symbol #0 may be derived from the equation shown in FIG. 39(a).

FIG. 39(b) illustrates generation of the aforementioned deinterleaving memory indexes along with an equation.

According to an embodiment shown in FIG. 39(b), RPI variables of each input symbol may be used. In generating deinterleaving memory indexes of input symbol #0, p=3 and I0=0, which are RPI variables used by the broadcast signal transmission apparatus. For input symbol #1, p2=3×3 and I0=1 may be used as variables of RPI. For input symbol #2, p3=3×3×3 and I0=7 may be used as variables of RPI. For input symbol #3, p4=3×3×3×3 and I0=4 may be used as variables of RPI.

That is, the broadcast signal reception apparatus according to an embodiment of the present invention may effectively deinterleave the symbols stored in the single memory by changing the p value of RPI and an initial-offset value for each symbol. In addition, the p value used for each symbol may be easily derived from involution of p, and the initial-offset values may be sequentially acquired using the mother interleaving seed. Hereinafter, a description will be given of a method for deriving initial-offset values.

According to an embodiment of the present invention, the initial-offset value used on input symbol #0 may be defined as I0=0. The initial-offset value used on input symbol #1 is I0=1, which is the same as the value generated seventh in order in the process of generating deinterleaving memory indexes for input symbol #0.

That is, the broadcast signal reception apparatus according to an embodiment of the present invention may store and use the aforementioned values in generating deinterleaving memory indexes for input symbol #0.

The initial-offset value used on input symbol #2 is I0=7, which is the same as the value generated fourth in order in generating deinterleaving memory indexes for input symbol #1, and the initial-offset value used on input symbol #3 is I0=4, which is the same as the value generated first in order in generating deinterleaving memory indexes for input symbol #2.

Accordingly, the broadcast signal reception apparatus according to an embodiment of the present invention may store and use values corresponding to the initial-offset values to be used for respective symbols in the process of generating deinterleaving memory indexes of a previous symbol. In this case, positions of values corresponding to the respective initial-offset values may be easily derived from the equation shown in FIG. 39(a).

As a result, the method described above may be expressed as the following equation.

$$\pi_j^{-1}(k) = (I_j^{-1} + p^{j+1}k) \bmod N_{Cell\_NUM},$$

for $k = 0, \ldots, N_{Cell\_NUM} - 1$ $j = 0, \ldots, N_{Sym\_NUM} - 1$ where $I_j^{-1} = \pi_{j-1}^{-1}(g_j) \bmod N_{Cell\_NUM}$ with $I_0^{-1} = 0$, and $g_j = (I_0 - pj) \bmod N_{Sym\_NUM}$      Equation 2

$I_j^{-1}$: the initial-offset value at the $j^{th}$ RPI for deinterleaving $\pi_j^{-1}(k)$: deinterleaving output memory-index for the $k^{th}$ input cell-index in the $j^{th}$ symbol $\pi_j^{-1}(g_j)$: the $(g_j)$th deinterleaving output memory-index in the $j^{th}$ symbol When a double memory is applied to the broadcast signal reception apparatus according to an embodiment of the present invention, the aforementioned frequency interleaving may have the following features.

First, all input cells may be uniformly interleaved using the RPI technique regardless of the symbol length.

Second, the initial-offset value of RPI applied to every symbol may be determined by a quadratic polynomial (QP) or a primitive polynomial (PP).

Figure 40:
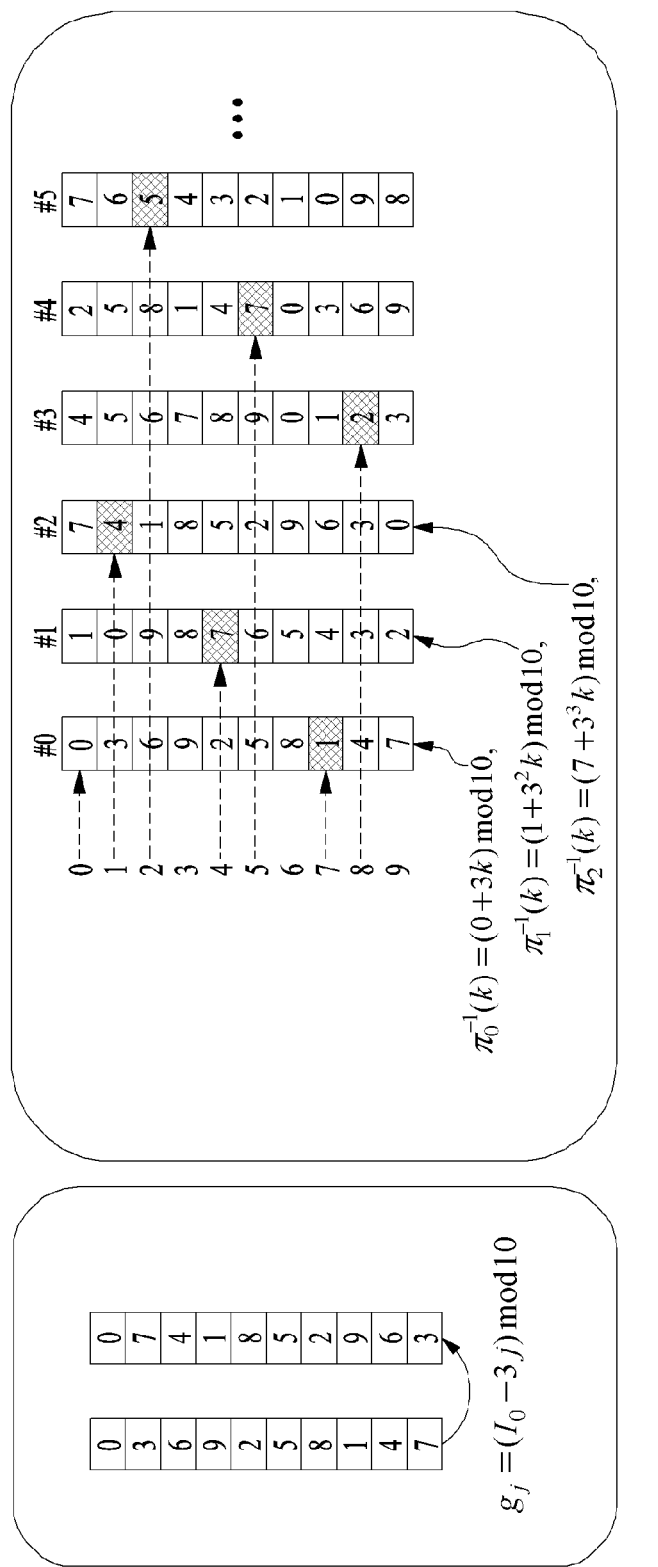
FIG. 40 illustrates frequency interleaving according to another embodiment of the present invention.

Thereby, an equation for simply applying different interleaving to each symbol may be expressed as follows.

$$\pi_j(k) = (I_j + pk) \bmod N_{Cell\_NUM}, \quad \text{Equation 3}$$

for $k = 0, \ldots, N_{Cell\_NUM} - 1$, $j = 0, \ldots, N_{Sym\_NUM} - 1$, where $I_j = \left(\gamma + p \times \frac{j(j+1)}{2}\right) \bmod N_{Div}$ $p$: a relative prime value to $I_j$: the initial-offset value at the $j^{th}$ RPI for interleaving $\gamma$: an offset value $t$ of a QP $N_{Cell\_NUM}$: total cell (or sample) number $N_{Sym\_NUM}$: total symbol number $N_{Div}$: division value of QP or PP, $N_{Div} = 2^n$, where $\lfloor \log_2(N_{Cell\_NUM}/4) \rfloor < n \leq \lfloor \log_2(N_{Cell\_NUM}/2) \rfloor$ $\lceil \cdot \rceil$: ceil operation mod: modulus operation $\pi_j(k)$: interleaving output memory-index (RPI output value) for the $k^{th}$ input cell-index in the $j^{th}$ symbol FIG. 40 illustrates frequency interleaving according to another embodiment of the present invention.

FIG. 40 illustrates generation of interleaving memory indexes when the total number of symbols is 10, the number of cells constituting one symbol is 10, and p is 3.

FIG. 40 shows the process of generating interleaving memory indexes for interleaving the respective symbols by applying the RPI technique.

The initial-offset values of the respective symbols may be determined using the equation shown at the lower left area of the figure. Thereby, interleaving memory indexes may be randomly generated.

If a double memory is applied to the broadcast signal reception apparatus according to an embodiment of the present invention, the frequency deinterleaving process may be implemented by reversely performing the frequency interleaving process, and may be expressed as the following equation.

$$\pi_j^{-1}(k) = (I_j + pk) \bmod N_{Cell\_NUM}, \quad \text{Equation 4}$$

for $k = 0, \ldots, N_{Cell\_NUM} - 1$, $j = 0, \ldots, N_{Sym\_NUM} - 1$, where $I_j = \left(\gamma + p \times \frac{j(j+1)}{2}\right) \bmod N_{Div}$ When a double memory is applied to the broadcast signal reception apparatus according to an embodiment of the present invention, one memory may serve to perform the operation of reading input symbols, and the other memory may serve to perform the operation of writing the next input symbol at the same time. These opeations may be alternatively performed for the two memories.

Hereinafter, description will be given of the aforementioned pair-wise symbol frequency interleaving performed in a case where a single memory is applied to the broadcast signal reception apparatus and in a case where a double memory is applied to the broadcast signal reception apparatus.

Different pair-wise symbol frequency interleaving represents a method for performing different interleaving on the symbol-by-symbol basis as in the case of frequency interleaving described above by taking two neighboring cells included in each symbol as one cell.

In addition, compared to frequency interleaving described above, pair-wise symbol frequency interleaving may reduce the number of times of generating interleaving memory indexes by half since two cells are taken as one cell. Accordingly, efficient interleaving may be implemented.

An equation expressing pair-wise symbol frequency interleaving for the single memory is given below. The equation expressing pair-wise symbol frequency interleaving is obtained by dividing the number of cells by 2 in the equation for frequency interleaving for the single memory described above.

$$\pi_j(k) = (I_j + pk) \bmod (N_{Cell\_NUM}/2)$$

for $k = 0, \ldots, N_{Cell\_NUM}/2 - 1$, $j = 0, \ldots, N_{Sym\_NUM} - 1$, where $I_j = \pi_{j-1}(N_{Cell\_NUM}/2 - 1)$ with $I_0 = 0$), Equation 5

P: a relative prime value to $I_j$: the initial-offset value at the $j^{th}$ RPI for interleaving $N_{Cell\_NUM}$: total cell (or sample) number $N_{Sym\_NUM}$: total symbol number mod: modulus operation $\pi_j(k)$: interleaving output memory-index (RPI output value) for the $k^{th}$ input cell-index in the $j^{th}$ symbol An equation expressing pair-wise symbol frequency deinterleaving for the single memory is given below. The equation expressing pair-wise symbol frequency deinterleaving is obtained by dividing the number of cells by 2 in the equation for frequency deinterleaving for the single memory described above.

$$\pi_j^{-1}(k) = (I_j^{-1} + p^{j+1}k) \bmod (N_{Cell\_NUM}/2),$$

for $k = 0, \ldots, N_{Cell\_NUM}/2 - 1$ $j = 0, \ldots, N_{Sym\_NUM} - 1$ where $I_j^{-1} = \pi_{j-1}^{-1}(g_j) \bmod N_{Cell\_NUM}/2$ with $I_0^{-1} = 0$, and $$g_j = (I_0 - pj) \bmod N_{Sym\_NUM} \quad \text{Equation 6}$$

$I_j^{-1}$: the initial-offset value at the $j^{th}$ RPI for deinterleaving $\pi_j^{-1}(k)$: deinterleaving output memory-index for the $k^{th}$ input cell-index in the $j^{th}$ symbol $\pi_j^{-1}(g_j)$: the $(g_j)$th deinterleaving output memory-index in the $j^{th}$ symbol An equation expressing pair-wise symbol frequency interleaving for the double memory is given below. The equation expressing pair-wise symbol frequency interleaving is obtained by dividing the number of cells by 2 in the equation for frequency interleaving for the double memory described above.

Equation 7

$$\pi_j(k) = (I_j + pk) \bmod (N_{Cell\_NUM}/2),$$

for $k = 0, \ldots, N_{Cell\_NUM}/2 - 1,$ $j = 0, \ldots, N_{Sym\_NUM} - 1,$ where $I_j = \left(\gamma + p \times \dfrac{j(j+1)}{2}\right) \bmod N_{Div}$ $p$: a relative prime value to $I_j$: the initial offset value at the $j^{th}$ RPI for interleaving $\gamma$: an offset value $t$ of a $QP$ $N_{Cell\_NUM}$: total cell (or sample) number $N_{Sym\_NUM}$: total symbol number $N_{Div}$: division value of $QP$ or $PP$, $N_{Div} = 2^n,$ where $\lceil \log_2(N_{Cell\_NUM}/4) \rceil < n \leq \lceil \log_2(N_{Cell\_NUM}/2) \rceil$ $\lceil \cdot \rceil$: ceil operation mod: modulus operation $\pi_j(k)$: interleaving output memory-index (RPI output value)

for the $k^{th}$ input cell-index in the $j^{th}$ symbol

An equation expressing pair-wise symbol frequency deinterleaving for the double memory is given below. The equation expressing pair-wise symbol frequency deinterleaving is obtained by dividing the number of cells by 2 in the equation for frequency deinterleaving for the double memory described above.

Figure 41:
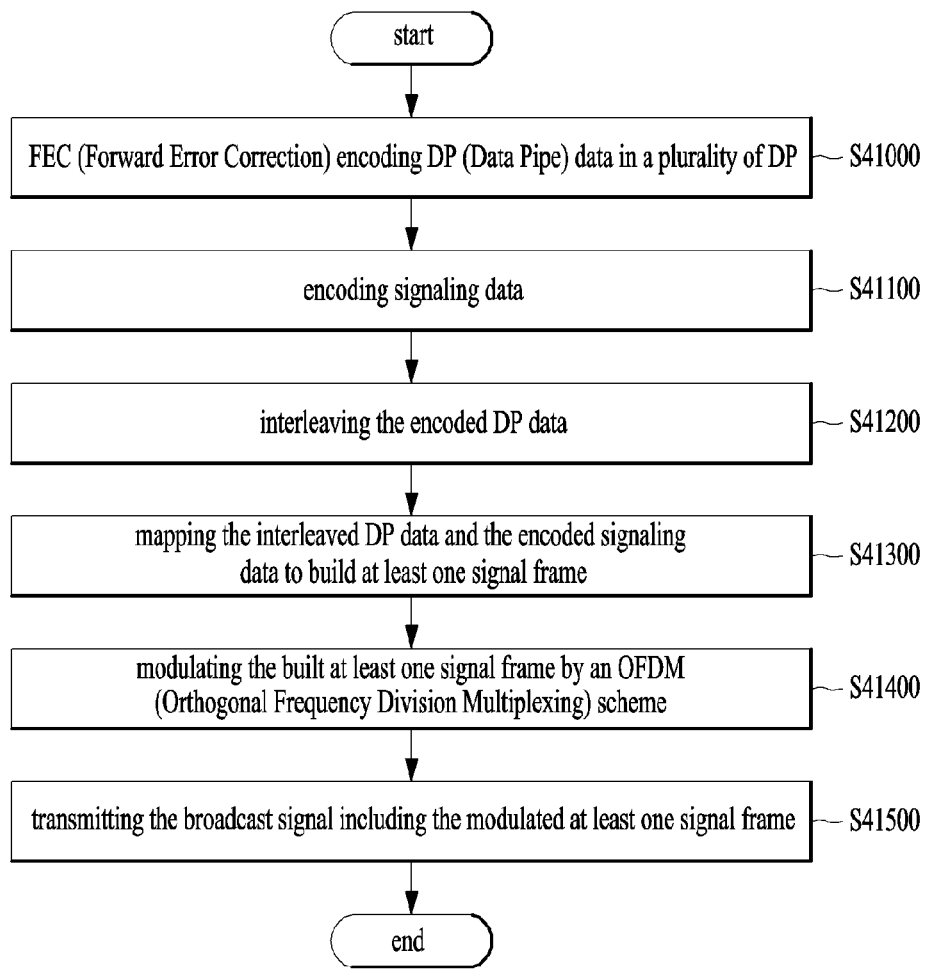
FIG. 41 is a flowchart illustrating a method for transmitting broadcast signals according to an embodiment of the present invention.

Equation 8

$$\pi_j^{-1}(k) = (I_j + pk) \bmod (N_{Cell\_NUM}/2),$$

for $k = 0, \ldots, N_{Cell\_NUM}/2 - 1,$ $j = 0, \ldots, N_{Sym\_NUM} - 1,$ where $I_j = \left(\gamma + p \times \dfrac{j(j+1)}{2}\right) \bmod N_{Div}$ FIG. 41 is a flowchart illustrating a method for transmitting broadcast signals according to an embodiment of the present invention.

The broadcast signal transmission apparatus according to an embodiment of the present invention may perform FEC encoding on DP data transmitted through a plurality of DPs (S41000). As described above, each DP may transmit at least one service or at least one service component. The encoding method is implemented as described above.

Thereafter, the broadcast signal transmission apparatus according to an embodiment of the present invention may encode signaling data (S41100). According to an embodiment of the present invention, the signaling data may include PLS information. The PLS information includes specific signaling information described above.

Thereafter, the broadcast signal transmission apparatus may interleave the encoded DP data (S41200). As described above, the DP data may be processed through respective DP paths. The interleaving method is implemented as described above.

Thereafter, the broadcast signal transmission apparatus may generate at least one signal frame by mapping the interleaved DP data and the encoded signaling data (S41300). As described above, the DP data processed for each path may be mapped to the data symbol region of a signal frame, and the signaling data may be mapped to a region ahead of the data symbol region. As described above, the DP data may also be mapped according to types of DPs. Details of this mapping method are the same as those described above with reference to FIG. 17. In addition, according to an embodiment of the present invention, the signaling data may include type information indicting the type of each DP. Details are the same as described above.

Thereafter, the broadcast signal transmission apparatus may modulate the at least one generated signal frame according to the OFDM scheme (S41400), and transmit a broadcast signal containing the at least one modulated signal frame (S41500).

Figure 42:
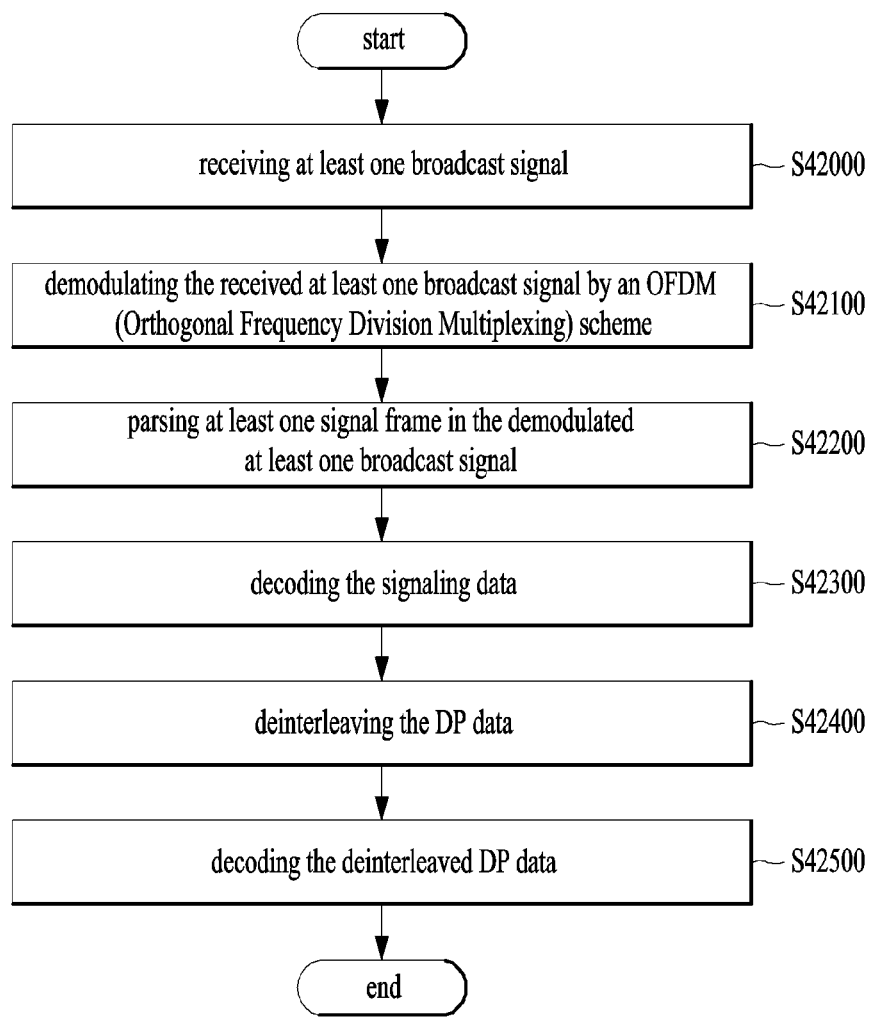
FIG. 42 is a flowchart illustrating a method for receiving broadcast signals according to an embodiment of the present invention.

FIG. 42 is a flowchart illustrating a method for receiving broadcast signals according to an embodiment of the present invention.

According to an embodiment of the present invention, the broadcast signal reception apparatus may receive at least one broadcast signal (S42000).

Thereafter, the broadcast signal reception apparatus may demodulate the at least one received broadcast signal according to the OFDM scheme (S42100). Details of this operation are the same as described above.

Thereafter, the broadcast signal reception apparatus may acquire at least one signal frame from the at least one demodulated broadcast signal (S42200). As described above, each signal frame may include signaling data and DP data. The DP data may be mapped to the data symbol region, and the signaling data may be mapped to a region ahead of the data symbol region. As described above, the DP data may also be mapped according to types of DPs. Details of this mapping method are the same as those described above with reference to FIG. 17. In addition, according to an embodiment of the present invention, the signaling data may include type information indicting the type of each DP. Details are the same as described above.

Thereafter, the broadcast signal reception apparatus may decode the signaling data (S42300). In this case, the broadcast signal reception apparatus may acquire DP type information, mapping information, and the like from the decoded signaling data.

Thereafter, the broadcast signal reception apparatus may interleave the DP data (S42400), and acquire a desired service or service component by decoding the deinterleaved DP data (S42500). The DP data may be processed through respective DP paths, which has been described in detail above.

MODE FOR INVENTION

As described above, relevant details have been disclosed in the section Best Mode.

INDUSTRIAL APPLICABILITY

As described above, the present invention may be fully or partially applied to a digital broadcast transmission/reception apparatus or system.

The invention claimed is:

1. A method for transmitting a broadcast signal by an apparatus for transmitting broadcast signals, the method comprising:
    FEC (Forward Error Correction) encoding DP (Data Pipe) data in each of a plurality of DPs, wherein a DP carries at least one service;

encoding signaling data;
interleaving the encoded DP data;
mapping the interleaved DP data and the encoded signaling data to build at least one signal frame having at least one partitioned region in a time dimension,
wherein DPs are multiplexed according to a TFDM (Time Frequency Division Multiplexing) method in the least one partitioned region,
wherein the DPs are multiplexed in a frequency dimension and the time dimension by a unit of a block,
wherein the at least one signal frame includes information related to the block used for the TFDM method;
modulating the built at least one signal frame by an OFDM (Orthogonal Frequency Division Multiplexing) scheme; and
transmitting the broadcast signal including the modulated at least one signal frame.

2. The method of claim 1,
wherein the at least one partitioned region in the time dimension is mapped based on a type of the at least one partitioned region.

3. The method of claim 2, wherein at least one DP consists of at least one resource block, wherein the at least one partitioned region includes multiplexed at least one resource block of the DPs.

4. The method of claim 3, wherein the signaling data further includes address information indicating a first cell address of each DP in each partitioned region.

5. The method of claim 4, wherein the signaling data further includes information indicating a number of partitioned region.

6. The method of claim 5, wherein the signaling data further includes DP type information indicating a type of the each DP.

7. An apparatus for transmitting a broadcast signal, the apparatus comprising:
an encoder to FEC (Forward Error Correction) encode DP (Data Pipe) data in each of a plurality of DPs, wherein a DP carries at least one service or at least one service component;
a signaling encoder to encode signaling data;
an interleaver to interleave the encoded DP data;
a frame builder to build at least one signal frame by mapping the interleaved DP data and the encoded signaling data,
wherein the at least one signal frame includes at least one partitioned region in a time dimension,
wherein DPs are multiplexed according to a TFDM (Time Frequency Division Multiplexing) method in the least one partitioned region,
wherein the DPs are multiplexed in a frequency dimension and the time dimension by a unit of a block,
wherein the at least one signal frame includes information related to the block used for the TFDM method;
a modulator to modulate the built at least one signal frame by an OFDM (Orthogonal Frequency Division Multiplexing) scheme; and
a transmitter to transmit the broadcast signal including the modulated at least one signal frame.

8. The apparatus of claim 7, wherein the at least one partitioned region in the time dimension is mapped based on a type of the at least one partitioned region.

9. The apparatus of claim 8, wherein at least one DP consists of at least one resource block, wherein the at least one partitioned region includes multiplexed at least one resource block of the DPs.

10. The apparatus of claim 9, wherein the signaling data further includes address information indicating a first cell address of each DP in each partitioned region.

11. The apparatus of claim 10, wherein the signaling data further includes information indicating a number of partitioned region.

12. The apparatus of claim 11, wherein the signaling data further includes DP type information indicating a type of the each DP.

13. A method for receiving broadcast signals by an apparatus for receiving broadcast signals, the method comprising:
receiving at least one broadcast signal;
demodulating the received at least one broadcast signal by an OFDM (Orthogonal Frequency Division Multiplexing) scheme;
parsing at least one signal frame in the demodulated at least one broadcast signal, wherein each signal frame including DP (Data Pipe) data in a plurality of DPs and signaling data, wherein DPs are multiplexed according to a TFDM (Time Frequency Division Multiplexing) method in the least one partitioned region,
wherein the DPs are multiplexed in a frequency dimension and the time dimension by a unit of a block,
wherein the at least one signal frame includes information related to the block used for the TFDM method;
decoding the signaling data;
deinterleaving the DP data; and
decoding the deinterleaved DP data, wherein a DP carries at least one service or at least one service component.

14. The method of claim 13, wherein a signal frame includes at least one partitioned region in a time dimension.

15. The method of claim 14, wherein at least one DP consists of at least one resource block, wherein the at least one partitioned region includes multiplexed at least one resource block of the DPs.

16. The method of claim 15, wherein the signaling data further includes address information indicating a first cell address of each DP in each partitioned region.

17. The method of claim 16, wherein the signaling data further includes information indicating a number of partitioned regions.

18. The method of claim 17, wherein the signaling data further includes DP type information indicating a type of the each DP.

19. An apparatus for receiving broadcast signals, the apparatus comprising:
a demodulator to receive at least one broadcast signal and demodulate the received at least one broadcast signal by an OFDM (Orthogonal Frequency Division Multiplexing) scheme;
a frame parser to parse at least one signal frame in the demodulated at least one broadcast signal, wherein each signal frame including DP (Data Pipe) data in a plurality of DPs and signaling data, wherein DPs are multiplexed according to a TFDM (Time Frequency Division Multiplexing) method in the least one partitioned region,
wherein the DPs are multiplexed in a frequency dimension and the time dimension by a unit of a block,
wherein the at least one signal frame includes information related to the block used for the TFDM method;
a signaling decoder to decode the signaling data;
a deinterleaver to deinterleave the DP data; and
a decoder to decode the deinterleaved DP data, wherein the each DP carries at least one service or at least one service component.

20. The apparatus of claim 19, wherein a signal frame includes at least one partitioned region in a time dimension.

21. The apparatus of claim 20, wherein at least one DP consists of at least one resource block, wherein the at least one partitioned region includes multiplexed at least one resource block of the DPs.

22. The apparatus of claim 21, wherein the signaling data further includes address information indicating a first cell address of each DP in each partitioned region.

23. The apparatus of claim 22, wherein the signaling data further includes information indicating a number of partitioned regions.

24. The apparatus of claim 23, wherein the signaling data further includes DP type information indicating a type of the each DP.

* * * * *